United States Patent
Mergener et al.

(10) Patent No.: US 11,541,521 B2
(45) Date of Patent: Jan. 3, 2023

(54) POWER TOOL COMMUNICATION SYSTEM

(71) Applicant: MILWAUKEE ELECTRIC TOOL CORPORATION, Brookfield, WI (US)

(72) Inventors: Matthew J. Mergener, Mequon, WI (US); Burtrom Lee Stampfl, Bristol, WI (US); Michael Monteleone, Whitefish Bay, WI (US); Cole A. Conrad, Wauwatosa, WI (US); Stephen Matson, Milwaukee, WI (US); Robert R. Hollis, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 94 days.

(21) Appl. No.: 17/217,350

(22) Filed: Mar. 30, 2021

(65) Prior Publication Data

US 2021/0213594 A1    Jul. 15, 2021

Related U.S. Application Data

(63) Continuation of application No. 16/747,389, filed on Jan. 20, 2020, now Pat. No. 10,967,489, which is a
(Continued)

(51) Int. Cl.
*B23D 59/00* (2006.01)
*B25B 23/147* (2006.01)
(Continued)

(52) U.S. Cl.
CPC ........ *B25B 23/1475* (2013.01); *B23B 45/008* (2013.01); *B23B 47/00* (2013.01);
(Continued)

(58) Field of Classification Search
CPC ... B25B 23/1475; B25B 21/008; B25B 21/02; B23B 45/008; B23B 47/00; B25D 16/006; B25D 2250/221; B25F 5/00; H02J 7/0024
See application file for complete search history.

(56) References Cited

U.S. PATENT DOCUMENTS 2,980,218 A    4/1961   Young
3,382,305 A    5/1968   Breen
(Continued)

FOREIGN PATENT DOCUMENTS

DE    3803357 A1    8/1989
DE    19904776 A1   8/2000
(Continued)

OTHER PUBLICATIONS

International Search Report and Written Opinion for Application No. PCT/2014/061651 dated Jan. 27, 2015 (13 pages).
(Continued)

*Primary Examiner* — Muhammad S Islam
(74) *Attorney, Agent, or Firm* — Michael Best & Friedrich LLP

(57) ABSTRACT

A power tool communication system including an external device including a first controller configured to transmit, via wireless communication to a power tool, configuration data including a work light duration parameter value and a work light brightness parameter value. The power tool includes a housing, a brushless direct current (DC) motor, a trigger, a work light, a wireless communication circuit configured to wirelessly communicate with the external device to receive the configuration data, and a second controller configured to control a work light duration of the work light based on the
(Continued)

work light duration parameter value, and control a work light brightness of the work light based on the work light brightness parameter value.

20 Claims, 35 Drawing Sheets

Related U.S. Application Data continuation of application No. 16/246,017, filed on Jan. 11, 2019, now Pat. No. 10,569,398, which is a continuation of application No. 15/833,356, filed on Dec. 6, 2017, now Pat. No. 10,213,908, which is a continuation of application No. 15/030,756, filed as application No. PCT/US2014/061651 on Oct. 21, 2014, now Pat. No. 10,131,042.

(60) Provisional application No. 61/893,765, filed on Oct. 21, 2013.

(51) Int. Cl.
    *B25F 5/00*         (2006.01)
    *B25B 21/00*       (2006.01)
    *B25D 16/00*       (2006.01)
    *B23B 45/00*       (2006.01)
    *B23B 47/00*       (2006.01)
    *B25B 21/02*       (2006.01)
    *H02J 7/00*        (2006.01)

(52) U.S. Cl.
    CPC ............ *B25B 21/008* (2013.01); *B25B 21/02* (2013.01); *B25D 16/006* (2013.01); *B25F 5/00* (2013.01); *H02J 7/0024* (2013.01); *B25D 2216/0015* (2013.01); *B25D 2216/0023* (2013.01); *B25D 2216/0038* (2013.01); *B25D 2250/005* (2013.01); *B25D 2250/041* (2013.01); *B25D 2250/221* (2013.01); *H02J 7/00034* (2020.01)

(56) References Cited

U.S. PATENT DOCUMENTS

| | | |
|---|---|---|
| 3,739,659 A | 6/1973 | Workman, Jr. |
| 3,882,305 A | 5/1975 | Johnstone |
| 3,965,778 A | 6/1976 | Aspers et al. |
| 4,545,106 A | 10/1985 | Juengel |
| 4,680,862 A | 7/1987 | Wieland et al. |
| 4,685,050 A | 8/1987 | Polzer et al. |
| 4,854,786 A | 8/1989 | Alexander et al. |
| 4,881,435 A | 11/1989 | Hansson |
| 5,109,540 A | 4/1992 | Dzung et al. |
| 5,154,242 A | 10/1992 | Soshin et al. |
| 5,188,188 A | 2/1993 | Mars |
| 5,203,242 A | 4/1993 | Hansson |
| 5,277,261 A | 1/1994 | Sakoh |
| 5,315,501 A | 5/1994 | Whitehouse |
| 5,526,460 A | 6/1996 | DeFrancesco et al. |
| 5,592,396 A | 1/1997 | Tambini et al. |
| 5,637,968 A | 6/1997 | Kainec et al. |
| 5,903,462 A | 5/1999 | Wagner et al. |
| 5,903,762 A | 5/1999 | Sakamoto et al. |
| 5,942,975 A | 8/1999 | Sørensen |
| 6,005,489 A | 12/1999 | Siegle et al. |
| 6,055,484 A | 4/2000 | Lysaght |
| 6,123,241 A | 9/2000 | Walter et al. |
| 6,157,313 A | 12/2000 | Emmermann |
| 6,161,629 A | 12/2000 | Hohmann et al. |
| 6,279,668 B1 | 8/2001 | Mercer |
| 6,349,266 B1 | 2/2002 | Lysaght et al. |
| 6,390,205 B2 | 5/2002 | Wallgren et al. |
| 6,405,598 B1 | 6/2002 | Bareggi |
| 6,424,799 B1 | 7/2002 | Gilmore |
| 6,431,425 B1 | 8/2002 | Moorman et al. |
| 6,432,425 B1 | 8/2002 | Siamon |
| 6,469,615 B1 | 10/2002 | Kady et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,536,536 B1 | 3/2003 | Gass et al. |
| 6,547,014 B2 | 4/2003 | McCallops et al. |
| 6,598,684 B2 | 7/2003 | Watanabe |
| 6,607,041 B2 | 8/2003 | Suzuki et al. |
| 6,614,349 B1 | 9/2003 | Proctor et al. |
| 6,668,212 B2 | 12/2003 | Colangelo, II et al. |
| 6,675,196 B1 | 1/2004 | Kronz |
| 6,768,994 B1 | 1/2004 | Howard et al. |
| 6,687,567 B2 | 2/2004 | Watanabe |
| 6,784,801 B2 | 8/2004 | Watanabe et al. |
| 6,834,730 B2 | 12/2004 | Gass et al. |
| 6,836,614 B2 | 12/2004 | Gilmore |
| 6,845,279 B1 | 1/2005 | Gilmore et al. |
| 6,848,516 B2 | 2/2005 | Giardino |
| 6,872,121 B2 | 3/2005 | Wiener et al. |
| 6,876,173 B2 | 4/2005 | Mastaler et al. |
| 6,913,087 B1 | 7/2005 | Brotto et al. |
| 6,920,050 B2 | 7/2005 | Little et al. |
| 6,923,285 B1 | 8/2005 | Rossow et al. |
| 6,938,689 B2 | 9/2005 | Farrant et al. |
| 6,945,337 B2 | 9/2005 | Kawai et al. |
| 6,954,048 B2 | 10/2005 | Cho |
| 6,967,972 B1 | 11/2005 | Volftsun et al. |
| 6,968,908 B2 | 11/2005 | Tokunaga et al. |
| 6,978,846 B2 | 12/2005 | Kawai et al. |
| 6,981,311 B2 | 1/2006 | Seith et al. |
| 6,992,585 B2 | 1/2006 | Saleh et al. |
| 7,034,711 B2 | 4/2006 | Sakatani et al. |
| 7,035,710 B2 | 4/2006 | Balling |
| 7,035,898 B1 | 4/2006 | Baker |
| 7,036,605 B2 | 5/2006 | Suzuki et al. |
| 7,036,703 B2 | 5/2006 | Grazioli et al. |
| 7,054,696 B2 | 5/2006 | Crowell |
| 7,062,998 B2 | 6/2006 | Hohmann et al. |
| 7,064,502 B2 | 6/2006 | Garcia et al. |
| 7,064,520 B2 | 6/2006 | Heigl et al. |
| 7,086,483 B2 | 8/2006 | Arimura et al. |
| 7,093,668 B2 | 8/2006 | Gass et al. |
| 7,102,303 B2 | 9/2006 | Brotto et al. |
| 7,112,934 B2 | 9/2006 | Gilmore |
| 7,116,969 B2 | 10/2006 | Park |
| 7,119,686 B2 | 10/2006 | Bertness et al. |
| 7,121,358 B2 | 10/2006 | Gass et al. |
| 7,123,149 B2 | 10/2006 | Nowak et al. |
| 7,137,541 B2 | 11/2006 | Baskar et al. |
| 7,182,147 B2 | 2/2007 | Cutler et al. |
| 7,182,150 B2 | 2/2007 | Grossman |
| 7,185,998 B2 | 3/2007 | Oomori et al. |
| 7,211,972 B2 | 5/2007 | Garcia et al. |
| 7,218,227 B2 | 5/2007 | Davis et al. |
| 7,227,335 B2 | 6/2007 | Sakakibara et al. |
| 7,228,917 B2 | 6/2007 | Davis et al. |
| 7,243,440 B2 | 7/2007 | DeKeyser |
| 7,298,240 B2 | 11/2007 | Lamar |
| 7,314,097 B2 | 1/2008 | Jenner et al. |
| 7,391,326 B2 | 1/2008 | Puzio et al. |
| 7,328,086 B2 | 2/2008 | Perry et al. |
| 7,328,752 B2 | 2/2008 | Gass et al. |
| 7,328,757 B2 | 2/2008 | Davies |
| 7,330,129 B2 | 2/2008 | Crowell et al. |
| 7,336,181 B2 | 2/2008 | Nowak et al. |
| 7,343,764 B2 | 3/2008 | Solfronk |
| 7,346,406 B2 | 3/2008 | Brotto et al. |
| 7,346,422 B2 | 3/2008 | Tsuchiya et al. |
| 7,357,526 B2 | 4/2008 | Zeiler |
| 7,359,762 B2 | 4/2008 | Etter et al. |
| 7,382,272 B2 | 6/2008 | Feight |
| 7,383,882 B2 | 6/2008 | Lerche et al. |
| 7,419,013 B2 | 9/2008 | Sainomoto et al. |
| 7,428,934 B2 | 9/2008 | Arimura |
| 7,437,204 B2 | 10/2008 | Lev-Ami et al. |
| 7,443,137 B2 | 10/2008 | Scott et al. |

(56) References Cited

U.S. PATENT DOCUMENTS

| | | |
|---|---|---|
| 7,464,769 B2 | 12/2008 | Nakazawa et al. |
| 7,501,778 B2 | 3/2009 | Hashimoto et al. |
| 7,540,334 B2 | 6/2009 | Gass et al. |
| 7,594,548 B1 | 9/2009 | Puzio et al. |
| 7,613,590 B2 | 11/2009 | Brown |
| 7,638,958 B2 | 12/2009 | Phiipp et al. |
| 7,641,518 B2 | 1/2010 | Lee et al. |
| 7,646,155 B2 | 1/2010 | Woods et al. |
| RE41,160 E | 3/2010 | Gilmore et al. |
| RE41,185 E | 3/2010 | Gilmore et al. |
| 7,688,028 B2 | 3/2010 | Phillips et al. |
| 7,690,569 B2 | 4/2010 | Swanson et al. |
| 7,723,952 B2 | 5/2010 | Phillips et al. |
| 7,750,811 B2 | 7/2010 | Puzio et al. |
| 7,772,850 B2 | 8/2010 | Bertness |
| 7,784,104 B2 | 8/2010 | Innami et al. |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,823,458 B2 | 11/2010 | Kibblewhite et al. |
| 7,834,566 B2 | 11/2010 | Woods et al. |
| 7,850,071 B2 | 12/2010 | Sakamoto et al. |
| 7,868,591 B2 | 1/2011 | Phillips et al. |
| 7,896,098 B2 | 3/2011 | Suzuki et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,928,845 B1 | 4/2011 | LaRosa |
| 7,931,096 B2 | 4/2011 | Saha |
| 7,940,321 B2 | 5/2011 | Sudo |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,026,814 B1 | 9/2011 | Heinze et al. |
| 8,044,796 B1 | 10/2011 | Carr, Sr. |
| 8,049,636 B2 | 11/2011 | Buckingham et al. |
| 8,062,060 B2 | 11/2011 | Rejman |
| 8,074,731 B2 | 12/2011 | Iwata et al. |
| 8,154,885 B2 | 4/2012 | Anderson |
| 8,159,345 B2 | 4/2012 | Stevens |
| 8,161,613 B2 | 4/2012 | Schuele et al. |
| 8,169,298 B2 | 5/2012 | Wiesner et al. |
| 8,171,828 B2 | 5/2012 | Duvan et al. |
| 8,179,069 B2 | 5/2012 | Matsunaga et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,286,723 B2 | 10/2012 | Puzio et al. |
| 8,294,424 B2 | 10/2012 | Bucur |
| 8,306,836 B2 | 11/2012 | Nichols et al. |
| 8,310,206 B2 | 11/2012 | Bucur |
| 8,316,958 B2 | 11/2012 | Schell et al. |
| 8,324,845 B2 | 12/2012 | Suzuki et al. |
| 8,330,426 B2 | 12/2012 | Suzuki et al. |
| 8,344,879 B2 | 1/2013 | Harmon et al. |
| 8,351,982 B2 | 1/2013 | Rofougaran |
| 8,354,183 B2 | 1/2013 | Konuma et al. |
| 8,360,166 B2 | 1/2013 | Iimura et al. |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,464,808 B2 | 6/2013 | Leü |
| 8,485,049 B2 | 7/2013 | Yokoyama et al. |
| 8,576,095 B2 | 11/2013 | Harmon et al. |
| 8,611,250 B2 | 12/2013 | Chen et al. |
| 8,627,900 B2 | 1/2014 | Oomori et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,678,106 B2 | 3/2014 | Matsunaga et al. |
| 8,818,617 B2 | 8/2014 | Miller et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,954,222 B2 | 2/2015 | Costantino |
| 8,954,227 B2 | 2/2015 | Bertosa et al. |
| 8,965,841 B2 | 2/2015 | Wallace |
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,022,702 B2 | 5/2015 | Kasuya et al. |
| 9,022,705 B2 | 5/2015 | Sibata et al. |
| 9,027,452 B2 | 5/2015 | Nagy et al. |
| 9,027,666 B2 | 5/2015 | Hecht et al. |
| 9,029,197 B2 | 5/2015 | Funatsu et al. |
| 9,030,145 B2 | 5/2015 | Brennenstuhl et al. |
| 9,030,169 B2 | 5/2015 | Christensen et al. |
| 9,031,585 B2 | 5/2015 | Kahle et al. |
| 9,033,769 B2 | 5/2015 | Mizutani et al. |
| 9,034,507 B2 | 5/2015 | Matthias |
| 9,035,596 B2 | 5/2015 | Sugiura et al. |
| 9,035,611 B2 | 5/2015 | Kikuchi et al. |
| 9,038,743 B2 | 5/2015 | Aoki |
| 9,041,543 B2 | 5/2015 | Inada |
| 9,044,836 B2 | 6/2015 | Blatz |
| 9,044,847 B2 | 6/2015 | Kohlschmied et al. |
| 9,044,849 B2 | 6/2015 | Maute et al. |
| 9,048,505 B2 | 6/2015 | Christensen et al. |
| 9,048,667 B2 | 6/2015 | Nagaoka et al. |
| 9,048,687 B2 | 6/2015 | Nakajima et al. |
| 9,048,699 B2 | 6/2015 | Oomori et al. |
| 9,049,641 B2 | 6/2015 | Wible et al. |
| 9,050,713 B2 | 6/2015 | Hartmann et al. |
| 9,050,715 B2 | 6/2015 | Umemura et al. |
| 9,061,359 B2 | 6/2015 | Wiker et al. |
| 9,061,392 B2 | 6/2015 | Forgues et al. |
| 9,062,827 B2 | 6/2015 | Krishnarao et al. |
| 9,063,558 B2 | 6/2015 | Fukumura |
| 9,063,569 B2 | 6/2015 | Tanaka et al. |
| 9,065,116 B2 | 6/2015 | Shimooka et al. |
| 9,067,292 B2 | 6/2015 | Appel |
| 9,067,293 B2 | 6/2015 | Bernardi et al. |
| D735,006 S | 7/2015 | Aoki et al. |
| 9,072,403 B2 | 7/2015 | Braden et al. |
| 9,073,127 B2 | 7/2015 | Esenwein |
| 9,073,134 B2 | 7/2015 | Koeder et al. |
| 9,073,160 B2 | 7/2015 | Appel et al. |
| 9,079,258 B2 | 7/2015 | Chung |
| 9,079,290 B2 | 7/2015 | Esenwein |
| 9,079,291 B2 | 7/2015 | Ikuta et al. |
| 9,079,502 B2 | 7/2015 | Kikuchi et al. |
| 9,080,988 B2 | 7/2015 | Okada et al. |
| 9,081,883 B2 | 7/2015 | Wittliff, III et al. |
| 9,083,184 B2 | 7/2015 | Okabayashi et al. |
| 9,085,075 B2 | 7/2015 | Ikuta |
| 9,089,941 B2 | 7/2015 | Moreno |
| 9,089,989 B2 | 7/2015 | Hörtling |
| 9,091,369 B2 | 7/2015 | Froehlich et al. |
| 9,093,843 B2 | 7/2015 | Wirnitzer et al. |
| 9,093,883 B2 | 7/2015 | Wiszniewski et al. |
| 9,097,331 B2 | 8/2015 | Saur et al. |
| 9,100,019 B2 | 8/2015 | Akiyama |
| 9,100,529 B2 | 8/2015 | Yoshioka et al. |
| 9,108,283 B2 | 8/2015 | Simm et al. |
| 9,108,284 B2 | 8/2015 | Tada et al. |
| 9,108,306 B2 | 8/2015 | Hecht et al. |
| 9,109,670 B2 | 8/2015 | Roehm et al. |
| 9,111,209 B2 | 8/2015 | Utoh et al. |
| 9,111,234 B2 | 8/2015 | Wallace et al. |
| 9,112,360 B2 | 8/2015 | Goto et al. |
| 9,114,491 B2 | 8/2015 | Kakiuchi et al. |
| 9,114,514 B2 | 8/2015 | Leong et al. |
| 9,114,519 B2 | 8/2015 | Iwata et al. |
| 9,114,520 B2 | 8/2015 | Hirabayashi et al. |
| 9,121,478 B2 | 9/2015 | Herr |
| 9,123,478 B2 | 9/2015 | Esenwein et al. |

(56) References Cited

U.S. PATENT DOCUMENTS

| | | |
|---|---|---|
| 9,123,938 B2 | 9/2015 | Sasaki et al. |
| 9,126,317 B2 | 9/2015 | Lawton et al. |
| 9,126,320 B2 | 9/2015 | Shinma et al. |
| 9,126,321 B2 | 9/2015 | Muller et al. |
| 9,128,156 B2 | 9/2015 | Jardine |
| 9,132,541 B2 | 9/2015 | John et al. |
| 9,133,909 B2 | 9/2015 | Blum et al. |
| 9,141,128 B2 | 9/2015 | Cizek et al. |
| 9,144,875 B2 | 9/2015 | Schlesak et al. |
| 9,147,882 B2 | 9/2015 | Hanasaki et al. |
| 9,148,134 B2 | 9/2015 | Shibuya |
| 9,148,232 B2 | 9/2015 | Yamamoto et al. |
| 9,149,872 B2 | 10/2015 | Saur et al. |
| 9,149,873 B2 | 10/2015 | Meyers et al. |
| 9,153,229 B2 | 10/2015 | Xu et al. |
| 9,156,093 B2 | 10/2015 | Meyers |
| 9,156,153 B2 | 10/2015 | Dvorak et al. |
| 9,156,182 B2 | 10/2015 | Moreno |
| 9,159,376 B2 | 10/2015 | Akiyama |
| 9,162,293 B2 | 10/2015 | Meyers |
| 9,162,349 B2 | 10/2015 | Ikuta et al. |
| 9,165,387 B2 | 10/2015 | Gilbert |
| 9,166,417 B2 | 10/2015 | Muramatsu et al. |
| 9,166,738 B2 | 10/2015 | Kaeriyama |
| 9,167,140 B2 | 10/2015 | Nakajima et al. |
| 9,168,597 B2 | 10/2015 | Wiker et al. |
| 9,168,651 B2 | 10/2015 | Hecht et al. |
| 9,171,595 B2 | 10/2015 | Fujiwara |
| 9,172,436 B2 | 10/2015 | Miyauchi et al. |
| 9,174,552 B2 | 11/2015 | Ikeda et al. |
| 9,175,745 B2 | 11/2015 | Saur |
| 9,180,841 B2 | 11/2015 | Suzuki et al. |
| 9,181,913 B2 | 11/2015 | Kellermann |
| 9,184,633 B2 | 11/2015 | Obayashi et al. |
| 9,186,808 B2 | 11/2015 | Hirabayashi et al. |
| 9,189,094 B2 | 11/2015 | Morikawa et al. |
| 9,189,663 B2 | 11/2015 | Goren et al. |
| 9,191,765 B2 | 11/2015 | Totsuka et al. |
| 9,193,021 B2 | 11/2015 | Machida et al. |
| 9,193,043 B2 | 11/2015 | Guenther et al. |
| 9,193,045 B2 | 11/2015 | Saur et al. |
| 9,194,462 B2 | 11/2015 | Blum et al. |
| 9,194,917 B2 | 11/2015 | Brochhaus |
| 9,195,633 B2 | 11/2015 | Enami et al. |
| 9,199,353 B2 | 12/2015 | Ota et al. |
| 9,202,430 B2 | 12/2015 | Tsuchi |
| 9,203,249 B2 | 12/2015 | Noda et al. |
| 9,206,782 B2 | 12/2015 | Chinnadurai et al. |
| 9,211,620 B2 | 12/2015 | Nagy |
| 9,211,622 B2 | 12/2015 | Nagy |
| 9,211,639 B2 | 12/2015 | Hecht et al. |
| 9,216,490 B2 | 12/2015 | Boeck et al. |
| 9,216,505 B2 | 12/2015 | Rejman et al. |
| 9,216,518 B2 | 12/2015 | Frolov |
| 9,218,924 B2 | 12/2015 | Coussins et al. |
| 9,221,164 B2 | 12/2015 | Schneider et al. |
| 9,221,165 B2 | 12/2015 | Wiedner et al. |
| 9,221,169 B2 | 12/2015 | Seidel |
| 9,224,994 B2 | 12/2015 | Ota et al. |
| 9,225,223 B2 | 12/2015 | Bekavac et al. |
| 9,227,553 B2 | 1/2016 | Nordbruch |
| 9,231,341 B2 | 1/2016 | Appel |
| 9,232,614 B2 | 1/2016 | Hiroi |
| 9,233,424 B2 | 1/2016 | Grolimund et al. |
| 9,233,457 B2 | 1/2016 | Wanek et al. |
| 9,233,460 B2 | 1/2016 | Liptak et al. |
| 9,236,588 B2 | 1/2016 | Hanawa et al. |
| 9,242,353 B2 | 1/2016 | Hecht et al. |
| 9,242,356 B2 | 1/2016 | King et al. |
| 9,242,362 B2 | 1/2016 | Abante et al. |
| 9,242,363 B2 | 1/2016 | Moessnang et al. |
| 9,243,674 B2 | 1/2016 | Esenwein |
| D749,389 S | 2/2016 | Aoki et al. |
| 9,248,507 B2 | 2/2016 | Rohm |
| 9,248,562 B2 | 2/2016 | Bernardi et al. |
| 9,248,566 B2 | 2/2016 | Horiyama et al. |
| 9,249,716 B2 | 2/2016 | Takayanagi |
| 9,250,861 B2 | 2/2016 | Okabayashi |
| 9,254,562 B2 | 2/2016 | Furusawa et al. |
| 9,254,563 B2 | 2/2016 | Yamaguchi et al. |
| 9,254,580 B2 | 2/2016 | Frolov |
| 9,256,988 B2 | 2/2016 | Wenger et al. |
| 9,257,807 B2 | 2/2016 | Betcher et al. |
| 9,257,865 B2 | 2/2016 | Hiuggins et al. |
| 9,259,831 B2 | 2/2016 | Boeck et al. |
| 9,259,832 B2 | 2/2016 | Miyazawa et al. |
| 9,261,171 B2 | 2/2016 | Doering |
| 9,262,254 B2 | 2/2016 | Bertosa et al. |
| 9,262,997 B2 | 2/2016 | Hamada et al. |
| 9,266,217 B2 | 2/2016 | Esenwein |
| 9,266,503 B2 | 2/2016 | Katou |
| 9,270,195 B2 | 2/2016 | Fujino et al. |
| 9,272,344 B2 | 3/2016 | Thomas |
| 9,272,347 B2 | 3/2016 | Holmes et al. |
| 9,274,465 B2 | 3/2016 | Samei et al. |
| 9,275,256 B2 | 3/2016 | Amanuma et al. |
| 9,276,509 B2 | 3/2016 | Kato et al. |
| 9,278,426 B2 | 3/2016 | Numata |
| 9,278,437 B2 | 3/2016 | Rakaczki et al. |
| 9,278,705 B2 | 3/2016 | Murata et al. |
| 9,281,770 B2 | 3/2016 | Wood et al. |
| 9,282,695 B2 | 3/2016 | Goto |
| 9,289,833 B2 | 3/2016 | Schmidt et al. |
| 9,290,078 B2 | 3/2016 | Ota et al. |
| 9,296,079 B2 | 3/2016 | Miwa et al. |
| 9,296,374 B2 | 3/2016 | Yamakado et al. |
| 9,302,329 B2 | 4/2016 | Rohr, Jr. |
| 9,302,405 B2 | 4/2016 | Rubens et al. |
| 9,302,406 B2 | 4/2016 | Kato et al. |
| 9,303,606 B2 | 4/2016 | Moreira Coletto et al. |
| 9,308,637 B2 | 4/2016 | Tsuchiya et al. |
| 9,308,638 B2 | 4/2016 | Kondo et al. |
| 9,308,916 B2 | 4/2016 | Buerkle et al. |
| 9,312,080 B2 | 4/2016 | Boeck et al. |
| 9,314,908 B2 | 4/2016 | Tanimoto et al. |
| 9,314,914 B2 | 4/2016 | Suda et al. |
| 9,314,916 B2 | 4/2016 | Tsuchiya |
| 9,318,729 B2 | 4/2016 | Ogura |
| 9,321,164 B2 | 4/2016 | Onoda et al. |
| 9,327,377 B2 | 5/2016 | Keller-Sornig et al. |
| 9,327,424 B2 | 5/2016 | Jönsson et al. |
| 9,330,465 B2 | 5/2016 | Schumacher |
| 9,330,858 B2 | 5/2016 | Boeck et al. |
| 9,331,625 B2 | 5/2016 | Stock et al. |
| 9,333,638 B2 | 5/2016 | Powell et al. |
| 9,333,669 B2 | 5/2016 | Okouchi et al. |
| 9,337,453 B2 | 5/2016 | Ogura et al. |
| 9,337,677 B2 | 5/2016 | Suzuki |
| 9,337,763 B2 | 5/2016 | Funabashi et al. |
| 9,339,878 B2 | 5/2016 | Fuchs et al. |
| 9,340,148 B2 | 5/2016 | Ehlgen et al. |
| 9,340,953 B2 | 5/2016 | Sakamoto et al. |
| 9,343,451 B2 | 5/2016 | Funatsu et al. |
| 9,343,986 B2 | 5/2016 | Kimura et al. |
| 9,345,168 B2 | 5/2016 | Suzuki et al. |
| 9,346,144 B2 | 5/2016 | Tan |
| 9,346,154 B2 | 5/2016 | Roehm |
| 9,346,157 B2 | 5/2016 | Morioka et al. |
| 9,346,356 B2 | 5/2016 | Hisatsugu |
| 9,352,460 B2 | 5/2016 | Steinke et al. |
| 9,358,624 B2 | 6/2016 | Bantle et al. |
| 9,358,677 B2 | 6/2016 | Kuhnle et al. |
| 9,359,937 B2 | 6/2016 | Ichihashi |
| 9,360,064 B2 | 6/2016 | Nadig et al. |
| 9,362,724 B2 | 6/2016 | Hansom et al. |
| 9,364,906 B2 | 6/2016 | Abe et al. |
| 9,364,927 B2 | 6/2016 | Bohn et al. |
| 9,364,944 B2 | 6/2016 | Aoki |
| 9,366,299 B2 | 6/2016 | Roehm |
| 9,367,062 B2 | 6/2016 | Volpert |
| 9,368,839 B2 | 6/2016 | Schumann et al. |
| 9,370,860 B2 | 6/2016 | Rieger et al. |
| 9,373,458 B2 | 6/2016 | Welke et al. |
| 9,375,795 B2 | 6/2016 | Oberheim |

(56) References Cited

U.S. PATENT DOCUMENTS

| | | |
|---|---|---|
| 9,375,832 B2 | 6/2016 | Boeck et al. |
| 9,379,560 B2 | 6/2016 | Brandner et al. |
| 9,395,257 B2 | 7/2016 | Li et al. |
| 9,537,335 B2 | 1/2017 | Furui et al. |
| 9,713,116 B2 | 6/2017 | Wible et al. |
| 9,722,334 B2 * | 8/2017 | Sterling ............... H02J 7/0048 |
| 9,746,860 B2 | 8/2017 | Sakaue et al. |
| 9,756,402 B2 | 9/2017 | Stampfl et al. |
| 9,780,583 B2 | 10/2017 | Furui et al. |
| 9,819,132 B2 | 11/2017 | Peloquin et al. |
| 10,595,384 B2 * | 3/2020 | Isaacs ................... H05B 47/19 |
| 10,838,407 B2 | 11/2020 | Dey, IV et al. |
| 2001/0017531 A1 | 8/2001 | Sakakibara et al. |
| 2001/0052416 A1 | 12/2001 | Wissmach et al. |
| 2002/0033267 A1 | 3/2002 | Schweizer et al. |
| 2002/0062991 A1 | 5/2002 | Earrant et al. |
| 2003/0009262 A1 | 1/2003 | Colangelo, II et al. |
| 2003/0030565 A1 | 2/2003 | Sakatani et al. |
| 2003/0043016 A1 | 3/2003 | Kady et al. |
| 2003/0058101 A1 | 3/2003 | Watanabe et al. |
| 2003/0121677 A1 | 3/2003 | Kady et al. |
| 2003/0062999 A1 | 4/2003 | Saleh et al. |
| 2003/0090239 A1 | 5/2003 | Sakakibara |
| 2004/0160212 A1 | 8/2004 | Mastaler et al. |
| 2004/0182587 A1 | 9/2004 | May et al. |
| 2004/0186613 A1 | 9/2004 | Balling |
| 2005/0011655 A1 | 1/2005 | Crowell et al. |
| 2005/0035659 A1 | 2/2005 | Hahn et al. |
| 2005/0126821 A1 | 6/2005 | Davies |
| 2005/0197093 A1 | 9/2005 | Wiklof et al. |
| 2006/0009879 A1 | 1/2006 | Lynch et al. |
| 2006/0076385 A1 | 4/2006 | Etter et al. |
| 2006/0087283 A1 | 4/2006 | Phillips et al. |
| 2007/0034394 A1 | 2/2007 | Gass et al. |
| 2007/0224492 A1 | 9/2007 | Scott et al. |
| 2007/0252675 A1 | 11/2007 | Lamar |
| 2007/0276513 A1 | 11/2007 | Sudo |
| 2008/0084334 A1 | 4/2008 | Ballew |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086497 A1 | 4/2008 | Wallace et al. |
| 2008/0086685 A1 | 4/2008 | Janky et al. |
| 2008/0135272 A1 | 6/2008 | Wallgren |
| 2008/0236220 A1 | 10/2008 | Calvet et al. |
| 2008/0252446 A1 | 10/2008 | Dammertz |
| 2008/0293446 A1 | 11/2008 | Rofougaran |
| 2008/0313452 A1 | 12/2008 | Qin et al. |
| 2009/0108806 A1 | 4/2009 | Takano et al. |
| 2009/0200053 A1 | 8/2009 | Scrimshaw et al. |
| 2009/0250364 A1 | 10/2009 | Gerold et al. |
| 2009/0251330 A1 | 10/2009 | Gerold et al. |
| 2009/0251880 A1 | 10/2009 | Anderson |
| 2009/0254203 A1 | 10/2009 | Gerold et al. |
| 2009/0273436 A1 | 11/2009 | Gluck et al. |
| 2010/0062326 A1 | 3/2010 | Konuma et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2010/0216415 A1 | 8/2010 | Arimura et al. |
| 2010/0282482 A1 | 11/2010 | Austin et al. |
| 2011/0015764 A1 | 1/2011 | Chen et al. |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0114345 A1 | 5/2011 | Schlesak et al. |
| 2011/0121782 A1 | 5/2011 | Marsh et al. |
| 2011/0132155 A1 | 6/2011 | Chiapuzzi |
| 2011/0162858 A1 | 7/2011 | Coste |
| 2011/0193789 A1 | 8/2011 | Lin |
| 2011/0309931 A1 | 12/2011 | Rose |
| 2012/0007748 A1 | 1/2012 | Forgues et al. |
| 2012/0035804 A1 | 2/2012 | Roberts |
| 2012/0052356 A1 | 3/2012 | Sugiura et al. |
| 2012/0111589 A1 | 5/2012 | Schmidt et al. |
| 2012/0167721 A1 | 7/2012 | Fluhrer |
| 2012/0168189 A1 | 7/2012 | Eckert |
| 2012/0187851 A1 | 7/2012 | Huggins et al. |
| 2012/0199372 A1 | 8/2012 | Nishikawa et al. |
| 2012/0234569 A1 | 9/2012 | Lawton et al. |
| 2012/0238119 A1 | 9/2012 | Rejman et al. |
| 2012/0267134 A1 | 10/2012 | Matthias et al. |
| 2012/0279736 A1 | 11/2012 | Tanimoto et al. |
| 2012/0292070 A1 | 11/2012 | Ito et al. |
| 2012/0302101 A1 | 11/2012 | Brotto et al. |
| 2012/0312570 A1 | 12/2012 | Wanek et al. |
| 2012/0325507 A1 | 12/2012 | Fluhrer et al. |
| 2013/0024245 A1 | 1/2013 | Nichols et al. |
| 2013/0035978 A1 | 2/2013 | Richardson et al. |
| 2013/0062086 A1 | 3/2013 | Ito et al. |
| 2013/0071815 A1 | 3/2013 | Hudson et al. |
| 2013/0076271 A1 | 3/2013 | Suda et al. |
| 2013/0087355 A1 | 4/2013 | Oomori et al. |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0154584 A1 | 6/2013 | Sakaue et al. |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0193891 A1 | 8/2013 | Wood et al. |
| 2013/0200831 A1 | 8/2013 | Nakano et al. |
| 2013/0204753 A1 | 8/2013 | Wallace |
| 2013/0255980 A1 | 10/2013 | Linehan et al. |
| 2013/0295426 A1 | 11/2013 | Halavart et al. |
| 2013/0304545 A1 | 11/2013 | Ballew et al. |
| 2013/0327552 A1 | 12/2013 | Lovelass et al. |
| 2013/0333910 A1 | 12/2013 | Tanimoto et al. |
| 2014/0006295 A1 | 1/2014 | Zeiler et al. |
| 2014/0008093 A1 | 1/2014 | Patel et al. |
| 2014/0015389 A1 | 1/2014 | Vatterott et al. |
| 2014/0069672 A1 | 3/2014 | Mashiko et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0149416 A1 | 5/2014 | Wallace |
| 2014/0151079 A1 | 6/2014 | Furui et al. |
| 2014/0158389 A1 | 6/2014 | Ito et al. |
| 2014/0159640 A1 | 6/2014 | Yoshikawa et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0240125 A1 | 8/2014 | Burch et al. |
| 2014/0266024 A1 | 9/2014 | Chinnadurai et al. |
| 2014/0284070 A1 | 9/2014 | Ng et al. |
| 2014/0292245 A1 | 10/2014 | Suzuki et al. |
| 2014/0316837 A1 | 10/2014 | Fosburgh et al. |
| 2014/0324194 A1 | 10/2014 | Larsson et al. |
| 2014/0326477 A1 | 11/2014 | Thorson et al. |
| 2014/0331829 A1 | 11/2014 | King et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0122523 A1 | 5/2015 | Yamamoto et al. |
| 2015/0122524 A1 | 5/2015 | Papp |
| 2015/0122526 A1 | 5/2015 | Bernardi et al. |

(56) References Cited

U.S. PATENT DOCUMENTS

| | | |
|---|---|---|
| 2015/0127205 A1 | 5/2015 | Brochhaus |
| 2015/0128429 A1 | 5/2015 | Tenzer et al. |
| 2015/0129810 A1 | 5/2015 | Nagy et al. |
| 2015/0130330 A1 | 5/2015 | Wolf |
| 2015/0130413 A1 | 5/2015 | Wierzchon |
| 2015/0135306 A1 | 5/2015 | Winkler et al. |
| 2015/0135541 A1 | 5/2015 | Ishikawa et al. |
| 2015/0135907 A1 | 5/2015 | Hirabayashi et al. |
| 2015/0137717 A1 | 5/2015 | Werner |
| 2015/0137721 A1 | 5/2015 | Yamamoto et al. |
| 2015/0141159 A1 | 5/2015 | Machida |
| 2015/0144366 A1 | 5/2015 | Machida |
| 2015/0144368 A1 | 6/2015 | Ishikawa et al. |
| 2015/0150488 A1 | 6/2015 | Saitou et al. |
| 2015/0151415 A1 | 6/2015 | Burger et al. |
| 2015/0151423 A1 | 6/2015 | Tenzer et al. |
| 2015/0155547 A1 | 6/2015 | Ishikawa et al. |
| 2015/0155597 A1 | 6/2015 | Kato |
| 2015/0158157 A1 | 6/2015 | Hirabayashi et al. |
| 2015/0158160 A1 | 6/2015 | Sinzig et al. |
| 2015/0158170 A1 | 6/2015 | Nitsche et al. |
| 2015/0158198 A1 | 6/2015 | Sgarz et al. |
| 2015/0160362 A1 | 6/2015 | Suzuki et al. |
| 2015/0162646 A1 | 6/2015 | Kawase et al. |
| 2015/0163962 A1 | 6/2015 | Padget |
| 2015/0165633 A1 | 6/2015 | Kannan et al. |
| 2015/0170848 A1 | 6/2015 | Eckl et al. |
| 2015/0171427 A1 | 6/2015 | Juretko et al. |
| 2015/0171654 A1 | 6/2015 | Horie et al. |
| 2015/0171692 A1 | 6/2015 | Juretko et al. |
| 2015/0175146 A1 | 6/2015 | Quirant et al. |
| 2015/0179036 A1 | 6/2015 | Heine et al. |
| 2015/0180307 A1 | 6/2015 | Inuzuka |
| 2015/0183106 A1 | 7/2015 | Schnell et al. |
| 2015/0188332 A1 | 7/2015 | Nakano et al. |
| 2015/0191096 A1 | 7/2015 | Becker et al. |
| 2015/0193924 A1 | 7/2015 | Schumacher |
| 2015/0194646 A1 | 7/2015 | Yoshinari et al. |
| 2015/0194647 A1 | 7/2015 | Yoshinari et al. |
| 2015/0196987 A1 | 7/2015 | Hayashi et al. |
| 2015/0198448 A1 | 7/2015 | Sanma et al. |
| 2015/0208142 A1 | 7/2015 | Gladigau et al. |
| 2015/0209948 A1 | 7/2015 | Hecht et al. |
| 2015/0209950 A1 | 7/2015 | Lutz et al. |
| 2015/0209951 A1 | 7/2015 | Lutz et al. |
| 2015/0213381 A1 | 7/2015 | Hagiwara |
| 2015/0214209 A1 | 7/2015 | Funatsu et al. |
| 2015/0214520 A1 | 7/2015 | Nishikawa et al. |
| 2015/0214857 A1 | 7/2015 | Kosuga et al. |
| 2015/0217422 A1 | 8/2015 | Esenwein |
| 2015/0217807 A1 | 8/2015 | Schumacher et al. |
| 2015/0220953 A1 | 8/2015 | Hagiwara et al. |
| 2015/0222205 A1 | 8/2015 | Suda |
| 2015/0223366 A1 | 8/2015 | Horiuchi et al. |
| 2015/0224588 A1 | 8/2015 | Kohl |
| 2015/0224895 A1 | 8/2015 | Morita et al. |
| 2015/0224988 A1 | 8/2015 | Buerkle et al. |
| 2015/0228940 A1 | 8/2015 | Fujisawa |
| 2015/0228943 A1 | 8/2015 | Umemura et al. |
| 2015/0229011 A1 | 8/2015 | Gless |
| 2015/0229256 A1 | 8/2015 | Forstner et al. |
| 2015/0231974 A1 | 8/2015 | Yunoue et al. |
| 2015/0236532 A1 | 8/2015 | Umemura |
| 2015/0239396 A1 | 8/2015 | Gijkokaj et al. |
| 2015/0239442 A1 | 8/2015 | Yamakado et al. |
| 2015/0245753 A1 | 9/2015 | Schuele et al. |
| 2015/0246435 A1 | 9/2015 | Wörz et al. |
| 2015/0249237 A1 | 9/2015 | Naito |
| 2015/0255773 A1 | 9/2015 | Yoshinari et al. |
| 2015/0256096 A1 | 9/2015 | Nishizawa et al. |
| 2015/0258703 A1 | 9/2015 | Steingruber et al. |
| 2015/0263579 A1 | 9/2015 | Sengiku et al. |
| 2015/0263592 A1 | 9/2015 | Kawakami et al. |
| 2015/0266170 A1 | 9/2015 | Weller |
| 2015/0268858 A1 | 9/2015 | Kondo et al. |
| 2015/0273645 A1 | 10/2015 | Steurer |
| 2015/0274139 A1 | 10/2015 | Okada et al. |
| 2015/0280468 A1 | 10/2015 | Müller et al. |
| 2015/0280476 A1 | 10/2015 | Osswald |
| 2015/0283685 A1 | 10/2015 | Kynast et al. |
| 2015/0283690 A1 | 10/2015 | Welte et al. |
| 2015/0283691 A1 | 10/2015 | Rubens et al. |
| 2015/0283694 A1 | 10/2015 | Goto et al. |
| 2015/0289451 A1 | 10/2015 | Koizumi et al. |
| 2015/0290789 A1 | 10/2015 | Ontl et al. |
| 2015/0290790 A1 | 10/2015 | Schomisch et al. |
| 2015/0290791 A1 | 10/2015 | Takahashi et al. |
| 2015/0293745 A1 | 10/2015 | Suzuki et al. |
| 2015/0298308 A1 | 10/2015 | Kato |
| 2015/0298311 A1 | 10/2015 | Meixner et al. |
| 2015/0298354 A1 | 10/2015 | Greitmann et al. |
| 2015/0298355 A1 | 10/2015 | Ohlendorf |
| 2015/0300614 A1 | 10/2015 | Tamura et al. |
| 2015/0302749 A1 | 10/2015 | Kitagawa |
| 2015/0303417 A1 | 10/2015 | Koeder et al. |
| 2015/0303458 A1 | 10/2015 | Guo et al. |
| 2015/0303848 A1 | 10/2015 | Beck |
| 2015/0303916 A1 | 10/2015 | Hernandez Blasco et al. |
| 2015/0305188 A1 | 10/2015 | Maeda et al. |
| 2015/0309640 A1 | 10/2015 | Vuckovic |
| 2015/0310258 A1 | 10/2015 | Omi |
| 2015/0311730 A1 | 10/2015 | Aradachi et al. |
| 2015/0316585 A1 | 11/2015 | Forstner |
| 2015/0318720 A1 | 11/2015 | Aradachi et al. |
| 2015/0318732 A1 | 11/2015 | Heine et al. |
| 2015/0318733 A1 | 11/2015 | Stock et al. |
| 2015/0318734 A1 | 11/2015 | Lohr et al. |
| 2015/0321266 A1 | 11/2015 | Sattler et al. |
| 2015/0321305 A1 | 11/2015 | Saur et al. |
| 2015/0321381 A1 | 11/2015 | Engelfried et al. |
| 2015/0324566 A1 | 11/2015 | Miura et al. |
| 2015/0324650 A1 | 11/2015 | Langenberg |
| 2015/0325826 A1 | 11/2015 | Verhaag et al. |
| 2015/0326098 A1 | 11/2015 | Hirata |
| 2015/0328694 A1 | 11/2015 | Hoop |
| 2015/0328695 A1 | 11/2015 | Hoop |
| 2015/0328701 A1 | 11/2015 | Kauz et al. |
| 2015/0328742 A1 | 11/2015 | Scuele et al. |
| 2015/0328762 A1 | 11/2015 | Padget et al. |
| 2015/0328763 A1 | 11/2015 | Ito et al. |
| 2015/0328764 A1 | 11/2015 | Yoshikane et al. |
| 2015/0328765 A1 | 11/2015 | Schubert |
| 2015/0328796 A1 | 11/2015 | Okouchi et al. |
| 2015/0332839 A1 | 11/2015 | Stock et al. |
| 2015/0333301 A1 | 11/2015 | Ota et al. |
| 2015/0333559 A1 | 11/2015 | Lohr et al. |
| 2015/0333664 A1 | 11/2015 | Bantle |
| 2015/0337521 A1 | 11/2015 | Sakamoto et al. |
| 2015/0340153 A1 | 11/2015 | Lohr et al. |
| 2015/0340894 A1 | 11/2015 | Horie et al. |
| 2015/0340921 A1 | 11/2015 | Suda et al. |
| 2015/0343539 A1 | 12/2015 | Hoop |
| 2015/0343617 A1 | 12/2015 | Kondo et al. |
| 2015/0345460 A1 | 12/2015 | Eichler et al. |
| 2015/0346914 A1 | 12/2015 | Ebi |
| 2015/0348696 A1 | 12/2015 | Lohr et al. |
| 2015/0349576 A1 | 12/2015 | Krupezevic et al. |
| 2015/0349577 A1 | 12/2015 | Breitenbach et al. |
| 2015/0349600 A1 | 12/2015 | Huber et al. |
| 2015/0349695 A1 | 12/2015 | Hosokawa et al. |
| 2015/0353064 A1 | 12/2015 | Spoeri et al. |
| 2015/0353889 A1 | 12/2015 | Wakao et al. |
| 2015/0355280 A1 | 12/2015 | Iwata |
| 2015/0357632 A1 | 12/2015 | Nishimura et al. |
| 2015/0357683 A1 | 12/2015 | Lohr et al. |
| 2015/0364099 A1 | 12/2015 | Shibuya |
| 2015/0364955 A1 | 12/2015 | Aumann |
| 2015/0366133 A1 | 12/2015 | Nojiri et al. |
| 2015/0367490 A1 | 12/2015 | Satou et al. |
| 2015/0367495 A1 | 12/2015 | Takeda |
| 2015/0367497 A1 | 12/2015 | Ito et al. |
| 2015/0367823 A1 | 12/2015 | Baenzler et al. |
| 2015/0372633 A1 | 12/2015 | Machida et al. |
| 2015/0375388 A1 | 12/2015 | Ullrich |

(56) References Cited

U.S. PATENT DOCUMENTS

| | | |
|---|---|---|
| 2015/0375416 A1 | 12/2015 | Haneda et al. |
| 2015/0379897 A1 | 12/2015 | Nadig et al. |
| 2015/0380945 A1 | 12/2015 | Krupezevic et al. |
| 2016/0006005 A1 | 1/2016 | Sakakibara |
| 2016/0006542 A1 | 1/2016 | Kaeriyama |
| 2016/0008893 A9 | 1/2016 | Tussing |
| 2016/0013514 A1 | 1/2016 | Yoshida et al. |
| 2016/0016240 A1 | 1/2016 | Koegel |
| 2016/0016241 A1 | 1/2016 | Taylor et al. |
| 2016/0020492 A1 | 1/2016 | Azami et al. |
| 2016/0020494 A1 | 1/2016 | Kamizori et al. |
| 2016/0023663 A1 | 1/2016 | Kajiwara |
| 2016/0027502 A1 | 1/2016 | Fujiwara |
| 2016/0028118 A1 | 1/2016 | Shimanuki et al. |
| 2016/0028123 A1 | 1/2016 | Kawasaki et al. |
| 2016/0031021 A1 | 2/2016 | Marinov et al. |
| 2016/0031212 A1 | 2/2016 | Kida |
| 2016/0043714 A1 | 2/2016 | Yanagigawa |
| 2016/0046011 A1 | 2/2016 | Ogle et al. |
| 2016/0046035 A1 | 2/2016 | Laghate et al. |
| 2016/0048122 A1 | 2/2016 | Lukosz et al. |
| 2016/0052119 A1 | 2/2016 | Yamada et al. |
| 2016/0056507 A1 | 2/2016 | Eberle |
| 2016/0065030 A1 | 3/2016 | Fujimoto |
| 2016/0067800 A1 | 3/2016 | Frolov et al. |
| 2016/0067802 A1 | 3/2016 | Frolov |
| 2016/0067859 A1 | 3/2016 | Rejman et al. |
| 2016/0067880 A1 | 3/2016 | Frolov |
| 2016/0072106 A1 | 3/2016 | Baumgartner et al. |
| 2016/0075007 A1 | 3/2016 | Kutsuna et al. |
| 2016/0076603 A1 | 3/2016 | Granacher |
| 2016/0079801 A1 | 3/2016 | Zhang et al. |
| 2016/0089757 A1 | 3/2016 | Wirnitzer et al. |
| 2016/0089810 A1 | 3/2016 | Padmanabhan et al. |
| 2016/0095487 A1 | 4/2016 | Koura et al. |
| 2016/0099606 A1 | 4/2016 | Zhang et al. |
| 2016/0101494 A1 | 4/2016 | Nagy |
| 2016/0101512 A1 | 4/2016 | Hecht et al. |
| 2016/0102762 A1 | 4/2016 | Brennenstuhl et al. |
| 2016/0107297 A1 | 4/2016 | Ishikawa et al. |
| 2016/0109896 A9 | 4/2016 | Shiraishi et al. |
| 2016/0114472 A1 | 4/2016 | Holubarsch et al. |
| 2016/0121466 A1 | 5/2016 | Kiyohara et al. |
| 2016/0121467 A1 | 5/2016 | Ng et al. |
| 2016/0121473 A1 | 5/2016 | Brennenstuhl et al. |
| 2016/0121477 A1 | 5/2016 | Zhang |
| 2016/0121513 A1 | 5/2016 | Mahoney |
| 2016/0126877 A1 | 5/2016 | Endoh |
| 2016/0129576 A1 | 5/2016 | Nishikawa et al. |
| 2016/0129582 A1 | 5/2016 | Ullrich |
| 2016/0136801 A1 | 5/2016 | Furusawa et al. |
| 2016/0144685 A1 | 5/2016 | Ochiai et al. |
| 2016/0144861 A1 | 5/2016 | Cao et al. |
| 2016/0146209 A1 | 5/2016 | Sakai |
| 2016/0149512 A1 | 5/2016 | Nakatsu et al. |
| 2016/0151845 A1 | 6/2016 | Yamamoto et al. |
| 2016/0151846 A1 | 6/2016 | Suzuki |
| 2016/0151905 A1 | 6/2016 | Tada et al. |
| 2016/0158929 A1 | 6/2016 | Brennenstuhl et al. |
| 2016/0162708 A1 | 6/2016 | Amanuma et al. |
| 2016/0167142 A1 | 6/2016 | Talesky et al. |
| 2016/0169365 A1 | 6/2016 | Hecht et al. |
| 2016/0170413 A1 | 6/2016 | Mueller |
| 2016/0171788 A1 | 6/2016 | Wenger et al. |
| 2016/0172641 A1 | 6/2016 | Zahn |
| 2016/0172722 A1 | 6/2016 | Rejman et al. |
| 2016/0173496 A1 | 6/2016 | Saka et al. |
| 2016/0175895 A1 | 6/2016 | Suzuki |
| 2016/0176064 A1 | 6/2016 | Okouchi et al. |
| 2016/0178398 A1 | 6/2016 | Krapf et al. |
| 2016/0181613 A1 | 6/2016 | Yuge et al. |
| 2016/0184948 A1 | 6/2016 | Padget et al. |
| 2016/0184952 A1 | 6/2016 | Kabza et al. |
| 2016/0184956 A1 | 6/2016 | Klabunde et al. |
| 2016/0184957 A1 | 6/2016 | Rubens |
| 2016/0184984 A1 | 6/2016 | Dresen et al. |
| 2016/0185003 A1 | 6/2016 | Padget |
| 2016/0185006 A1 | 6/2016 | Padget |
| 2016/0185167 A1 | 6/2016 | White et al. |
| 2016/0190531 A1 | 6/2016 | Neuberger et al. |
| 2016/0190858 A1 | 6/2016 | Zhang et al. |
| 2016/0273708 A1 | 9/2016 | Voong et al. |
| 2016/0311040 A1 | 10/2016 | Koegel |
| 2016/0311094 A1 | 10/2016 | Mergener et al. |
| 2016/0313868 A1 | 10/2016 | Weng et al. |
| 2016/0318109 A1 | 11/2016 | Koegel |
| 2016/0318204 A1 | 11/2016 | Truesdale et al. |
| 2016/0332244 A1 | 11/2016 | Koegel |
| 2016/0342151 A1 | 11/2016 | Dey, IV et al. |
| 2016/0375570 A1 | 12/2016 | Boeck et al. |
| 2017/0008159 A1 | 1/2017 | Boeck et al. |
| 2017/0051697 A1 | 2/2017 | Campbell |
| 2017/0100790 A1 | 4/2017 | Rubens et al. |
| 2018/0054032 A1 | 2/2018 | Peloquin et al. |
| 2020/0147771 A1 | 5/2020 | Mergener et al. |
| 2020/0253444 A1* | 8/2020 | Frank .................. A47L 9/2815 |

FOREIGN PATENT DOCUMENTS

| | | |
|---|---|---|
| DE | 19961374 A1 | 6/2001 |
| DE | 10029132 A1 | 1/2002 |
| DE | 10029138 A1 | 1/2002 |
| DE | 10309703 A1 | 9/2004 |
| DE | 202006014606 U1 | 1/2007 |
| EP | 1151821 A2 | 11/2001 |
| EP | 2147750 A1 | 1/2010 |
| FR | 2894505 A1 | 6/2007 |
| JP | H10151578 A | 6/1998 |
| JP | 2000176850 A | 6/2000 |
| JP | 2002260611 A | 9/2002 |
| JP | 2002358079 A | 12/2002 |
| JP | 4359018 B2 | 9/2003 |
| JP | 2004072563 A | 3/2004 |
| JP | 2004322262 A | 11/2004 |
| JP | 2005278375 A | 10/2005 |
| JP | 2006123080 A | 5/2006 |
| JP | 2006352559 A | 12/2006 |
| JP | 2009103073 A | 5/2009 |
| JP | 2010243429 A | 10/2010 |
| JP | 2011031313 A | 2/2011 |
| WO | WO9723986 A1 | 7/1997 |
| WO | WO0230624 A2 | 4/2002 |
| WO | WO2004003695 A2 | 1/2004 |
| WO | WO2004028749 A1 | 4/2004 |
| WO | WO2007090258 A1 | 8/2007 |
| WO | WO2012132040 A1 | 10/2012 |
| WO | WO2013116303 A1 | 8/2013 |
| WO | WO2015195615 A1 | 12/2015 |
| WO | WO2016085862 A1 | 6/2016 |
| WO | WO2016085910 A1 | 6/2016 |
| WO | WO2016089764 A1 | 6/2016 |
| WO | WO2016094532 A1 | 6/2016 |

OTHER PUBLICATIONS

European Patent Office Search Report for Application No. 17152521.5 dated May 30, 2017 (7 pages).

United States Patent Office Action For U.S. Appl. No. 15/030,756 dated Nov. 30, 2017 (17 pages).

United States Patent Office Action For U.S. Appl. No. 15/868,116 dated Mar. 22, 2018 (19 pages).

United States Patent Office Action For U.S. Appl. No. 15/833,356 dated Apr. 2, 2018 (11 pages).

Dewalt, "Tool Connect," screen shots from phone APP, representative filed with IDS was reviewed at least as early as Mar. 17, 2021 (18 pages).

* cited by examiner

Adaptive Controls

Tek Screw

| Steel Gauge | Screw Length | Screw Size | Head |
|---|---|---|---|
| 20 (Struct..) | 3/8" | #6 | |
| 20 (Dryw..) | 1/2" | #7 | |
| 20 (Dimple..) | 5/8" | #8 | Hex |
| 22 | 3/4" | #9 | #2 Oval |
| 24 | 7/8" | #10 | #2 Flat |
| 26 | 1" | #12 | #2 Pan |
| 27 | 1 1/8" | #14 | |

FIG. 32

POWER TOOL COMMUNICATION SYSTEM

RELATED APPLICATIONS

The present application is a continuation of U.S. patent application Ser. No. 16/747,389, filed Jan. 20, 2020, which is a continuation of U.S. patent application Ser. No. 16/246,017, filed Jan. 11, 2019, now U.S. Pat. No. 10,569,398, which is a continuation of U.S. patent application Ser. No. 15/833,356, filed Dec. 6, 2017, now U.S. Pat. No. 10,213,908, which is a continuation of U.S. patent application Ser. No. 15/030,756, filed Apr. 20, 2016, now U.S. Pat. No. 10,131,042, which is a national stage filing under 35 U.S.C. § 371 of International Application No. PCT/US2014/061651, filed on Oct. 21, 2014, which claims priority benefit to U.S. Provisional Application No. 61/893,765, filed Oct. 21, 2013, the entire contents of all of which are hereby incorporated by reference.

BACKGROUND

The present invention relates to enabling communication with power tools and power tool devices.

SUMMARY

In one embodiment, the invention provides an adapter for a power tool. The adapter includes a housing, a tool-side connector supported by the housing and configured to couple to a power tool or a charger, and a battery-side connector supported by the housing and configured to couple to a battery pack. The battery-side connector is in electrical communication with the tool-side connector. The adapter also includes a communication interface supported by the housing and configured to couple with an external device, and a controller. The communication interface is in electrical communication with the tool-side connector and the battery-side connector. The controller is supported by the housing and coupled to the tool-side connector, the battery-side connector, and the communication interface. The controller is configured to determine a state of the power tool. The state of the power tool is one of an active state in which an actuator of the power tool is in operation or an idle state during which the actuator is idle. The controller is also configured to operate in a data transmission mode, in which the adapter exchanges data between the external device and one of the power tool or the battery pack when the power tool is in the idle state, operate in a pass-through mode, in which the adapter transfers power from the battery pack to the power tool when the power tool is in the active state, and switch between the data transmission mode and the pass-through mode based on the state of the power tool.

In another embodiment, the invention provides a method of operating a power tool including an adapter. The adapter includes a tool-side connector configured to couple to the power tool, a battery-side connector configured to couple to a battery pack, and a communication interface configured to couple with an external device. The power tool is in one of an active state or an idle state. The method includes determining, by the adapter, whether the power tool is in the active state or the idle state, exchanging data between the external device and one of the power tool or the battery pack when the power tool is in the idle state, and transferring, by the tool-side connector and the battery-side connector, electrical power from the battery pack to the power tool when the power tool is in the active state. The method further includes switching between transferring electrical power and exchanging data based on the state of the power tool. During the active state, a motor of the power tool is in operation and during the idle state, the motor is idle.

In another embodiment, the invention provides an adapter for a power tool. The adapter includes a housing having a first side, a second side opposite the first side, and a sidewall connecting the first side and the second side. The sidewall is substantially perpendicular to the first side and the second side. The adapter also includes a tool-side connector supported by the housing and positioned on the first side of the housing. The tool-side connector is configured to couple to the power tool. The adapter further includes a latching mechanism supported by the housing, and positioned on the first side of the housing, a battery-side connector, and a port. The latching mechanism is configured to secure the adapter to the power tool. The battery-side connector is supported by the housing and positioned on the second side of the housing. The battery-side connector is configured to couple to a battery pack. The port is supported by the housing and positioned on the sidewall of the housing. The port is configured to couple with an external device.

Other aspects of the invention will become apparent by consideration of the detailed description and accompanying drawings.

BRIEF DESCRIPTION OF THE DRAWINGS

FIGS. 30-36 illustrate exemplary graphical user interfaces generated by an external device.

DETAILED DESCRIPTION

Figure 1:
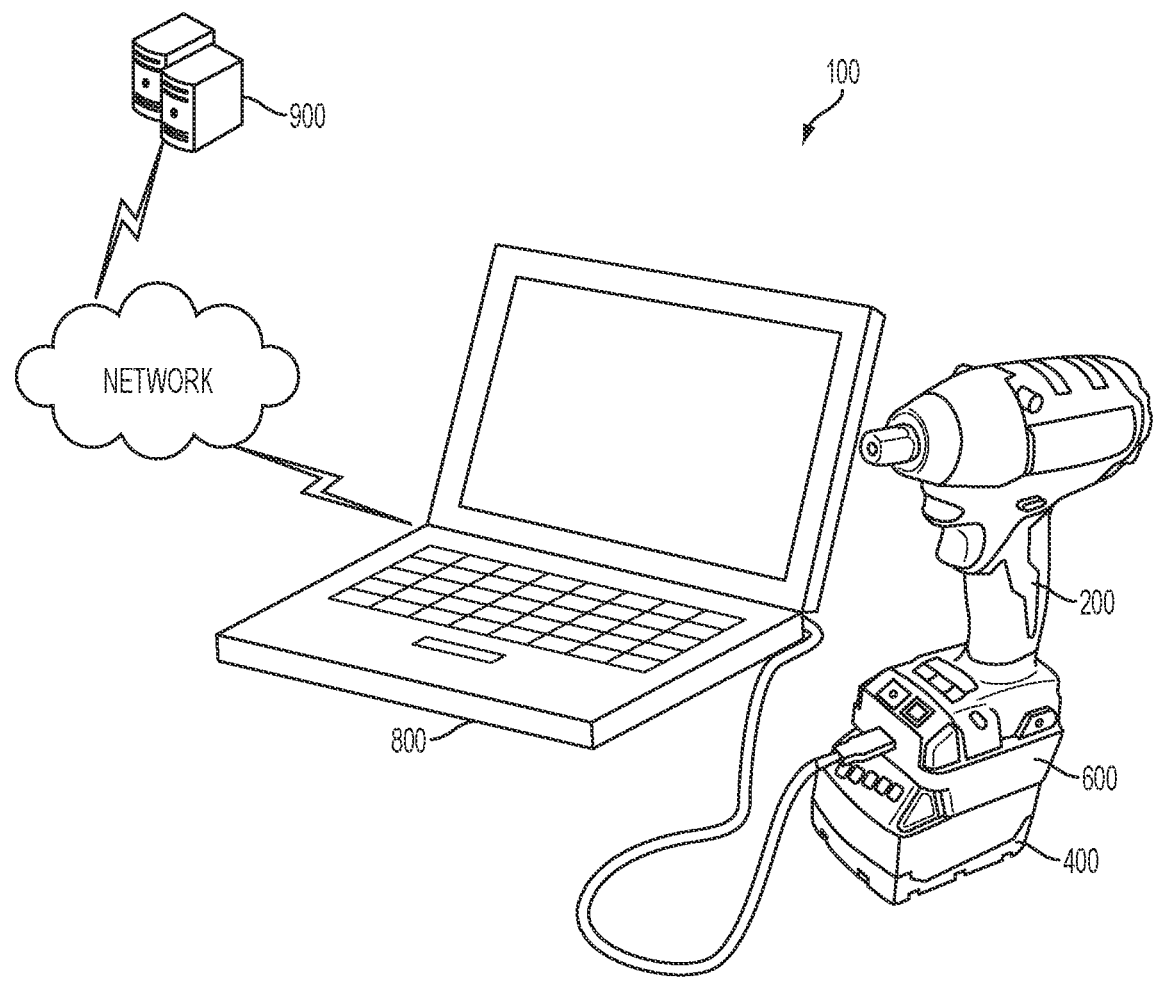
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a first communication system 100 that includes, among other things, a power tool 200, a power tool battery pack 400, an adapter 600, and an external device 800. The power tool is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool. The power tool 200 includes a drive device 210 and a motor 214 (see FIGS. 2 and 3). The motor 214 actuates the drive device 210 and allows the drive device 210 to perform the particular task. The battery pack 400 provides electrical power to the power tool 200 to energize the motor 214. In some embodiments, the battery pack 400 is coupled directly to the power tool 200 to provide electrical power to the power tool 200. In the illustrated embodiment, however, the adapter 600 is coupled between the power tool 200 and the battery pack 400. The adapter 600 creates a connection between the power tool 200 and the external device 800 and between the battery pack 400 and the external device 800. The adapter 600 therefore allows the power tool 200 and the battery pack 400 to communicate and exchange data with the external device 800.

Using the external device 800, a user can access stored power tool usage or power tool maintenance data. With this tool data, a user can determine how the power tool 200 has been used, whether maintenance is recommended or has been performed in the past, and identify malfunctioning components or other reasons for certain performance issues. The external device 800 also allows a user to set operational parameters, safety parameters, select tool modes, and the like for the power tool 200 or the battery pack 400.

The external device 800 may be, for example, a laptop computer, a tablet computer, a smartphone, a cellphone, or another electronic device capable of communicating with the adapter 600 and providing a user interface. The external device 800 includes a communication interface that is compatible with the adapter 600. The communication interface of the external device 800 may include a USB port, a micro USB port, another suitable power and/or data port, a wireless communication module (e.g., a Bluetooth® module), or a combination thereof. The external device 800, therefore, grants the user access to data related to the power tool 200, the battery pack 400, or another power tool device (e.g., a charger), and provides a user interface such that the user can interact with the controller of the power tool 200, the battery pack 400, or another power tool device.

In addition, as shown in FIG. 1, the external device 800 can also share the information obtained from the power tool 200, the battery pack 400, or another power tool device with a remote server 900. The remote server 900 may be used to store the data obtained from the external device 800, provide additional functionality and services to the user, or a combination thereof. In one embodiment, storing the information on the remote server 900 allows a user to access the information from a plurality of different locations. In another embodiment, the remote server 900 may collect information from various users regarding their power tool devices and provide statistics or statistical measures to the user based on information obtained from the different power tools. For example, the remote server 900 may provide statistics regarding the experienced efficiency of the power tool 200 or battery pack 400, typical usage of the power tool 200, and other relevant characteristics and/or measures of the power tool 200 or the battery pack 400.

Figure 2:
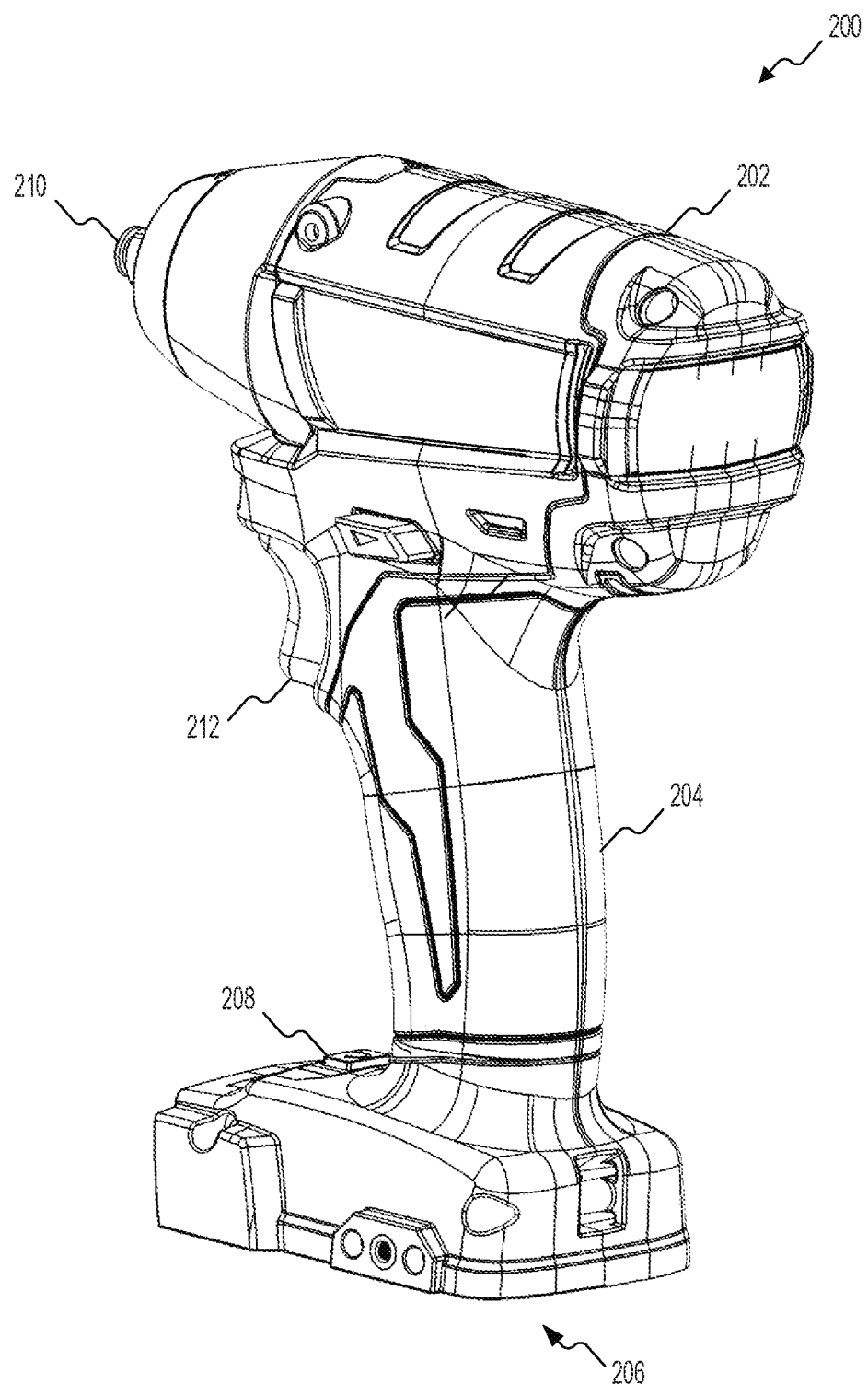
FIG. 2 illustrates a power tool of the communication system of FIG. 1.

Although the power tool 200 illustrated and described herein is an impact wrench, embodiments of the invention similarly apply to and can be used in conjunction with a variety of power tools (e.g., a power drill, a hammer drill, a pipe cutter, a sander, a nailer, a grease gun, etc.). As shown in FIG. 2, the power tool 200 includes an upper main body 202, a handle 204, a device receiving portion 206, selection switches 208, an output drive device or mechanism 210, and a trigger 212. The housing of the power tool 200 (e.g., the main body 202 and the handle 204) are composed of a durable and light-weight plastic material. The drive device 210 is composed of a metal (e.g., steel). The drive device 210 on the power tool 200 is a socket. However, each power tool 200 may have a different drive device 210 specifically designed for the task associated with the power tool 200. For example, the drive device for a power drill may include a bit driver, while the drive device for a pipe cutter may include a blade. The selection switches 208 are configured to select the speed and/or torque for the power tool 200. For embodiments in which the power tool 200 is different than the impact wrench 200, the selection switches 208 may be used to set other parameters such as, for example, crimping pressures for crimpers.

The device receiving portion 206 is configured to receive and couple to the battery pack 400, the adapter 600, or another power tool device with a compatible connector. The device receiving portion 206 includes a device interface 222 (see FIGS. 3 and 4) that allows the power tool 200 to be in mechanical and electrical communication with the battery pack 400, the adapter 600, or another power tool device. As shown in FIG. 4, the device receiving portion 206 also includes notches 207 to engage a mechanism that secures the battery pack 400, the adapter 600, or another power tool device to the power tool 200. In the embodiment of FIG. 1, the device interface 222 is coupled to the adapter 600. In other embodiments, the device interface 222 is coupled directly to the battery pack 400.

In the illustrated embodiment, the trigger 212 extends partially down a length of the handle 204; however, in other embodiments the trigger 212 extends down the entire length of the handle 204 or may be positioned elsewhere on the power tool 200. The trigger 212 is moveably coupled to the handle 204 such that the trigger 212 moves with respect to the tool housing. The trigger 212 is coupled to a push rod, which is engageable with a trigger switch 213 (see FIG. 3). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the electrical trigger switch 213.

Figure 3:
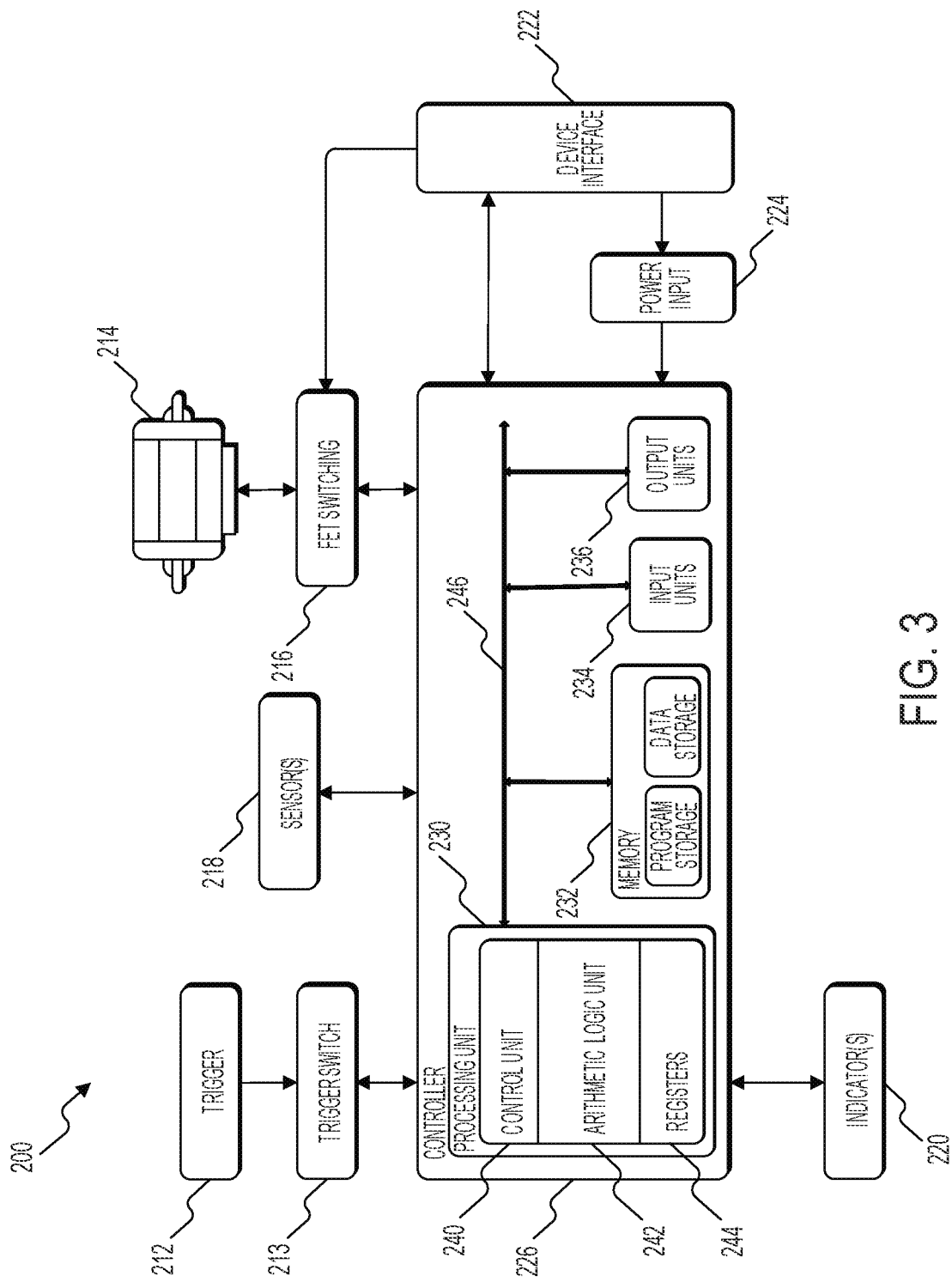
FIG. 3 illustrates a schematic diagram of the power tool.
Figure 4:
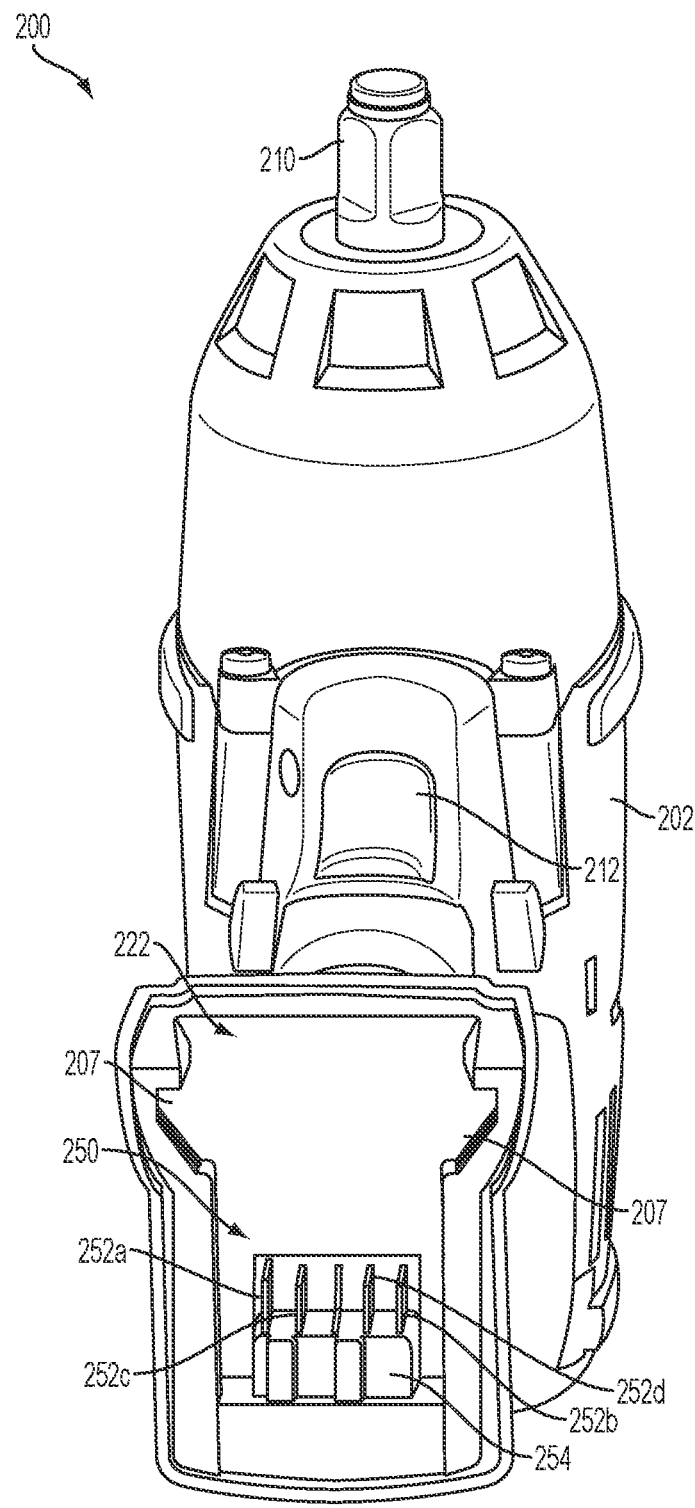
FIG. 4 is a bottom perspective view of the power tool.

As shown in FIG. 3, the power tool 200 also includes the motor 214, a switching network 216, sensors 218, indicators 220, the device interface 222, a power input unit 224, and a controller 226. The device interface 222 is coupled to the controller 226 and couples to the battery pack 400, the adapter 600, or another power tool device. The device interface 222 includes a combination of mechanical (e.g., the device receiving portion 206) and electrical components configured to and operable for interfacing (e.g., mechanically, electrically, and communicatively connecting) the power tool 200 with a battery pack 400, the adapter 600, or another power tool device.

As shown in FIG. 4, the device interface 222 includes a terminal assembly 250. The number of terminals included in the terminal assembly 250 can vary based on the type of power tool 200. As an illustrative example, however, the terminal assembly 250 includes four male blade terminals 252a, 252b, 252c, 252d extending beyond the tool housing. The four male blade terminals 252a-d are connected to the power tool 200 through a terminal block 254. The terminals 252a-d on the power tool 200 are generally exposed to the surrounding environment unless the power tool 200 is connected to the battery pack 400, the adapter 600, or another power tool device. When the terminals 252a-d are connected to at least one of the battery pack 400, the adapter 600, or another power tool device, the terminals 252a-d are covered by the connected device.

The four male blade terminals 252a-d, include a power positive ("B+") terminal 252a, a power negative ("B−") terminal 252b, a first communication terminal 252c, and a second communication terminal 252d. The power positive terminal 252a and the power negative terminal 252b are configured to connect to power terminals on the battery pack 400 or on the adapter 600. The power tool 200 does not include an internal power supply for driving the motor 214 or powering the controller 226. Rather, the power tool 200 receives power through the power terminals 252a-b.

The first communication terminal 252c and the second communication terminal 252d exchange information with the battery pack 400, the adapter 600, or another connected power tool device. For example, the power tool 200 communicates to the battery pack 400 through the first communication terminal 252c and/or the second communication terminal 252d when the power tool 200 is ready to receive electrical power to energize the motor 214. The power tool 200 is also configured to determine certain characteristics of the battery pack 400 based on the signals exchanged over the first communication terminal 252c and/or the second communication terminal 252d. For example, the communication terminals 252c-d can be used by the battery pack 400 or the power tool 200 to identify the other of the battery pack 400 or the power tool 200. For example, the power tool 200 can identify the battery pack 400 as a high capacity battery pack or a normal capacity battery pack, as a lithium-based battery or a nickel-based battery, as a battery pack having a particular voltage, a higher resistance battery pack, a lower resistance battery pack, etc.

The battery pack 400 can also receive identification information from the power tool 200 through the first and/or second communication terminals 252c-d. For example, the battery pack 400 can identify the power tool 200 as a hammer drill, a drill/wrench, an impact wrench, a brushless power tool, a brushed power tool, a higher resistance power tool (e.g., capable of lower power output), a lower resistance power tool (e.g., capable of higher power output), etc.

The power tool 200 is also configured to exchange data with the adapter 600 through the first communication terminal 252c and the second communication terminal 252d. The power tool 200 can be queried for and export data or information regarding power tool usage, specific parameters utilized to monitor the power tool 200, specific modes stored within the power tool 200, and/or maintenance data regarding the power tool 200. The power tool 200 can also receive through the first and second communication terminals 252c-d new configuration and/or programming information from the adapter 600. For example, the adapter 600 may upload software implementing alternate algorithms to control operation of the motor 214, or algorithms for protecting different power tool circuitry.

The device interface 222 is coupled to the power input unit 224. The device interface 222 transmits the power received through the power terminals 252a-b to the power input unit 224. The power input unit 224 includes combinations of active and passive components to regulate or control the power received through the device interface 222 and to the controller 226. For instance, the power input 224 may receive 18V from the device interface 222 and output 5V to the controller 226. When the device interface 222 is connected to the battery pack 400, the power input unit 224 receives power directly from the battery pack 400. When the device interface 222 is connected to the adapter 600, the power input unit 224 receives power through the adapter 600. The adapter 600 may receive power from the battery pack 400 when the battery pack 400 is connected to the adapter 600 or from the external device 800 when the external device 800 is coupled to the adapter 600. In some situations, the adapter 600 may be coupled to both the battery pack 400 and the external device 800. In such situations, the adapter 600 may select whether to provide electrical power from the battery pack 400, the external device 800, or a combination thereof.

The controller 226 is also coupled to the trigger switch 213 to receive an activation signal from the trigger 212. In the illustrated embodiment, the trigger switch 213 is a push-button electrical switch positioned within the handle 204. The trigger switch 213 includes a push button and electrical contacts. When the push button is activated, such as by the push rod discussed above, the electrical contacts are in a CLOSED position. Generally, when the electrical contacts are in the CLOSED position, electrical current is supplied from the device interface 222 to the motor 214, via the switching network 216. When the push button is not activated, the electrical contacts are in the OPEN position. When the electrical contacts are in the OPEN position, electrical current is not supplied from the device interface 222 to the motor 214. Although the trigger switch 213 is illustrated as a push-button electrical switch with contacts, other types of electrical switches may be used in addition to or in place of the push-button electronic switch. For instance, the trigger switch 213 may include sensors to detect the amount of trigger pull (e.g., released, 20% pull, 50% pull, 75% pull, or fully depressed). In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous FETs, bipolar transistors, or other types of electrical switches.

The sensors 218 are coupled to the controller 226 and communicate to the controller 226 various signals indicative of different parameters of the power tool 200 or the motor 214. The sensors 218 include, for example, one or more current sensors, one or more voltage sensors, one or more temperature sensors, one or more speed sensors, one or more Hall Effect sensors, etc. For example, the speed of the motor 214 can be determined using a plurality of Hall Effect sensors to sense the rotational position of the motor 214. In some embodiments, the controller 226 controls the switching network 216 in response to signals received from the sensors 218. For example, if the controller 226 determines that the speed of the motor 214 is increasing too rapidly based on information received from the sensors 218, the controller 226 may adapt or modify the active switches or switching sequence within the switching network 216 to reduce the speed of the motor 214.

The indicators 220 are also coupled to the controller 226 and receive control signals from the controller 226 to turn on and off or otherwise convey information based on different states of the power tool 200. The indicators 220 include, for example, one or more light-emitting diodes ("LED"), or a display screen. The indicators 220 can be configured to display conditions of, or information associated with, the power tool 200. For example, the indicators 220 are configured to indicate measured electrical characteristics of the power tool 200, the status of the power tool 200, etc. The indicators 220 may also include elements to convey information to a user through audible or tactile outputs.

As described above, the controller 226 is electrically and/or communicatively connected to a variety of modules or components of the power tool 200. In some embodiments, the controller 226 includes a plurality of electrical and electronic components that provide power, operational control, and protection to the components and modules within the controller 226 and/or power tool 200. For example, the controller 226 includes, among other things, a processing unit 230 (e.g., a microprocessor, a microcontroller, or another suitable programmable device), a memory 232, input units 234, and output units 236. The processing unit 230 includes, among other things, a control unit 240, an arithmetic logic unit ("ALU") 242, and a plurality of registers 244 (shown as a group of registers in FIG. 3), and is implemented using a known computer architecture, such as a modified Harvard architecture, a von Neumann architecture, etc. The processing unit 230, the memory 232, the input units 234, and the output units 236, as well as the various modules connected to the controller 226 are connected by one or more control and/or data buses (e.g., common bus 246). The control and/or data buses are shown generally in FIG. 3 for illustrative purposes. In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 200 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232. The controller 226 also stores on the memory 232 information regarding the usage of the power tool 200, information regarding the maintenance of the power tool 200, power tool trigger event information, and other information relevant to operating or maintaining the power tool 200. Such power tool information may then be accessed by a user with the external device 800 through the adapter 600. In other constructions, the controller 226 includes additional, fewer, or different components.

At a given point in time, the power tool 200 may be in an active state or an idle state. The idle state refers to a state of the power tool 200 during which the power tool 200 is not performing the task associated with the power tool 200. In contrast, the active state refers to when the power tool 200 is actively performing the associated task.

The state of the power tool 200 can be determined in different ways. For example, in some embodiments, the state of the power tool 200 is determined based on the position of the trigger 212. In such embodiments, the power tool 200 is determined to be in the active state when the trigger 212 is depressed. The power tool 200 is determined to be in the idle state when the trigger 212 is not depressed by the user.

In other embodiments, the state of the power tool can be determined based on the output signals from the sensors 218. In such embodiments, the power tool 200 is determined to be in the active state when the sensors 218 indicate that the motor 214 is in motion (i.e., the motor 214 is energized). The power tool 200 is determined to be in the idle state when the sensors 218 indicate that the motor 214 is stationary (i.e., the motor 214 is not energized). Additionally, or alternatively, the state of the power tool 200 can be determined based on the state of the electrical switches in the switching network 216 or from the output signals from the controller 226 to the switching network 216. When the switches in the switching network 216 are off or inactive, the state of the power tool 200 is determined to be idle. When the switches in the switching network 216 are on or active, the state of the power tool 200 is determined to be active. The state of the power tool can also be determined in other ways not explicitly described above. Additionally, the state of the power tool can also be determined by a combination or combinations of the techniques described above and those not explicitly described above.

Figure 5:
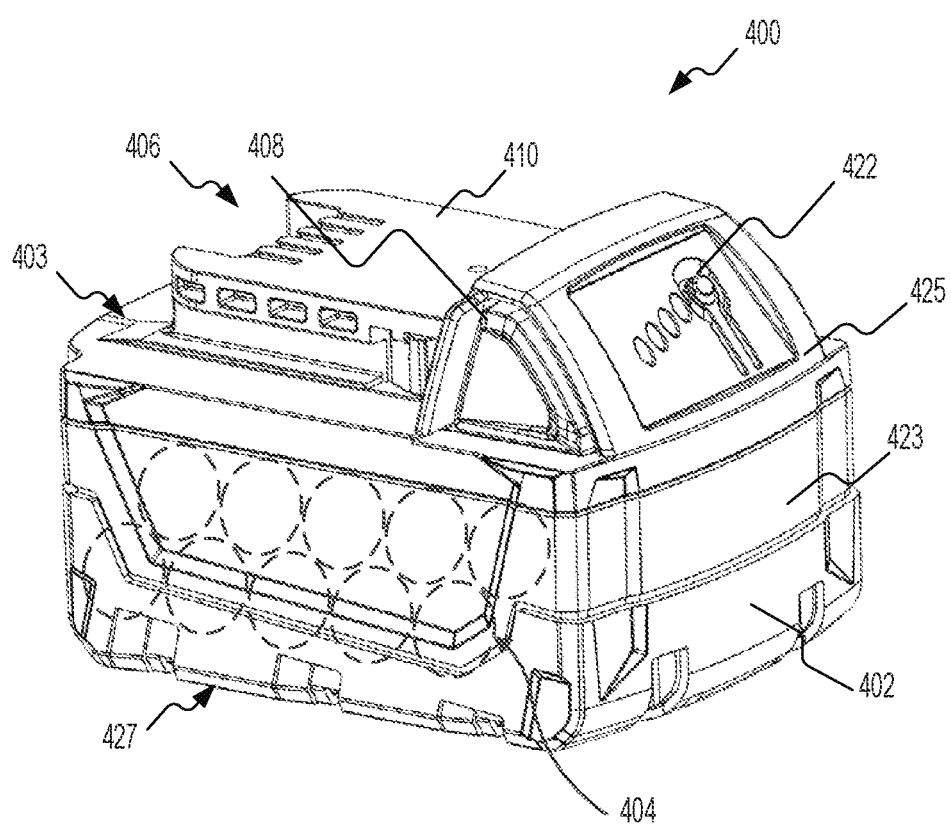
FIG. 5 is a perspective view of a battery pack of the communication system of FIG. 1.
Figure 6:
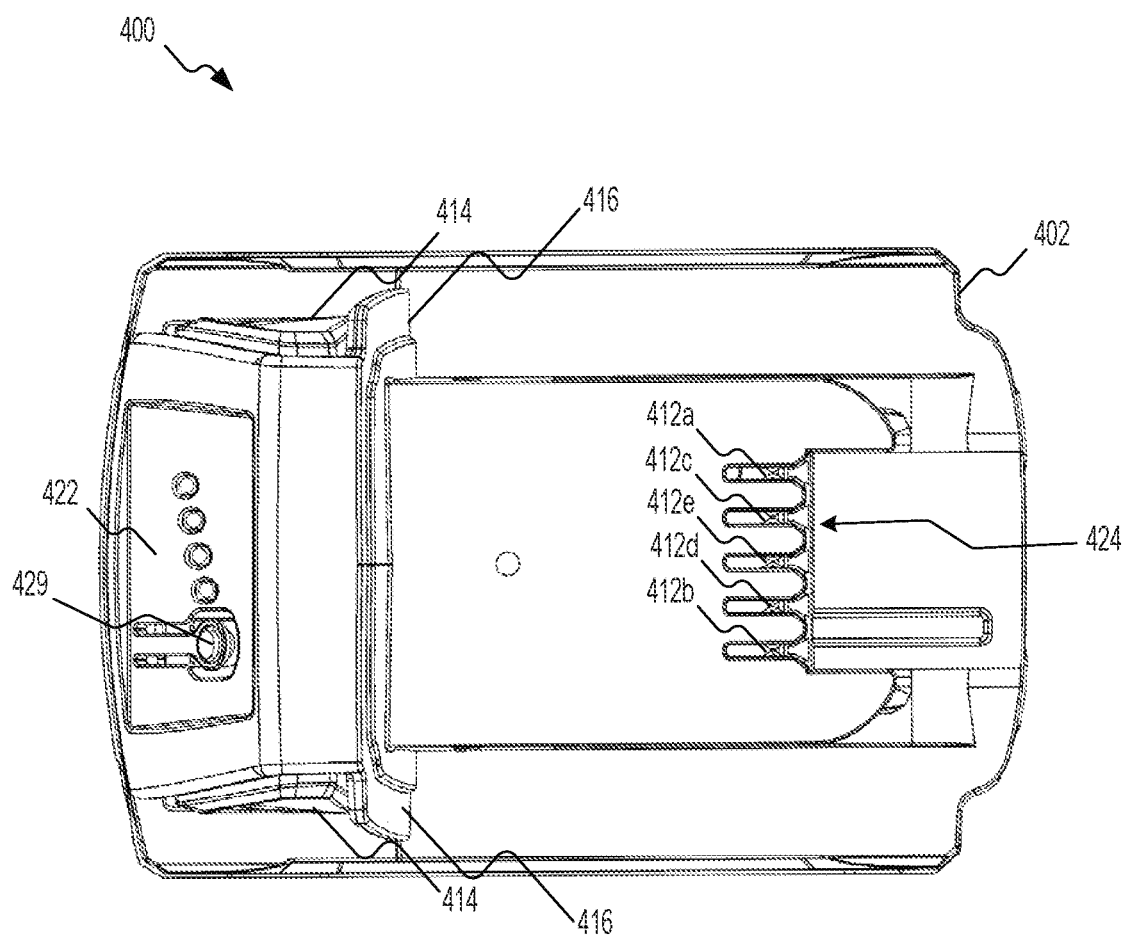
FIG. 6 is a top view of the battery pack.

The battery pack 400 is connectable to and supportable by the power tool 200 and the adapter 600. As shown in FIGS. 5 and 6, the battery pack 400 includes a housing 402, at least one rechargeable battery cell 404 supported by the housing 402, and a fuel gauge 422. The housing 402 includes a support portion 406 on a top side 403 of the housing. The support portion 406 supports the battery pack 400 and couples the battery pack 400 to the power tool 200, the adapter 600 or another power tool device (e.g., a charger). The support portion 406 includes a coupling mechanism 408 and a power interface 424 (see FIG. 6). The coupling mechanism 408 allows the battery pack 400 to releasably couple to the power tool 200, the adapter 600, or another power tool device. In the illustrated embodiment, the support portion 406 is connectable (mechanically, electrically, and/or communicatively) to the device receiving portion 206 on the power tool 200. The support portion 406 is also connectable to the adapter 600.

The battery pack 400 is removably and interchangeably connected to the power tool 200, the adapter 600, and other power tool devices through the coupling mechanism 408. The coupling mechanism 408 includes a pair of actuators 414 and a pair of tabs 416. One of the actuators 414 and one of the tabs 416 are shown in FIG. 5, and the other actuator 414 and tab 416 are disposed on an opposite side of the battery pack 400 in a similar arrangement. The coupling mechanism 408 releasably secures the battery pack 400 to the power tool 200, the adapter 600, or another power tool device. Each tab 416 engages a corresponding recess formed in the device receiving portion 206 of the power tool 200 or a similar structure in the adapter 600 to secure the battery pack 400. The tabs 416 are normally biased away from the housing 402 (i.e., away from each other) by springs inside the housing 402. Actuating (e.g., depressing) the actuators 414 inwards moves the tabs 416 toward the housing 402 (i.e., toward each other) and out of engagement with the recesses such that the battery pack 400 may be pulled out away from the power tool 200, the adapter 600, or another connected power tool device. In some embodiments, a single tab and actuator are included in the battery pack 400.

The illustrated battery pack 400 includes ten battery cells 404. In other embodiments, the battery pack 400 can have more or fewer battery cells 404. The battery cells 404 can be arranged in series, parallel, or a series-parallel combination. For example, in the illustrated embodiment, the battery pack 400 includes a total of ten battery cells 404 configured in a series-parallel arrangement of two sets of five series-connected cells 404. The series-parallel combination of battery cells 404 allows for an increased voltage and an increased capacity of the battery pack 400. In some embodiments, the battery pack 400 includes a single set of five series-connected battery cells 404. In other embodiments, the battery pack 400 includes a different number of battery cells 404 (e.g., between 3 and 12 battery cells) connected in series, parallel, or a series-parallel combination in order to produce a battery pack 400 having a desired combination of nominal battery pack voltage and battery capacity.

In the illustrated embodiment, the battery cells 404 are lithium-based battery cells having a chemistry of, for example, lithium-cobalt ("Li—Co"), lithium-manganese ("Li—Mn"), or Li—Mn spinel. In some embodiments, the battery cells 404 have other suitable lithium or lithium-based chemistries, such as a lithium-based chemistry that includes manganese, etc. The battery cells 404 within the battery pack 400 provide operational power (e.g., voltage and current) to the power tool 200. In one embodiment, each battery cell 404 has a nominal voltage of approximately 3.6V, such that the battery pack 400 has a nominal voltage of approximately 18V. In other embodiments, the battery cells 404 have different nominal voltages, such as, for example, between 3.6V and 4.2V, and the battery pack 400 has a different nominal voltage, such as, for example, 10.8V, 12V, 14.4V, 24V, 28V, 36V, between 10.8V and 36V, etc. The battery cells 404 also have a capacity of, for example, approximately between 1.0 ampere-hours ("Ah") and 5.0 Ah. In exemplary embodiments, the battery cells 404 have capacities of approximately, 1.5 Ah, 2.4 Ah, 3.0 Ah, 4.0 Ah, between 1.5 Ah and 5.0 Ah, etc. The battery cells 404 are also arranged to provide an efficient use of space and to maintain a relatively small pack size.

As shown in FIGS. 5 and 6, the fuel gauge 422 is positioned on a sidewall of the housing 402. In the illustrated embodiment, the fuel gauge 422 is positioned on a front sidewall, such that when the battery pack 400 is coupled to the power tool 200 or another power tool device, the fuel gauge 422 faces the front of the power tool 200 (i.e., toward the drive device 210 of the power tool 200). The front sidewall of the housing 402 includes a first (perpendicular) surface 423 and a second (angled) surface 425. As shown in FIG. 5, the first surface 423 is generally perpendicular to the top side 403 of the housing 402. The second surface 425 is positioned adjacent and between the first surface 423 and the top side 403 of the housing 402, and at an oblique angle of approximately 30° with respect to the top side 403 and a bottom side 427 of the housing 402. The second surface 425, in some embodiments, is positioned at a different oblique angle with respect to the top side 403 or the bottom side 427, such as an angle between 15° and 45°, 25° and 65°, 25° and 45°, 45° and 65°, or 15° and 75°. In the illustrated embodiment, the fuel gauge 422 is positioned on the second surface 425. This positioning allows the fuel gauge 422 to be easily accessible (e.g., visible) to the user. When the power tool 200 is coupled to the battery pack 400, looking forward toward the power tool 200 allows a user to determine the charge state of the battery pack 400 via the fuel gauge 422.

The fuel gauge 422 provides visible indications to the user regarding the state of charge of the battery cells 404. The fuel gauge 422 includes, for example, one or more indicators, such as light-emitting diodes ("LEDs"). The fuel gauge 422 is coupled to and controlled by the controller 420 to display conditions of, or information associated with, the state-of-charge of the battery cells 404. The fuel gauge 422 may include a pushbutton 427. The controller 420 detects depression of the pushbutton 427 and, in response, causes the fuel gauge 422 to display the state of charge information for a predetermined period of time.

Figure 7:
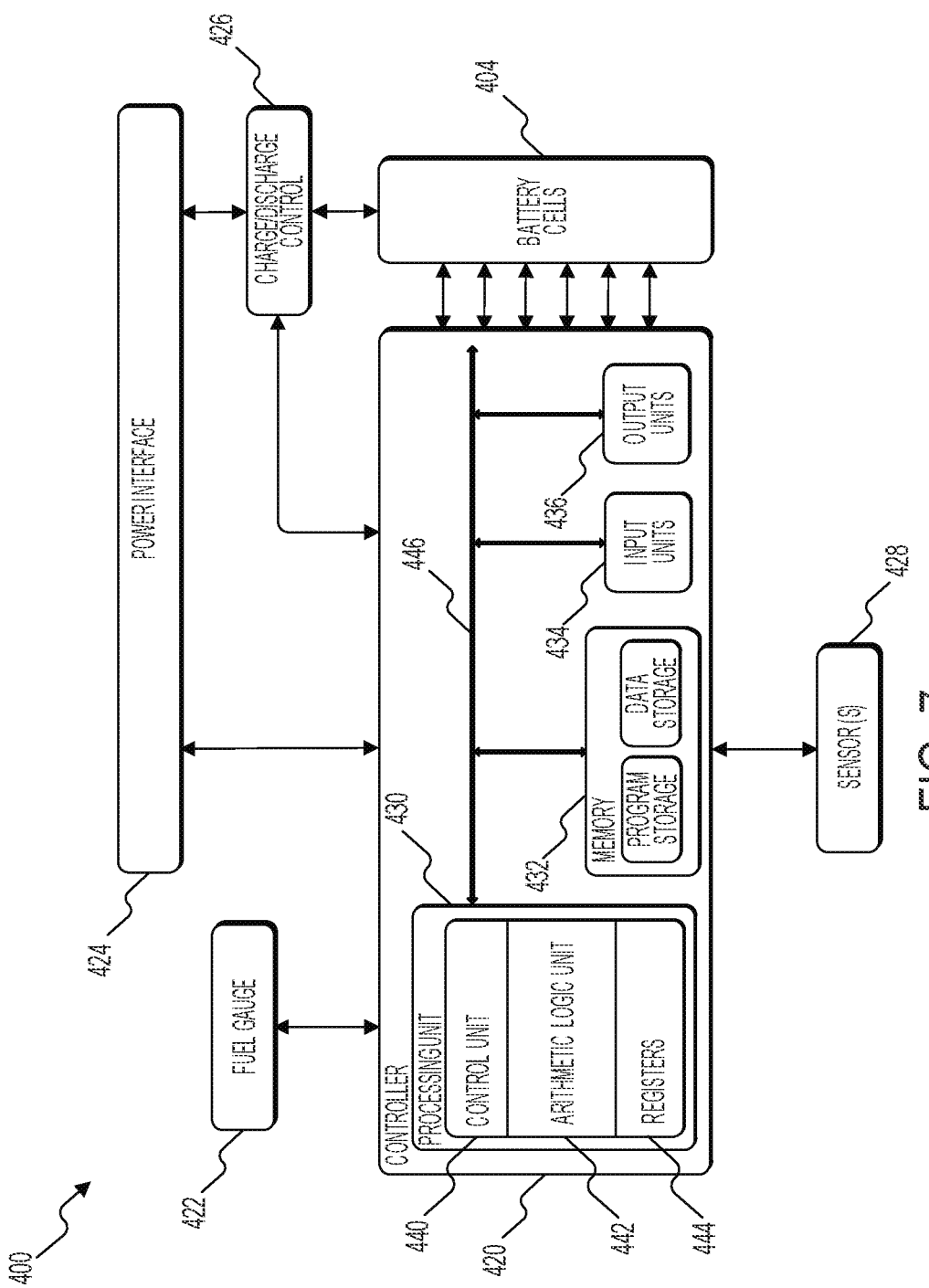
FIG. 7 is a schematic diagram of the battery pack.

The electrical power provided by the battery pack 400 is controlled, monitored, and regulated using control electronics within the power tool 200 and within the battery pack 400 as illustrated in the electromechanical diagrams of FIG. 7. As shown in FIG. 7, the battery pack 400 also includes a controller 420, the fuel gauge 422, the power interface 424, a charge/discharge control module 426, and sensors 428.

As discussed above, the battery cells 404 are coupled to the controller 420 and to the charge/discharge module 426. The battery cells 404 generate electrical power provided to the power tool 200, the adapter 600, or another power tool device. The charge/discharge control module 426 includes, for example, one or more switches (e.g., FETs) for controlling the charging current to and discharge current from the battery cells 404.

The power interface 424 is coupled to the controller 420 and to the charge/discharge control module 426. The power interface 424 communicates with the controller 420 and receives electrical power from the charge/discharge control module 426. The power interface 424 includes a contact block 410 having a plurality of contacts 412*a-e* as shown in FIG. 6. In the illustrated embodiment, the battery pack 400 includes five contacts 412*a-e*. The contacts 412*a-e* are operable to electrically transmit the electrical power received from the charge/discharge control module 426 to the power tool 200, the adapter 600, or another power tool device.

The battery pack 400 is removably and interchangeably connected to the power tool 200, the adapter 600, or another power tool device to provide operational power (i.e., voltage and current) to the power tool 200, the adapter 600, or the other power tool device through the contacts 412*a-e*. The contacts 412*a-e* are in electrical communication with the terminals 252*a-d* of the power tool 200 when the battery pack 400 is directly or indirectly (e.g., via the adapter 600) coupled to the power tool 200. When the battery pack 400 is coupled directly to the power tool 200, the battery pack contacts 412*a-e* mate directly with the terminals 252*a-d*. When the battery pack 400 is coupled to the power tool 200 through the adapter 600, the contacts 412*a-e* mate with the adapter 600, which provides electrical communication between the contacts 412*a-e* of the battery pack 400 and the terminals 252*a-d* of the power tool 200.

The five contacts 412*a-e* include a positive power ("B+") contact 412*a*, a negative power ("B−") contact 412*b*, and three communication contacts 412*c-e*. The positive power contact 412*a* and the negative power contact 412*b* are configured to connect to the power terminals 252*a,b*, respectively, on the power tool 200 to provide operational power (i.e., voltage and current) to the power tool 200. The power contacts 412*a-b* are also configured to couple to power terminals on the adapter 600 as will be discussed below. The battery pack 400 communicates with the power tool 200, the adapter 600, or another power tool device through at least two of the communication contacts 412*c-e*. The two communication terminals 252*c-d* of the power tool 200 align with two of the three communication contacts 412*c-e* of the battery pack 400 to enable communication between the devices. The third contact of the communication contacts 412*c-e* is unmated and not used in this instance, but may be used in connection with other power tools and devices. The battery pack 400 communicates with the power tool 200 to determine when the power tool 200 is ready to receive electrical power and to communicate to the power tool 200 when the battery pack 400 is ready to provide electrical power to the power tool 200. The battery pack 400 is also configured to exchange data with the adapter 600 through at least two of the communication contacts 412*c-e*.

The sensors 428 include, for example, one or more current sensors, one or more voltage sensors, one or more temperature sensors, etc. The controller 420 uses the sensors 428 to monitor operation of the battery pack 400. The controller 420 also includes a variety of preset or calculated fault condition values related to temperatures, currents, voltages, etc., associated with the operation of the power tool 200. For example, the controller 420 uses the sensors 428 to monitor an individual state of charge of each of the battery cells 404, monitor a current being discharged from the battery cells 404, monitor the temperature of one or more of the battery cells 404, etc., for fault condition interrupts. If the voltage of one of the battery cells 404 is equal to or above an upper voltage limit (e.g., a maximum charging voltage), the charge/discharge control module 426 prevents the battery cells 404 from being further charged or requests that a battery charger (not shown) provide a constant voltage charging scheme. Alternatively, if one of the battery cells 404 falls below a low-voltage limit, the charge/discharge control module 426 may prevent the battery cells 404 from being further discharged. Similarly, if an upper or lower operational temperature limit for the battery cells 404 of the battery pack 400 is reached, the controller 420 can control the charge/discharge module 426 to prevent further charging or discharging until the temperature of the battery cells 404 or the battery pack 400 is within an acceptable temperature range.

The controller 420 is electrically and/or communicatively connected to a variety of modules or components of the battery pack 400. For example, the illustrated controller 420 is connected to the fuel gauge 422, the sensors 428, the power interface 424, the battery cells 404, and the charge/discharge control module 426 (optional within battery pack 400). The controller 420 includes combinations of hardware and software that are operable to, among other things, control the operation of the battery pack 400, activate the fuel gauge 422 (e.g., including one or more LEDs), monitor the operation of the battery pack 400, etc.

In some embodiments, the controller 420 includes a plurality of electrical and electronic components that provide power, operational control, and protection to the components and modules within the controller 420 and/or battery pack 400. For example, the controller 420 includes, among other things, a processing unit 430 (e.g., a microprocessor, a microcontroller, or another suitable programmable device), a memory 432, input units 434, and output units 436. The processing unit 430 includes, among other things, a control unit 440, an arithmetic logic unit ("ALU") 442, and a plurality of registers 444 (shown as a group of registers in FIG. 7), and is implemented using a known computer architecture, such as a modified Harvard architecture, a von Neumann architecture, etc. The processing unit 430, the memory 432, the input units 434, and the output units 436, as well as the various modules connected to the controller 420 are connected by one or more control and/or data buses (e.g., common bus 446). The control and/or data buses are shown generally in FIG. 7 for illustrative purposes. In some embodiments, the controller 420 is implemented partially or entirely on a semiconductor (e.g., a field-programmable gate array ["FPGA"] semiconductor) chip, such as a chip developed through a register transfer level ("RTL") design process.

The memory 432 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 430 is connected to the memory 432 and executes software instructions that are capable of being stored in a RAM of the memory 432 (e.g., during execution), a ROM of the memory 432 (e.g., on a generally permanent basis), or another non-transitory computer readable medium such as another memory or a disc. Software included in the implementation of the battery pack 400 can be stored in the memory 432 of the controller 420. The software includes, for example, firmware, one or more applications, program data, filters, rules, one or more program modules, and other executable instructions. The controller 420 is configured to retrieve from the memory 432 and execute, among other things, instructions related to the control of the battery pack 400 described herein. The controller 420 can also store on the memory 432 various battery pack parameters and characteristics (including battery pack nominal voltage, chemistry, battery cell characteristics, maximum allowed discharge current, maximum allowed temperature, etc.).

The battery pack 400 is also configured to store other information related to the operation of the battery pack 400 in the memory 432. For example, the controller 420 may obtain and store information regarding the number of charge and discharge cycles, the discharge time, the type of power tools the battery pack 400 is coupled to, the average temperature as the state-of-charge of the battery cells 404 decrease, and other such relevant information. This information may then be transmitted or shared with the external device 800 through the adapter 600. In other constructions, the controller 420 includes additional, fewer, or different components.

The battery pack 400 is also configured to couple to a battery pack charger (not shown). The battery pack 400 utilizes one of the communication contacts 412e to receive charging current from the charger. In other words, charging current is delivered to the battery pack 400 on the negative power contact 412b and the third communication contact 412e. The battery pack 400 also communicates information regarding charging schemes, charging status, and the like to the charger through the three communication contacts 412c-e. Although the battery pack 400 is described as including five contacts 412a-e, in other embodiments, the battery pack 400 may include more or less contacts. The battery pack 400, however, includes at least a positive power contact, a negative power contact, and at least one communication contact.

As explained above with respect to the power tool 200, the battery pack 400 is configured to communicate different information to the power tool 200, the adapter 600, or another power tool device. For example, the battery pack 400 may communicate certain characteristics of the battery pack 400 to the power tool 200, the adapter 600, or another power tool device through communication contacts 412c-e and corresponding structure (e.g., communication terminals 252c-d) on the power tool 200, the adapter 600, or another power tool device. For example, the battery pack 400 and the power tool 200 may exchange identification signals to identify to one another the type of power tool 200 or the type of battery pack 400. In some embodiments, the battery pack 400 may also send an identification signal to the adapter 600 to identify the battery pack to the adapter 600. Other information can also be exchanged through the communication contacts 412c-e of the battery pack 400 such as, for example, battery pack capacity, battery pack voltage, battery pack chemistry, discharge and charging algorithms stored in the battery pack 400 (i.e., in the memory 432 of the battery pack), thresholds monitored by the controller 420 of the battery pack 400, discharge and charge history for the battery pack 400, and other relevant information for the battery pack 400. The battery pack 400 uses the communication contacts 412c-e to export and import such information from the external device 800 through the adapter 600. The battery pack 400 may also share some, or all, of this information with the power tool 200 or with a battery pack charger.

When coupled to the power tool 200, the adapter 600, or another power tool device, the battery pack 400 substantially encloses and covers corresponding terminals (e.g., the terminals 252a-d) on the power tool 200, the adapter, and other power tool devices. That is, the battery pack 400 functions as a cover for the terminals 252a-d of the power tool 200 and the connecting portion of the adapter 600.

Figure 8:
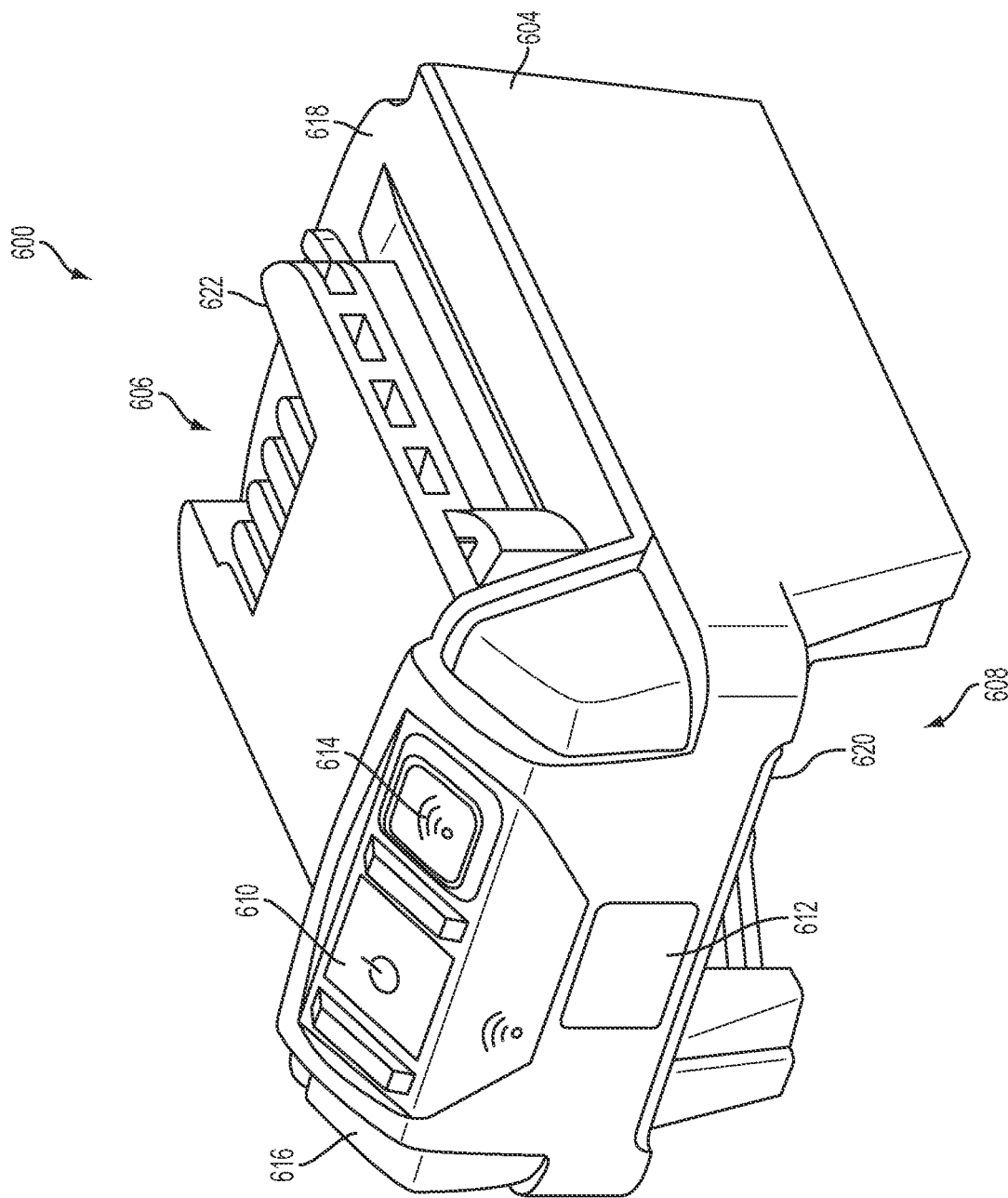
FIG. 8 is a front perspective view of an adapter of the communication system of FIG. 1.

FIG. 8 illustrates a perspective view of the adapter 600. As shown in FIG. 1, the adapter 600 is configured to couple to both the power tool 200 and the battery pack 400. In some embodiments, the adapter 600 is also configured to couple to a battery pack charger. The adapter 600 couples to different power tool devices (e.g., the power tool 200, the battery pack 400, and chargers) to export information from the power tool devices and import information into the power tool devices. The adapter 600, for example, obtains and exports tool usage data, maintenance data, mode information, drive device information, and the like from the power tool 200. The adapter 600 also imports (i.e., provides) information into the power tool 200 such as, for example, configuration data, operation thresholds, maintenance thresholds, mode configurations, programming for the power tool 200, and the like. In general, the adapter 600 creates a communication path between the power tool 200, the battery pack 400, and other power tool devices and the external device 800.

As shown in FIG. 8, the adapter 600 includes a housing 604, a tool-side receiving portion 606, a battery-side receiving portion 608, a power switch 610, a communication port 612, a communication indicator 614, and a latching mechanism 616. The housing 604 includes a top-side 618, a bottom side 620, and sidewalls connecting the top side 618 and the bottom side 620. As shown in FIG. 8, the tool-side receiving portion 606 is located on the top side 618, while the battery-side receiving portion 608 is located on the bottom side 620 of the adapter 600. The tool-side receiving portion 606 is configured to couple to the power tool 200. The battery-side receiving portion 608 is configured to couple to the battery pack 400.

Figure 9:
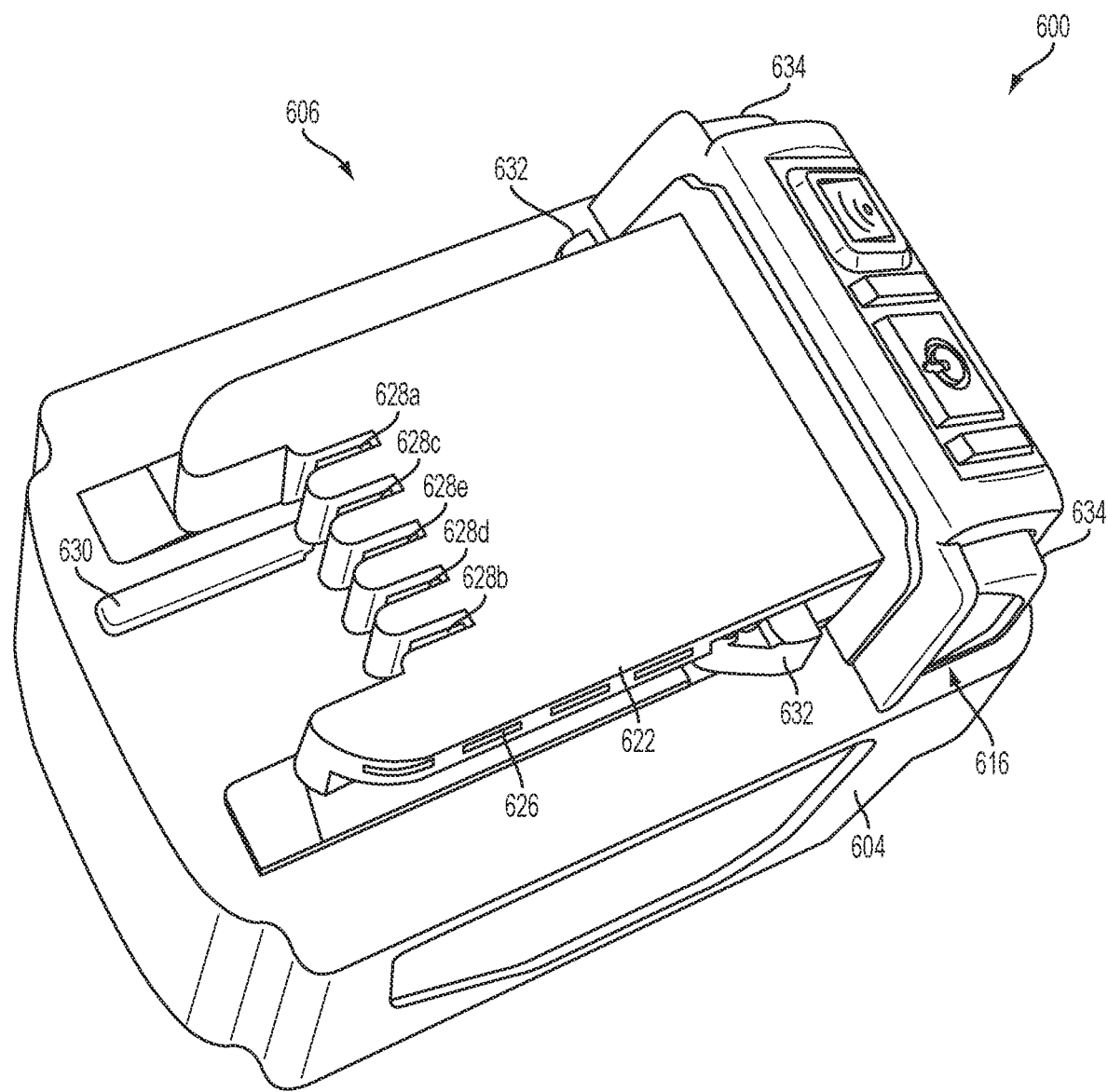
FIG. 9 is a back perspective view of the adapter.

The tool-side receiving portion 606 includes a tool-side connector 622 (see FIG. 9). The tool-side connector 622 includes a raised portion 626, and five contacts 628a-e. The raised portion 626 protrudes from the top side 618 of the housing 604. The five contacts 628a-e are partially covered by the raised portion 626. The five contacts 626a-e and the raised portion 626 form female contacts configured to receive the male blade terminals 252a-d of the device interface 222 of the power tool 200.

The tool-side connector 622 (see FIG. 9) can also couple to a battery pack charger. Accordingly, the tool-side connector 622 may also be referred to as a charger-side connector and a tool/charger-side connector. The adapter 600 may exchange information with the charger. The tool-side connector 622 receives male blades from the charger and provides electrical communication with an external device 800. The battery pack charger includes five male blades. The battery pack charger uses a fifth terminal to provide a charging current to the battery pack 400. Therefore, the adapter 600 includes the fifth contact 628e, among other reasons, to couple to the battery pack charger and facilitate communication between the external device 800 and the battery pack charger. Exemplary charger data that may be exported from the charger via the adapter 600 includes charging history data and maintenance data. Charging history data can include the number, types, and identities of batteries charged, as well as the charging current provided to various batteries. Additionally, a user via the external device 800 may communicate to the charger via the adapter 600 to add, delete, and modify charging schemes, firmware, and various settings and parameters. For instance, a user can update charge current levels, timing for switching between current levels, various thresholds used to determine charge current levels, and add charging schemes for new batteries. Although the tool-side connector 622 is shown to include five contacts 628a-e, in some embodiments, the tool-side connector 622 includes four contacts (e.g., contacts 628a-d).

In the illustrated embodiment, the tool-side connector 622 also includes a raised bar 630. The raised bar 630 physically inhibits the adapter 600 from coupling to power tools 200 that are incompatible with the adapter 600. For example, in some embodiments, high-power power tools may not couple with the adapter 600 and thereby, not exchange information with the external device 800. In other embodiments, power tools 200 may be incompatible with the adapter 600 for other reasons such as, for example, the power tool communication protocol is not compatible with the adapter, the power tool 200 does not accept reconfiguration files from the external device 800 for security reasons, the power tool 200 does not record information to be exported through the adapter 600, etc. In other embodiments, the adapter 600 does not include the raised bar 630 and is not prevented from coupling to certain power tools.

When the adapter 600 is coupled to the power tool 200, or another power tool device including a similar device receiving portion 206, the adapter 600 substantially encloses and covers the blade terminals 252a-d on the power tool 200. That is, the adapter 600 functions as a cover for the terminals 252a-d of the power tool 200. Once the adapter 600 is disconnected from the power tool 200, the terminals 252a-d on the power tool 200 are generally exposed to the surrounding environment. In the illustrated embodiment, the adapter 600 is designed to substantially follow the contours of the power tool 200 to match the general shape of the outer casing of the handle 204 of the power tool 200. The adapter 600 also generally increases (e.g., extends) the length of the grip of the tool (i.e., the portion of the power tool below the main body).

The adapter 600 is removable and interchangeably connected to various power tools through the latching mechanism 616. The latching mechanism 616 releasably secures the adapter 600 to the power tool 200. As shown in FIGS. 8 and 9, the latching mechanism 616 includes a pair of tabs 632 and a pair of actuators 634. The tabs 632 engage the notches 207 in the device receiving portion 206 of the power tool 200. The tabs 632 are normally biased away from the raised portion 626 (i.e., away from each other) by springs inside the housing 604. When the tabs 632 are engaging the notches 207, the adapter 600 is secured in the device receiving portion 206 of the power tool 200. Each actuator 634 is mechanically linked to one of the tabs 632. Actuating (e.g., depressing) the actuators 634 inward moves the tabs 632 toward the raised portion 626 (i.e., toward each other) and out of engagement with the notches 207 in the device receiving portion 206 of the power tool 200. While the tabs 632 are out of engagement with the recesses, the adapter 600 may be pulled out from the device receiving portion 206 and away from the power tool 200. In some embodiments, rather than having multiple tabs, the latching mechanism 616 includes only a single tab and a single actuator. In other embodiments, the latching mechanism 616 includes more than two tabs 632 and/or more than one actuator 634.

FIGS. 8 and 9, as well as the above description, show that the tool-side connector 622 of the adapter 600 replicates the power interface 424 included in the battery pack 400 such that the adapter 600 is compatible with the power tool 200. Therefore, the connection between the power tool 200 and the adapter 600 replicates the connection between the power tool 200 and the battery 400 such that the connections are intuitive to the user.

Figure 10:
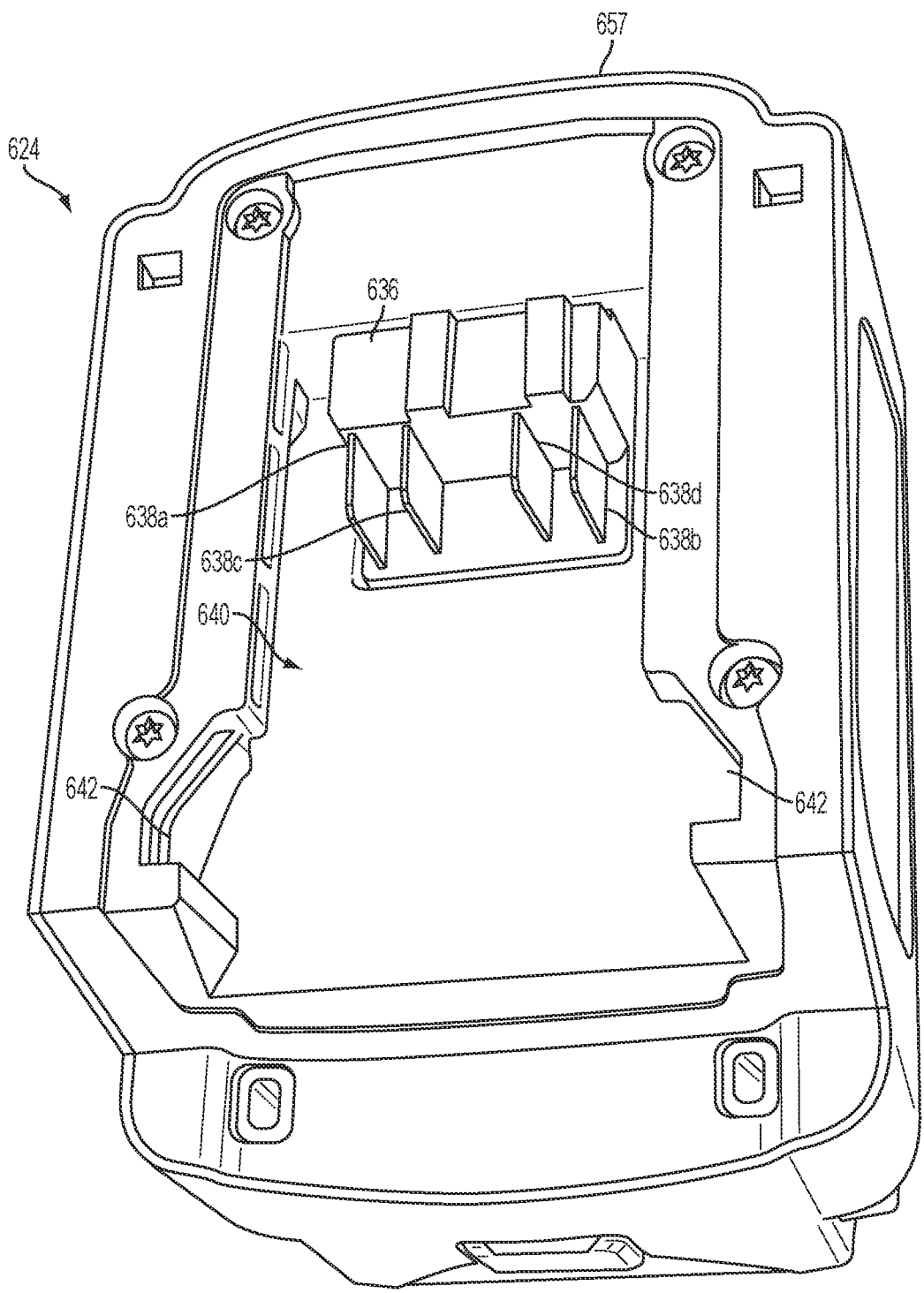
FIG. 10 is a bottom perspective view of the adapter.

The battery-side receiving portion 608 includes a battery-side connector 624 (see FIG. 10). The battery-side connector 624 includes a terminal block 636, and four male blade terminals 638a-d extending beyond the housing 604. The terminal block 636 and the four male blade terminals 638a-d are recessed in a cavity 640 of the battery-side receiving portion 608. The cavity 640 is shaped such that the contours of the battery pack 400 match the general shape of the cavity 640.

The four male blade terminals 638a-d are connected to the adapter 600 through the terminal block 636, which connects the blade terminals 638a-d to the housing 604 and to the other electronics of the adapter 600. When the adapter 600 is not coupled to the battery pack 400, the blade terminals 638a-d are generally exposed to the surrounding environment. However, as discussed above with respect to the battery pack 400, when the battery 400 is coupled to the adapter 600, the female contacts 412a-e of the battery pack 400 receive the blade terminals 638a-d of the adapter 600. The female contacts 412a-e, therefore, cover the terminals 638a-d and protect them from the surrounding environment. As shown in FIG. 10, the cavity 640 includes two notches 642. The notches 642 receive the tabs 416 from the coupling mechanism 408 of the battery pack 400. Therefore, when the battery pack 400 is coupled to the adapter 600, the tabs 416 secure the battery pack 400 onto the adapter 600 by engaging the tabs 416 of the battery pack 400 with the notches 642 of the adapter 600.

Figure 11:
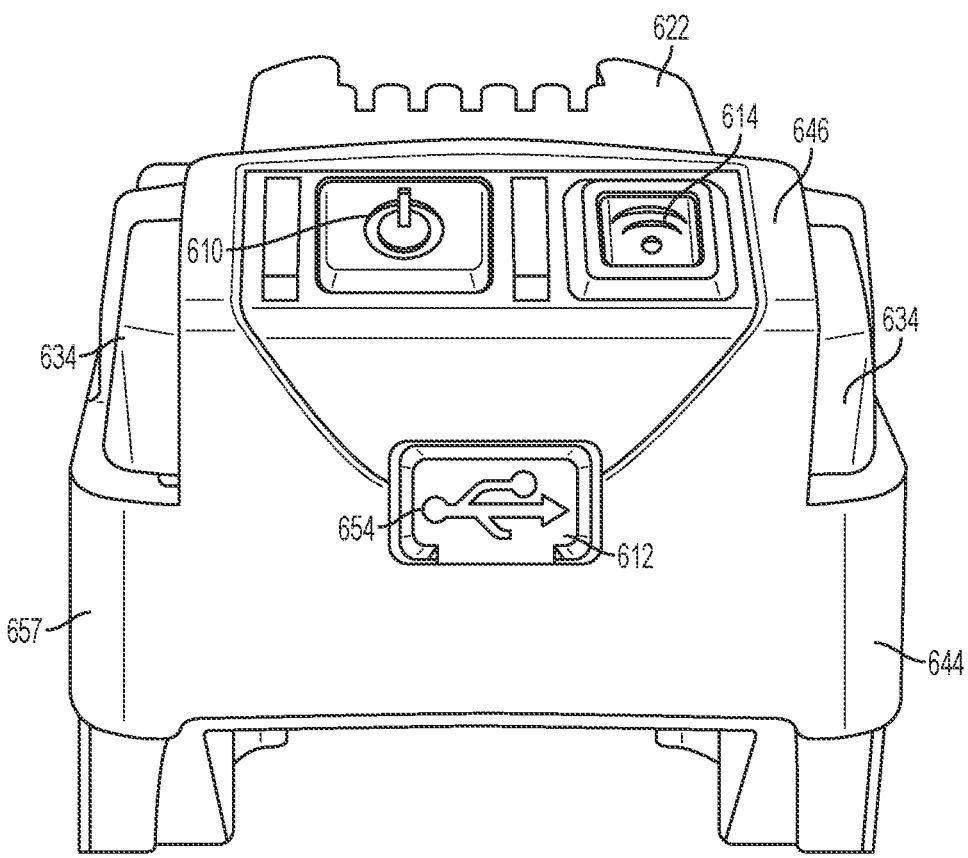
FIG. 11 is a front view of the adapter.

As shown in FIGS. 8 and 11, the power switch 610, the communication port 612, and the communication indicator 614 are positioned on a sidewall of the housing 604. In the illustrated embodiment, the power switch 610, the communication port 612, and the communication indicator 614 are positioned on the same front sidewall, such that when the adapter 600 is coupled to the power tool 200 or another power tool device, the power switch 610, the indicator 614, and the communication port 612 all face the front of the power tool 200 (i.e., toward the drive device 210 of the power tool 200). The front sidewall of the housing 604 includes a first surface 644 and a second surface 646. As shown in FIGS. 8 and 11, the first surface 644 is generally perpendicular to the top side 618 and the bottom side 620. The second surface 646 is positioned adjacent and between the first surface 644 and the top side 618 of the housing 604, and at an oblique angle of approximately 30° with respect to both the top side 618 and the bottom side 620. The second surface 646, in some embodiments, is positioned at a different oblique angle with respect to the top side 618 or the bottom side 620, such as an angle between 15° and 45°, 25° and 65°, 25° and 45°, 45° and 65°, or 15° and 75°. In the illustrated embodiment, the power switch 610 and the communication indicator 614 are positioned on the second surface 646. This positioning allows the power switch 610 and the communication indicator 614 to be easily accessible (e.g., visible) to the user. The position of the power switch 610 and the communication indicator 614 is similar to the position of the fuel gauge 422 on the battery pack 400. For example, when the power tool 200 is coupled to the battery pack 400 through the adapter 600, looking forward toward the power tool 200 allows a user to determine the charge state of the battery pack 400 via the fuel gauge 422, the power status of the adapter 600 via the power switch 610, and the communication status of the adapter 600 via the communication indicator 614.

The communication port 612 is positioned on the first surface 644 of the front sidewall. The communication port 612 is also connected to a PCB 650 of the adapter 600 (see FIGS. 13-15) including other electronics relevant to the adapter 600. The communication port 612 includes a cavity 652 (see FIG. 15) that receives a compatible communication connector such as, for example, a USB connector. In the illustrated embodiment, the cavity 652 has a generally rectangular shape to accommodate the communication port 612. In other embodiments, the shape of the cavity 652 may be different based on the shape of the particular communication port 612.

Figure 12:
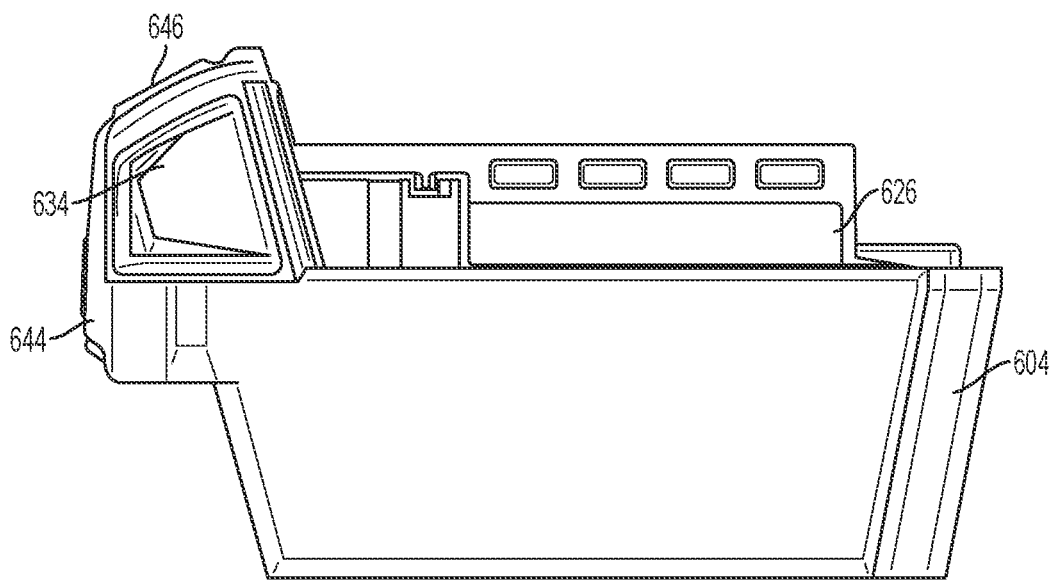
FIG. 12 is a side view of the adapter.

The communication port 612 is protected by a cover 654. The cover 654 is attached with a hinge on an upper edge of the cavity 652. The cover 654 is pivotable between an open position and a closed position. In the open position, the cover 654 is at an angle with the first surface 644 of the sidewall and the cavity 652 is exposed to the environment. In the closed position, the cover 654 is flush with the sidewall of the housing 604 and the cavity 652 is protected from the external environment (see FIGS. 11 and 12). For example, the cover 654 may also prevent the ingress of dust, water, or other contaminants. To connect the external device 800 to the communication port 612 for communication via the adapter 600, the cover 654 is placed in the open position. When the cover 654 is in the closed position the communication port 612 is inaccessible and the external device 800 does not communicate with the adapter 600 through the communication port 612.

Figure 13:
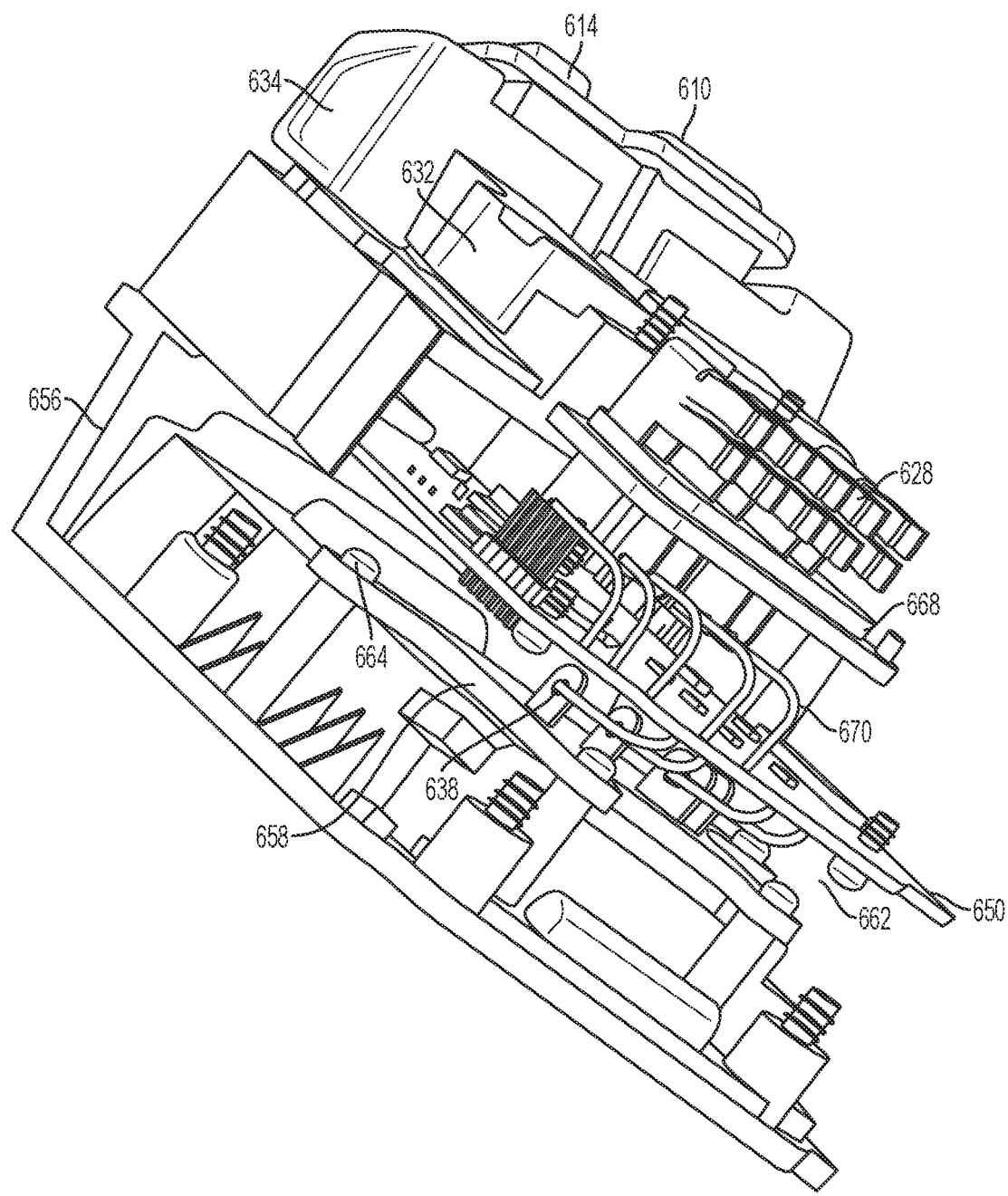
FIGS. 13-15 are perspective views of the adapter with a top cover removed.
Figure 14:
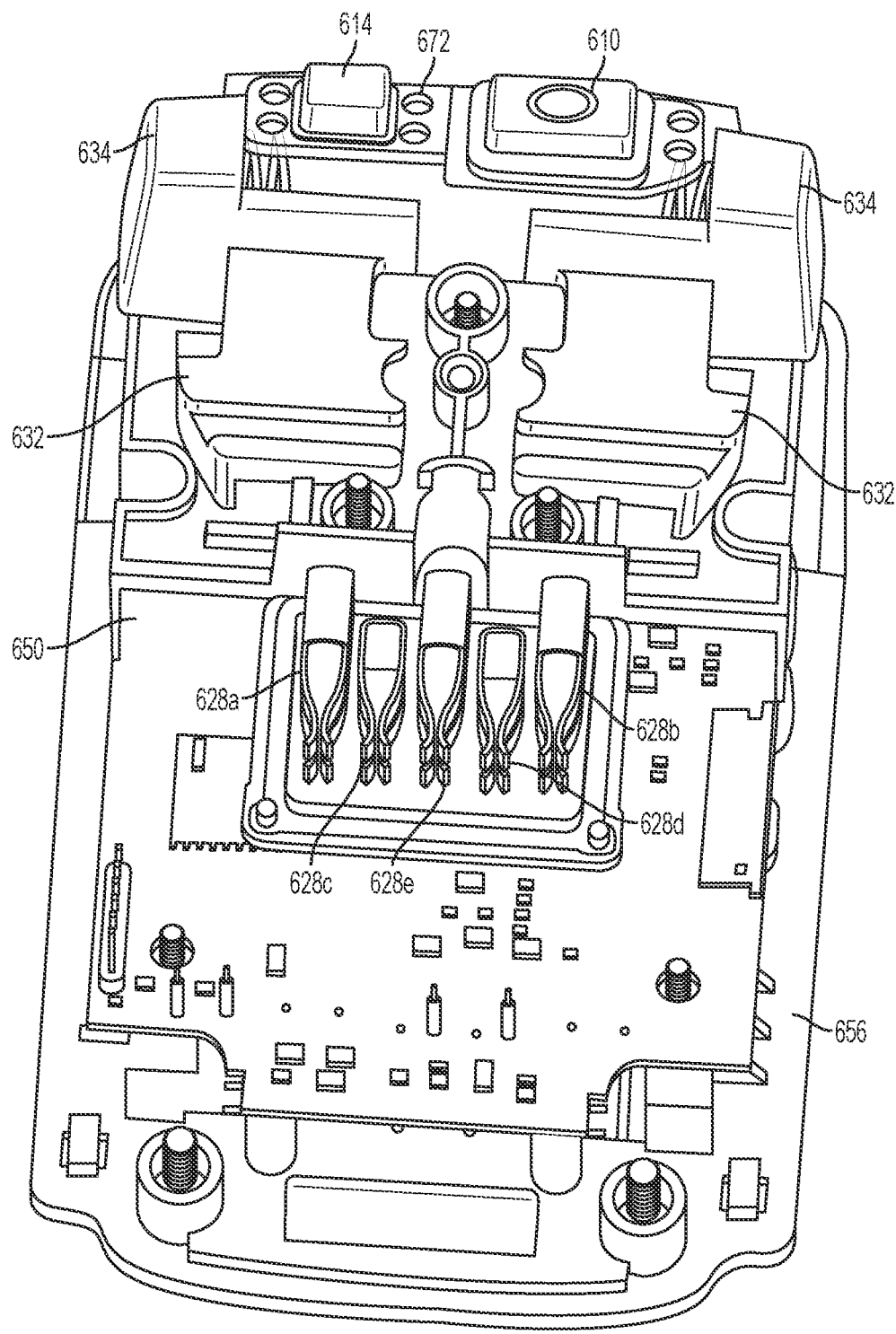
Figure 15:
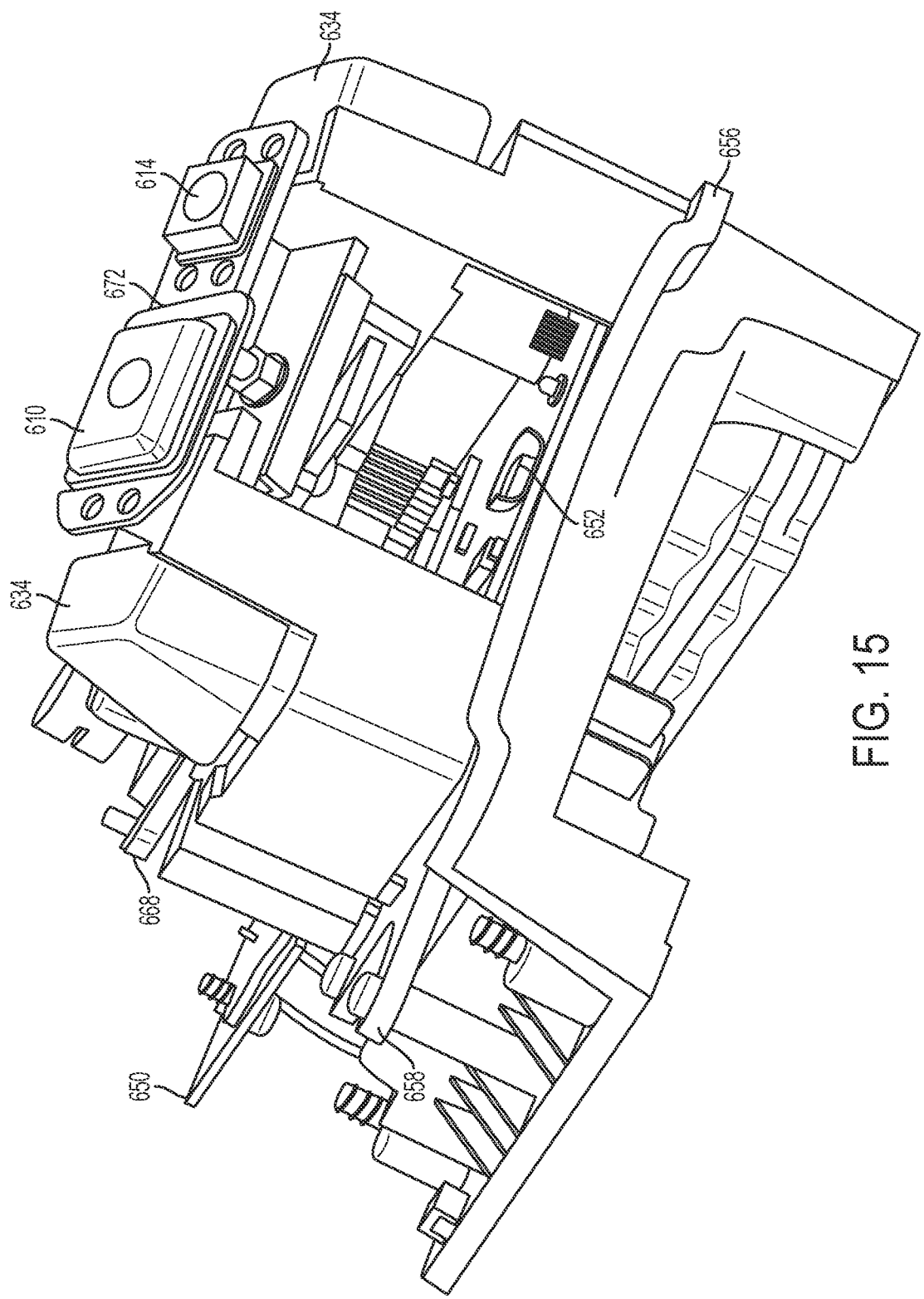

The adapter 600 also includes other electronic components that are mounted on the PCB 650 and positioned within the adapter housing 604. The housing 604 includes a base plate 656 and a cover 657 (see FIGS. 10 and 11). The cover 657 couples to the base plate 656 and protects the internal components of the adapter 600 from the surrounding environment. FIGS. 13-15 illustrate the adapter 600 when the cover 657 is removed.

As shown in FIGS. 13-15, the PCB 650 is positioned in between the terminal block 636 and the contacts 628*a-e*. As also shown in FIGS. 13-15, the base plate 656 supports the electronics and structural components of the adapter 600. The terminal block 636 is coupled to the housing 604 through a connecting plate 658. The blade terminals 638*a-d* extend through and beyond the connecting plate 658 into the housing 604. Connecting wires 662 are shown coupled (e.g., soldered) at one end of the PCB 650 and free at their respective opposite ends. However, in a final assembly, each free end of the connecting wires 662 is coupled to a respective terminal 638*a-d*. Accordingly, the four blade terminals 638*a-d* are electrically connected to the PCB 650 through connecting wires 662. In the illustrated embodiment, the connecting plate 658 is coupled to the base plate 656 through connecting members 664 (e.g., screws). In other embodiments, the connecting plate 658 may be coupled to the base plate 656 by some other coupling means such as, for example, adhesive. In yet other embodiments, the connecting plate 658 may be part of the base plate 656 and the blade terminals 638*a-d* may be coupled to the base plate 656 directly.

The contacts 628*a-e* are coupled to the housing 604 through a support plate 668. The support plate 668 holds the contacts 628*a-e* above the PCB such that they are accessible to a connected device (e.g., the power tool 200) on the top side 618 of the housing 604. A portion of each of the contacts 628*a-e* extends below the support plate 668 and is connected to the PCB 650 by a second set of connecting wires 670. Similar to the connecting wires 662, the connecting wires 670 are illustrated as having a free end, but in a final assembly, the free ends of the connecting wires 670 are each connected (e.g., soldered) to a respective contact 628*a-e*.

As shown in FIG. 14, the support plate 668 for the contacts 628*a-e* is coupled the latching mechanism 616. In particular, the support plate 668 also supports the tabs 632 that engage the notches 207 on the power tool 200. As shown in FIGS. 13-15, the housing 604 also includes a mount member 672. The mount member 672 is connected to the support plate 668 and extends upward toward the top side 618 of the housing 604. The power switch 610 and the communication indicator 614 are supported by the mount member 672. The height of the mount member 672 allows the power switch 610 and the communication indicator 614 to be accessible to the user and positioned on the (angled) second surface 646 of the front sidewall of the housing 604.

Figure 16:
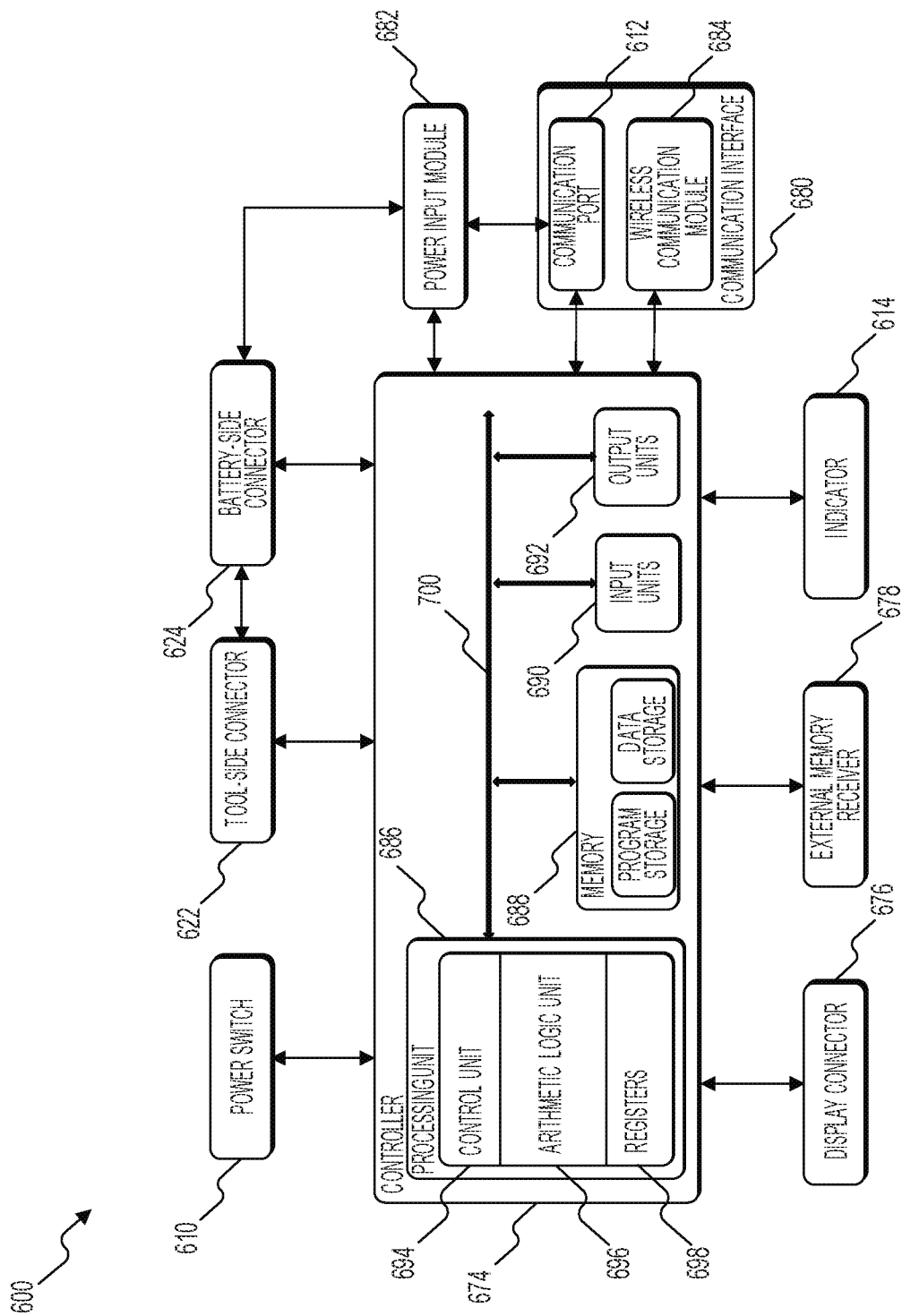
FIG. 16 is a schematic diagram of the adapter.

As shown in FIGS. 13-15, the PCB 650 extends horizontally across the adapter 600 with a mounting surface generally parallel to the top side 618 and the bottom side 620. The communication port 612 is mounted directly on the PCB 650, as shown in FIG. 15. The PCB 650 also supports other electronic components of the adapter 600. As shown in FIG. 16, the adapter also includes a controller 674, the tool side connector 622, the battery side connector 624, a communication interface 680, the communication indicator 614, a power input module 682, the power switch 610, an external memory receiver 678, and a display connector 676.

The controller 674 is electrically and/or communicatively connected to a variety of modules and/or components of the adapter 600, as shown in FIG. 16. In some embodiments, the controller 674 includes a plurality of electrical and electronic components that provide power, operational control, and protection to the components and modules within the controller 674 and/or the adapter 600. For example, the controller 674 includes, among other things, a processing unit 686 (e.g., a microprocessor, a microcontroller, or another suitable programmable device), a memory 688, input units 690, and output units 692. The processing unit 686 includes, among other things, a control unit 694, an arithmetic logic unit ("ALU") 696, and a plurality of registers 698 (shown as a group of registers in FIG. 16), and is implemented using a known computer architecture, such as a modified Harvard architecture, a von Neumann architecture, etc. The processing unit 686, the memory 688, the input units 690, and the output units 692, as well as the various modules connected to the controller 674 are connected by one or more control and/or data buses (e.g., common bus 700). The control and/or data buses are shown generally in FIG. 16 for illustrative purposes. In some embodiments, the controller 674 is implemented partially or entirely on a semiconductor (e.g., a field-programmable gate array ["FPGA"] semiconductor) chip, such as a chip developed through a register transfer level ("RTL") design process.

The memory 688 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 686 is connected to the memory 688 and executes software instructions that are capable of being stored in a RAM of the memory 688 (e.g., during execution), a ROM of the memory 688 (e.g., on a generally permanent basis), or another non-transitory computer readable medium such as another memory or a disc. Software included in the implementation of the adapter 600 can be stored in the memory 688 of the controller 674. The software includes, for example, firmware, one or more applications, program data, filters, rules, one or more program modules, and other executable instructions. The controller 674 is configured to retrieve from memory and execute, among other things, instructions related to the control processes and methods described herein.

In the illustrated embodiment, the controller 674 is also configured to store power tool information, battery pack information, or information received from another power tool device on the memory 688 of the adapter 600. When the adapter 600 receives data from, for example, the power tool 200 through the tool-side connector 622, the adapter 600 stores the received data in the memory 688. The adapter 600 may at a future point in time be coupled to the external device 800 to output the power tool data stored in memory 688. Analogously, the adapter 600 may be coupled to the external device 800 to obtain configuration data and/or programming data specific for the power tool 200. The adapter 600 may couple to the power tool 200 at a future point in time and relay the configuration and programming information to the power tool 200 via the tool-side connector 622.

The tool-side connector 622 includes the five contacts 628a-e. The five contacts 628a-e include a positive power contact 628a, a negative power contact 628b, and three communication contacts 628c-e. The positive power contact 628a and the negative power contact 628b are configured to connect to the power terminals 252a,b on the power tool 200. The positive and negative power contacts 628a-b provide operational power (i.e., voltage and current) to the power tool 200. The adapter 600 communicates with the power tool 200, or another power tool device through at least two of the communication contacts 628c-e. The two communication terminals 252c-d of the power tool 200 align with two of the three communication contacts 628c-e of the adapter 600 to enable communication between the devices. The third contact of the communication contacts 628c-e is unmated and not used in this instance, but may be used in connection with other power tools and devices. The adapter 600 communicates with the power tool 200 to obtain information regarding the power tool status, operation statistic, or power tool identification. The adapter 600 can also write data to the power tool 200 for power tool configuration, firmware upgrades, or to send commands (e.g., turn on a worklight).

The adapter 600 exchanges data/information with the power tool 200, or another similar power tool device by transmitting and receiving signals through the two communication terminals 252c-d and two communication contacts 628c-d. The adapter 600 and the power tool 200 include programmed instructions specifying which terminal/contact will be used for the adapter 600 to transmit data and which terminal/contact will be used for the power tool 200 to transmit data. In other words, when explained from the perspective of the adapter 600, one communication contact 628c is used to transmit data to the power tool 200 and the second communication contact 628d is used to receive data from the power tool 200. In other embodiments, the adapter 600 may transmit data to the power tool 200 using the second communication contact 628d and receive data from the power tool 200 using the first communication contact 628c. Once the transmitter/receiver terminals/contacts have been established, the adapter 600 and the power tool 200 may exchange data over the two communication links.

In the illustrated embodiment, the adapter 600 and the power tool 200 use a software communication technique to exchange data over the communication terminals 252c-d and the communication contacts 628c-d. In the illustrated embodiment, the adapter 600 becomes the master device and the power tool 200 becomes the slave device. The master device (i.e., the adapter 600) initiates data communication. In other embodiments, the power tool 200 is the master device and the adapter 600 the slave device. To begin communication, the adapter 600 sends a start signal to the power tool 200. After the start signal has been sent, the adapter 600 utilizes software executed by the processing unit 686 to alternate (i.e., switch between a high output and a low output) a transmit pin of the controller 674 that is coupled to the communication contact 628c. The start signal is used to communicate to the power tool 200 (or slave device) the baud rate and stop bits for the communication between the adapter 600 and the power tool 200. The power tool 200 detects the start signal, determines the communicated baud rate and stop bits, and begins sampling the terminal 252c coupled to the communication contact 628c. The adapter 600 sends a predetermined number of bits and then sends a stop signal. In the illustrated embodiment, the start signal is a high output on the transmitter contact 628c for the duration of two bits and the stop signal is a low output on the transmitter contact 628c for the duration of two bits. The power tool 200 detects the start signal and begins sampling the terminal 252c coupled to the communication contact 628c to receive data bits output by the adapter 600. The power tool 200 samples the value of each bit and stores it in a register. The power tool 200 then recognizes the stop signal and waits for another start signal from the adapter 600. If the adapter 600 has finished transmitting bits to the power tool 200, the power tool 200 can respond to the adapter 600 by sending the start signal, a predetermined number of bits, and the stop signal. In other words, the power tool 200 can transmit information/data to the adapter 600 using a similar procedure with reversal of roles (e.g., the power tool 200 transmits, the adapter 600 receives) and using the other communication terminal 252d and communication contact 628d.

To ensure that communication occurs accurately, the power tool 200 and the adapter 600 set or are preprogrammed with certain communication parameters. For example, the power tool 200 and the adapter 600 communicate at the same baud rate, which allows the power tool 200 and the adapter 600 to sample the signals on the transmit pins appropriately. The power tool 200 and the adapter 600 also communicate using a specific data packet size. The data packet size refers to the number of bits the power tool 200 or the adapter 600 transmits between each start and stop signal. In the illustrated embodiment, the power tool 200 and the adapter 600 communicate with a data packet size of eight bits. That is, the transmitting device (either the adapter 600 or the power tool 200) transmits the start signal, eight data bits, and the stop signal. The receiving device then knows that the first bit corresponds to the start signal, the following eight bits correspond to encoded data, and the last signal corresponds to the stop signal. Communicating in such a way allows the power tool 200 and the adapter 600 to segment the data and make it easier for the receiving device to decode. The power tool 200 and the adapter 600 also set or are programmed to communicate in the same endiannes, which refers to the order in which bits are transmitted. In the illustrated embodiment, the most significant bit is transmitted first. In other embodiments, the least significant bit is transmitted first. These and other communication parameters may be preprogrammed into the adapter 600 and the power tool 200. In other embodiments, the user may be able to change some of these parameters such as, for example, the baud rate. The user may adjust the baud rate using the external device 800 and communicating the change in baud rate to both the adapter 600 and the power tool 200.

In other embodiments, rather than communicating using the software implemented method described above, the adapter 600 and the power tool 200 exchange data over the communication terminals 252c-d and the communication contacts 628c-d using one or more universal asynchronous transmitter/receivers ("UART") to encode and decode the transmissions between the adapter 600 and the power tool 200. In other embodiments, the power tool 200 and the adapter 600 may use similar hardware to encode and decode the communication over the data terminals 252c-d and the communication contacts 628c-d.

The battery-side connector 624 includes the four terminals 638a-d. The four male blade terminals 638c-d include a power positive terminal 638a, a power negative terminal 638b, a first communication terminal 638c, and a second communication terminal 638d. The power positive terminal 638a and the power negative terminal 638b are configured to connect to power terminals on the battery pack 400 or other power tool device. The power terminals 638a, 638b on the battery-side connector 624 receive operational power (i.e., voltage and current) from the battery pack 400. The operational power may be transmitted to the power tool 200, used to power the adapter 600, or both.

The adapter 600 uses the first communication terminal 638c and the second communication terminal 638d to exchange information with the battery pack 400. The adapter 600 uses a similar communication protocol as was described between the power tool 200 and the adapter 600. Therefore, software executed by the processing unit 686 allows a transmit pin of the controller 674 to be toggled between low output and high output to send a start signal, data bits, and a stop signal. The battery pack 400 uses the processing unit 430 to sample and decode the transmitted bits.

The communication interface 680 is coupled between the external device 800 and the controller 674 of the adapter 600 to allow the adapter 600 to communicate and exchange data with the external device 800. As shown in FIG. 16, the communication interface 680 includes the communication port 612 and a wireless communication module 684. The communication between the adapter 600 and the external device 800 is implemented using hardware-driven serial communications through the communication port or using wireless transceivers through the wireless communication module 684.

The communication port 612 includes a positive power terminal, a negative power terminal, and at least one data terminal. The communication port 612 receives power from the external device 800 through the positive power terminal and the negative power terminal. The adapter 600 may receive electrical power from the external device 800 and power the controller 674 as well as other electrical components of the adapter 600. The adapter 600 and the external device 800 exchange data over the at least one data terminal of the communication port 612 using serial communication protocols.

In the illustrated embodiment, the communication port 612 includes a universal serial bus (USB) port. The USB port 612 includes a positive power terminal, a negative power terminal, and two data terminals. The adapter 600 and the external device 800 utilize the two data terminals on the USB port 612 to exchange data using differential signaling. As discussed above, the adapter 600 and the external device 800 exchange data regarding the power tool 200, the battery pack 400, or another power tool device to which the adapter 600 can be connected.

In other embodiments, the communication port 612 may include another type of communication port. For example, the communication port 612 may include an RS-232 port, a microUSB port, a proprietary port, etc. Furthermore, the adapter 600 may include more than one communication port 612 such that the adapter 600 is compatible with different external devices 800 that may include different types of communication ports or connectors.

The wireless communication module 684 provides an alternative way for the adapter 600 to communicate with the external device 800. That is, the wireless communication module 684 selectively uses the communication port 612 or the wireless communication module 684 to communicate with the external device 800. The wireless communication module 684 includes a radio transceiver and an antenna to send and receive wireless messages to and from the external device 800. The wireless communication module 684 may be used, for example, when the external device 800 does not include a connector or port compatible with the communication port 612, or when wireless communication is preferred by a user. The wireless communication module 684 may include its own controller to effect wireless communications between the adapter 600 and the external device 800. For example, a controller associated with the wireless communication module 684 may buffer incoming and/or outgoing data, communicate with the controller 674, and determine the communication protocol and/or settings to use in wireless communications.

In the illustrated embodiment, the wireless communication module 684 is a Bluetooth® module. The Bluetooth® module communicates with the external device 800 employing the Bluetooth® protocol. Therefore, in the illustrated embodiment, the external device 800 and the adapter 600 are in proximity of each other while they exchange data. In other embodiments, the wireless communication module 684 communicates using other protocols (e.g., Wi-Fi, cellular protocols, etc.) over a different type of wireless networks. For example, the wireless communication module 684 may be configured to communicate via Wi-Fi through a wide area network such as the Internet or a local area network, or to communicate through a piconet (e.g., using infrared or NFC communications). The communication via the communication interface 680, both wired and wireless, may be encrypted to protect the data exchanged between the adapter 600 and the external device/network 800 from third parties.

By electrically coupling the tool-side connector 622, the battery-side connector 624, and the communication interface 680, the adapter 600 enables communications between the external device 800 and the power tool 200, the battery pack 400, or another power tool device. The adapter 600 is configured to receive data from the power tool 200 and the battery pack 400 and relay the information to the external device 800. In a similar manner, the adapter 600 is configured to receive information (e.g., configuration and programming information) from the external device 800 and relay the information to the power tool 200, the battery pack 400, or another power tool device.

The communication indicator 614 provides a visual indication to the user regarding the power and communication status of the adapter 600. The communication indicator 614 includes an LED that is connected to the PCB 650 of the adapter 600 (see FIGS. 13-15). The communication indicator 614 is configured to illustrate whether the adapter 600 is powered, and whether the adapter 600 is communicating with the external device 800 through the communication port 612 or through the wireless communication module 684. In the illustrated embodiment, when the adapter 600 is powered on, the communication indicator 614 lights up solid. When the adapter 600 is communicating with the external device 800 through the communication port 612 or the wireless communication module 684, the communication indicator 614 lights up and flashes at a predetermined rate. In other embodiments, the communication indicator 614 flashes at a first predetermined rate when the adapter 600 communicates with the external device 800 using the communication port 612 and flashes at a second predetermined rate when the adapter 600 communicates with the external device 800 using the wireless communication module 684. In other embodiments, the communication indicator 614 lights up in a first color when the adapter 600 communicates with the communication port 612 and in a second color when the adapter 600 communication with the wireless communication module 684.

In yet other embodiments, when the adapter 600 communicates with the external device 800 through the communication port 612, the communication indicator 614 does not light up. Instead, when the adapter 600 communicates with the external device 800 using the wireless communication module 684, the communication indicator 614 lights up. In other embodiments, the adapter 600 may include one indicator for each type of communication interface with the external device 800. In other embodiments, the adapter 600 may, additionally or alternatively, activate the indicator 614 when the adapter 600 communicates with the external device 800 via the communication port 612.

The power input module 682 is configured to receive the electrical power from the battery pack 400, the external device 800, an integrated power source (e.g., a 9V battery), or a combination thereof. The power input module 682 is also configured to condition the received power into usable power for the various components of the adapter 600. Conditioning the power may include, for example, reducing the electrical power received by the power input module 682 into the appropriate voltage and/or current parameters, or filtering the power received by the power input module 382. The power input module 682 communicates with the controller 674 to determine the power parameters necessary for the controller 674 and ensure that the power provided by the power input module 682 meets the necessary power parameters of the controller 674 and of the other electronic components of the adapter 600.

The power input module 682 is in electrical communication with the battery-side connector 624 and with the communication port 612. As described above, both the battery-side connector 624 and the communication port 612 are configured to receive electrical power through the power terminals (e.g., 638*a-b*). The power input module 682 is configured to receive electrical power from at least one of the battery side connector 624 and the communication port 612. When the adapter 600 is coupled to the battery pack 400, the adapter 600 receives electrical power (i.e., voltage and current) from the battery pack 400 through the battery side connector 624 (i.e., the blade terminals 638*a-b*). When the adapter 600 is coupled to the external device 800 through the communication port 612, the adapter 600 receives electrical power from the communication port 612. Although the external device 800 is configured to provide electrical power to the power tool 200 through the communication port 612, the power from the external device 800 may not be sufficient to energize the motor 214 of the power tool 200. Rather, the power from the external device 800 is used to power the controller 226 of the power tool 200, such that data can still be exchanged between the power tool 200 and the external device 800.

In some situations, the adapter 600 may be coupled to both the battery pack 400 via the battery side connector 624 and the external device 800 through the communication port 612 at the same time. In such instances, the adapter 600 defaults to receiving electrical power from the battery pack 400. In other embodiments, the adapter 600 may default to receiving electrical power from the external device 800 through the communication port 612. In some embodiments, the adapter 600 may be configured to receive electrical power from both the battery pack 400 and the external device 800 when both the battery pack 400 and the external device 800 are physically and electrically coupled to the adapter 600. In such embodiments, the battery pack 400 may be utilized to power some components of the adapter (e.g., an LCD display, the communication indicator 614, etc.) while the external device 800 is utilized to power different components of the adapter (e.g., the controller 674, the wireless communication module 684, etc.).

The power switch 610 is a push-button switch that turns the adapter 600 on and off. When the adapter 600 is on, communication between the external device 800 and the power tool 200 or the battery pack 400 is enabled. When the adapter 600 is off, communications between the power tool 200 and the external device 800 or between the battery pack 400 and the external device 800 cease. In some embodiments, the power switch 610 also includes a lighting element that lights up when the adapter 600 is powered and lights off when the adapter 600 is not powered, thereby providing a visual indication to the user of the power status of the adapter 600. In some embodiments, if the adapter 600 is coupled to both the power tool 200 and the battery pack 400, the power tool 200 and the battery pack 400 can communicate with each other and perform general operations (i.e., the battery pack 400 can transmit electrical power to the power tool 200 to drive the motor 214) regardless of whether the adapter 600 is on or off. In other embodiments, however, the power tool 200 and the battery pack 400 can only communicate with each other and perform general operations when the adapter 600 is either on or removed such that the battery pack 400 is connected directly with the power tool 200.

The adapter 600 switches between a data transmission mode and a pass-through mode. In the data transmission mode, the adapter 600 communicates with the power tool 200, the battery pack 400, or another power tool device using the techniques described above. During the data transmission mode, the adapter 600 can receive and transmit information related to, for example, power tool usage data, usage statistics, power too identification, power tool maintenance data, battery pack discharge cycles, battery pack charge cycles, battery pack conditions and characteristics, configuration and programming data, firmware updates, or a command (e.g., sound an alert tone or flash an LED).

The pass-through mode refers to the operation of the adapter 600 during which data communication does not occur and during which electrical power from the battery pack 400 is passed through the adapter 600 to reach the power tool 200. Instead of exchanging information between the power tool 200 or the battery pack 400, the adapter 600 serves as an intermediary pathway between the device interface 222 of the power tool 200 and the power interface 424 of the battery pack 400. During the pass-through mode, the battery pack 400 transmits electrical power to the power tool 200, which enables the power tool 200 to perform the associated task (e.g., drilling, driving, sawing, sanding, etc.).

The adapter 600 switches between the data transmission mode and the pass-through mode based on the state of the power tool 200. When the power tool 200 is in the active state, the adapter 600 operates in the pass-through mode such that the power tool 200 receives electrical power from the battery pack 400 and communication between the power tool 200 and the battery 400 is enabled. On the other hand, when the power tool 200 is in the idle state, the adapter 600 is able to exchange data with the power tool 200 or with the battery pack 400, if connected. Accordingly, the adapter 600 operates in the data transmission mode when the power tool 200 is in the idle state and operates in the pass-through mode when the power tool 200 is in the active state.

Figure 17:
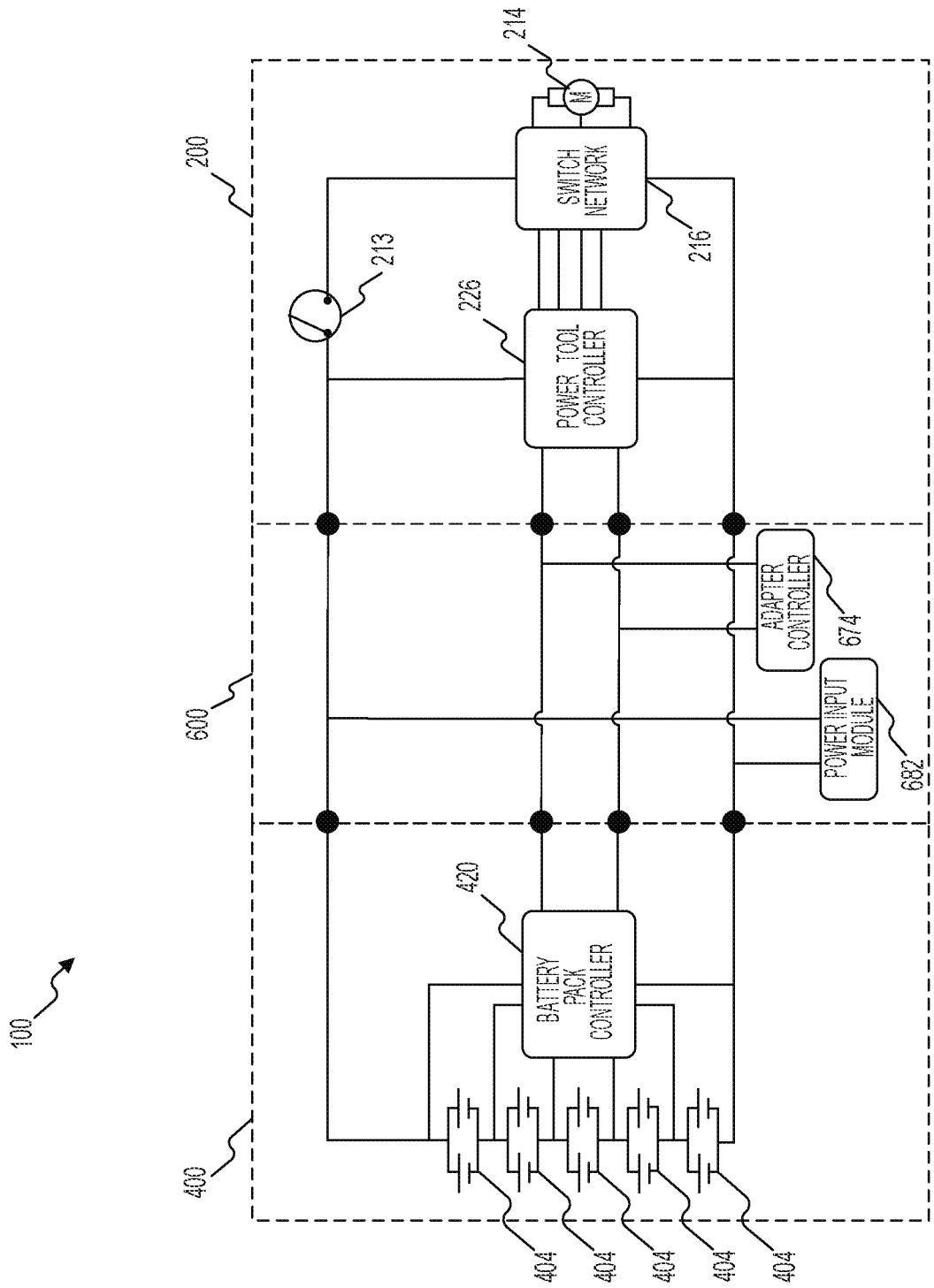
FIG. 17 is a schematic diagram of the connections between the power tool, the adapter, and the battery pack.

FIG. 17 schematically illustrates the connections between the power tool 200, the adapter 600, and the battery pack 400. As shown in FIG. 17, the power tool 200 is in electrical communication with the battery pack 400. The power input module 682 is coupled to the power link 702 between the battery pack 400 and the power tool 200. Therefore, when the battery pack 400 is coupled to the adapter 600, the power link 702 provides electrical power to the power tool 200 and to the power input module 682 of the adapter 600. The controller 674 of the adapter 600 is coupled to the communication links 704 between the power tool 200 and the battery pack 400. The controller 674 of the adapter 600 monitors the signals exchanged over the communication link 704 to determine the state of the power tool 200. When the power tool 200 is ready to receive electrical power from the battery 400 to energize the motor 214, the power tool 200 sends a power request signal over the communication link 702. The adapter 600 determines that the power tool 200 is in the active state when the adapter 600 detects that the power tool 200 transmitted the power request signal. The adapter 600 determines that the power tool 200 is in the idle state when the power tool 200 does not transmit the power request signal to the battery pack 400. In the illustrated embodiment, the power request signal incudes setting one of the communication channels to a high output. In other embodiments, the power request signal includes setting one or both of the communication channels to a low output. In yet other embodiments, the power request signal includes a specific code or value that is transmitted to the battery pack 400.

Figure 18:
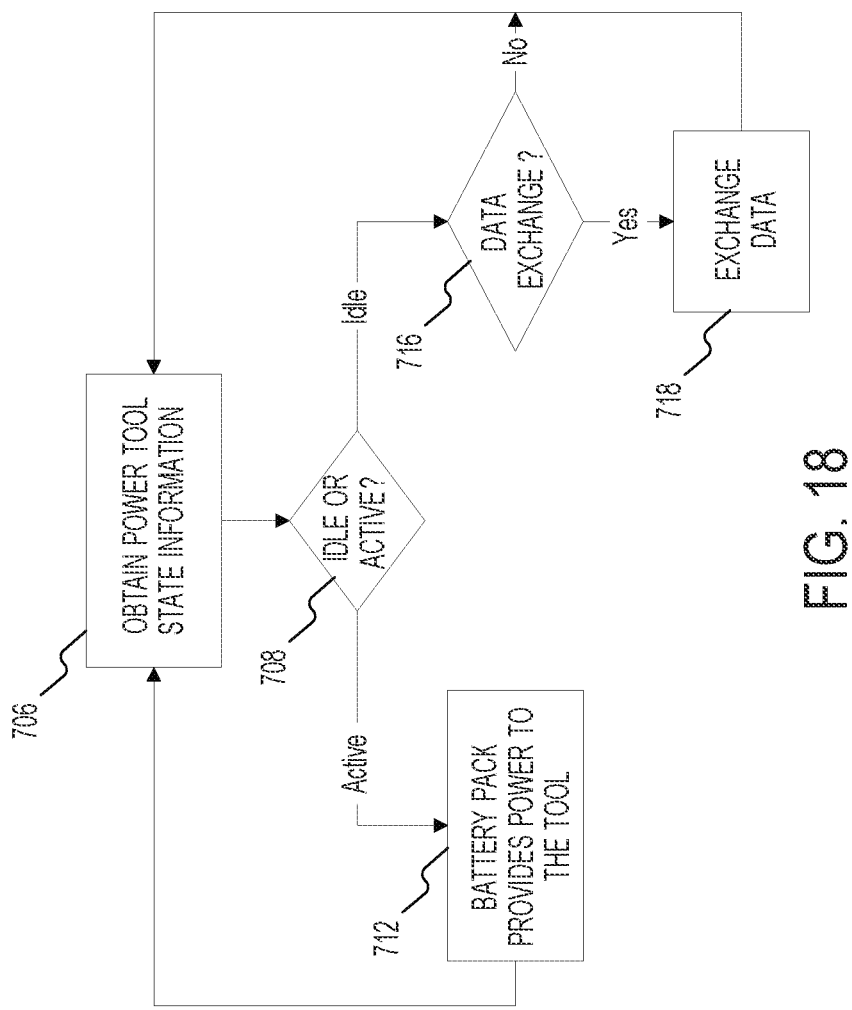
FIG. 18 is flowchart for a method of switching between a data transmission mode and a pass-through mode.

FIG. 18 illustrates the method in which the adapter 600 switches between operating in the data transmission mode and the pass-through mode based on the state of the power tool 200. The adapter 600 first receives information regarding the state of the power tool 200 (step 706). In the illustrated embodiment, the information includes a reading of the communication link 704 between the power tool 200 and the battery pack 400. The adapter 600 then uses the received information to determine the state of the power tool 200 (step 708). If the adapter 600 determines that the power tool is in the active state, the adapter 600 operates in the pass-through mode and allows the battery pack 400 to provide electrical power to the power tool 200 to energize the motor 214 (step 712). If, on the other hand, the adapter 600 determines that the power tool is in the idle state, the adapter 600 then determines whether data exchange has been initiated (step 716). If data exchange between the adapter 600 and the power tool 200 or between the adapter 600 and the battery pack 400 has not been initiated, the adapter 600 continues to monitor the communication link 704 between the power tool 200 and the battery pack 400 to receive state information from the power tool 200 (step 706). If communication between the adapter 600 and the power tool 200 or between the adapter 600 and the battery pack 400 has been initiated, the adapter 600 exchanges data between the adapter and the power tool device (step 718). The adaptor 600 continues to cycle through the method steps of FIG. 18 over the course of a data exchange and, accordingly, if the power tool 200 requests power from the battery pack 400, the data exchange may be interrupted mid-stream.

Figure 19:
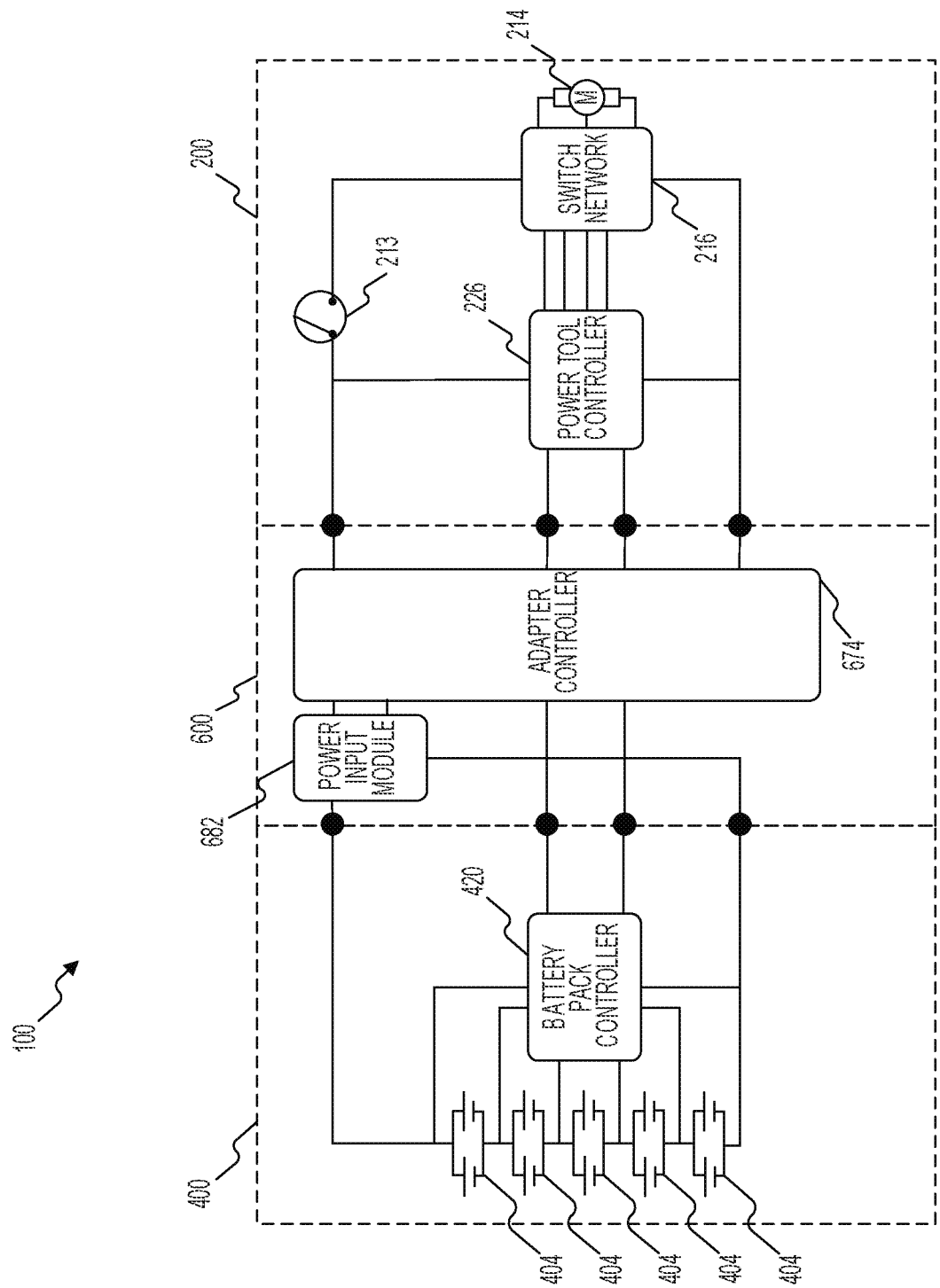
FIG. 19 is a schematic diagram of the alternative connections between the power tool, the adapter, and the battery pack.

FIG. 19 illustrates a schematic diagram for an alternative connection between the power tool 200, the adapter 600, and the battery pack 400. As shown in FIG. 19, the signals from the power tool 200 are received by the controller 674 of the adapter 600. Similarly, the signals from the battery pack 400 are received by the controller 674 of the adapter 600. The controller 674 continues to monitor the incoming signals from both the power tool 200 and the battery pack 400 to determine if the power tool 200 changes from an idle state to an active state or vice versa. When the adapter 600 operates in the pass-through mode, the controller 674 of the adapter 600 continues to receive information exchanged between the power tool 200 and the battery pack 400. The controller 674 includes hardware and/or software that allows the adapter controller 674 to set the output connections to the power tool 200 substantially equal to the input connections of the battery pack 400 and vice versa, allowing signals to essentially pass through the controller 674. When the adapter 600 operates in the data transmission mode, the controller 674 of the adapter 600 receives information from the power tool 200 and/or from the battery pack 400.

In some embodiments, during the data transmission mode, the adapter 600 does not store received data in memory 688. Rather, the adapter 600 is connected to both the external device 800 and the power tool device (e.g., the power tool 200 or the battery pack 400) simultaneously to exchange data between the external device 800 and the power tool device. In such embodiments, since the data is moving seemingly immediately from the power tool 200 to the external device 800 or from the external device 800 to the power tool 200, the adapter 600 optionally does not store the data in the memory 688. Rather, the adapter 600 may include a buffer that momentarily holds the data received from the power tool 200 or battery pack 400 before the adapter 600 transmits the data to the external device 800, and that holds the data received from the external device 800 en route to the power tool 200 or the battery pack 400.

In some embodiments, the adapter 600 may be capable of both storing power tool data, battery pack data, and data received from another power tool device in the memory 688 and retrieve the data at a later time, and of transmitting the data seemingly instantaneously between the power tool 200, the battery pack 400, or another power tool device and the external device 800. In such embodiments, the adapter 600 may default to exchanging data seemingly instantaneously when both a power tool device (e.g., the power tool 200, the battery pack 400, etc.) and the external device 800 are coupled to the adapter 600.

In the illustrated embodiment, the controller 674 is also coupled to the external memory receiver 678 to store additional or duplicative data on an external memory coupled thereto. The external memory receiver 678 may include, for example, a port positioned on the housing 604 of the adapter 600 for receiving an external memory (e.g., an SD card). The port for the external memory is not shown in the figures, but may be positioned on a sidewall of the housing 604. For example, a slot for receiving an SD card can be positioned on a back sidewall opposite the communication port 612. The external memory receiver 678 allows power tool data and battery pack data to be stored separate from the adapter 600. For example, a set of power tools may be associated with the same owner. Tool and/or battery pack data can be exported from each power tool one at a time, and saved onto the external memory. The owner can then keep the data associated with the set of power tools in the same external memory to back up the data stored on the external device 800, or to avoid storing the data on the external device 800. The external memory may also provide additional protection for the data stored therein. In the illustrated embodiment, the external memory includes a Secure Digital ("SD") card. In other embodiments, the external memory may include other types of memory such as, for example, a USB flash drive.

The controller 674 is also connected to the display connector 676. The display connector 676 is provided on the adapter 600 to provide the user with an alternative way of interacting with the communication system 100, and in particular, with the adapter 600. A user may connect a display to the display connector 676 and be able to access information without exporting the data to the external device 800. For example, if the user wishes to quickly access maintenance information for the power tool 200, the user may couple the power tool 200 to the adapter 600, connect a display to the display connector 676, and access the maintenance information stored on the tool. Therefore, the user can access power tool 200 and/or battery pack 400 information without exporting data from the power tool device (e.g., the power tool 200, the battery pack 400, etc.) and importing data from the adapter 600 to the external device 800. In some embodiments, the display can be integral to the adapter 600 and positioned on a sidewall of the housing 604.

Figure 20:
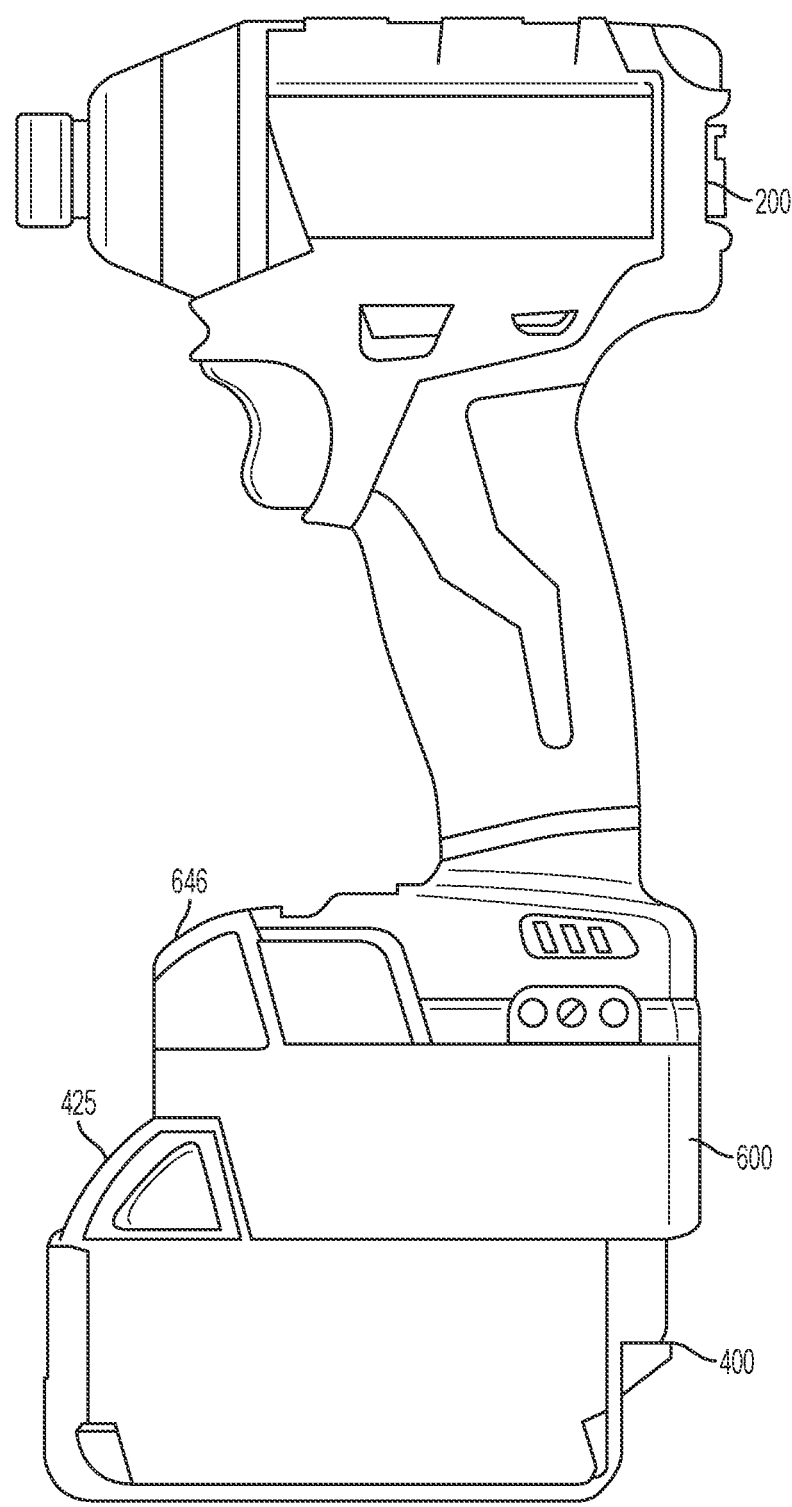
FIG. 20 is a side view of the power tool, the adapter, and the battery pack of the communication system of FIG. 1.

FIG. 20 illustrates the adapter 600 coupled to both the power tool 200 and the battery pack 400. As shown in FIG. 20, when coupled to the power tool 200, both the adapter 600 and the battery pack 400 increase the height of the power tool 200. FIG. 20 also illustrates a horizontal offset H between the adapter 600 and the battery pack 400. Such a horizontal offset H allows the angled surfaces 644 and 425 of the adapter 600 and the battery pack 400, respectively to be accessible (i.e., visible) to a user.

Figure 21:
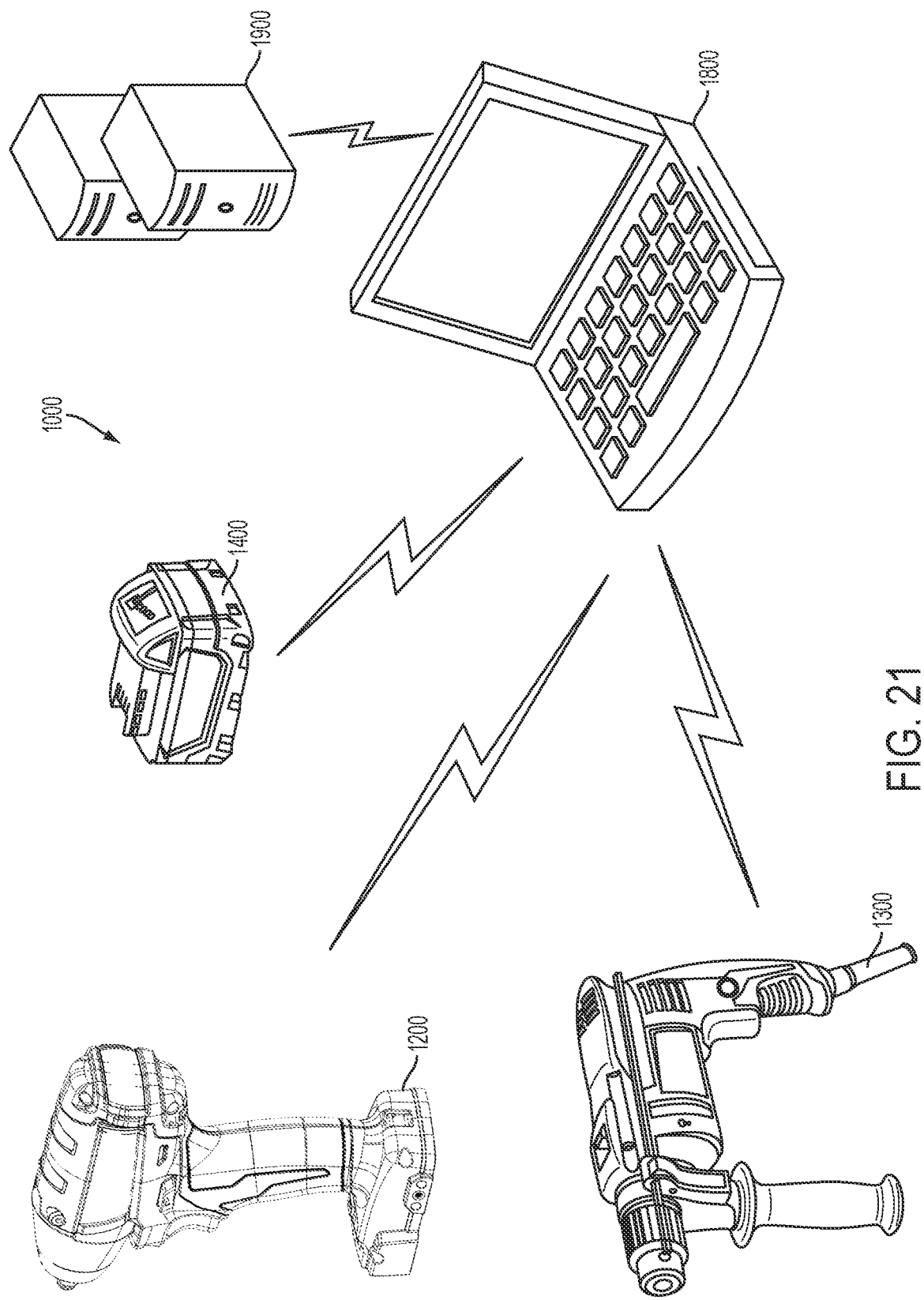
FIG. 21 illustrates a communication system according to another embodiment of the invention.

FIG. 21 illustrates a second communication system 1000. The second communication system 1000 includes similar components as the first communication system 100 shown in FIG. 1, and like parts have been given like reference numbers, plus 1000. The second communication system 1000 includes a first power tool 1200, a second power tool 1300, a battery pack 1400, an external device 1800, and an external server 1900.

The first power tool 1200, the battery pack 1400, and the second power tool 1300 each include a wireless communication module that allows the power tool devices to communicate directly with the external device 1800. The power tool devices (e.g., the first power tool 1200, the second power tool 1300, and the battery pack 1400 may communicate power tool status, power tool operation statistics, power tool identification, stored power tool usage information, power tool maintenance data, battery pack status, battery pack state of charge, battery pack operation statistics, battery pack identification, battery pack discharge and charge cycles, battery pack maintenance data, and the like. The external device 1800 can also write data to the first power tool 1200, the second power tool 1300, and/or the battery pack 1400 for power tool configuration, battery pack configuration, firmware upgrades, or to send commands (e.g., turn on a worklight). The external device 1800 also allows a user to set operational parameters, safety parameters, select tool modes, select battery pack options, and the like.

The external device 1800 may be, for example, a laptop computer, a tablet computer, a smartphone, a cellphone, or another electronic device capable of communicating with the adapter 600 and providing a user interface. The external device 1800 includes a wireless communication module that is compatible with the wireless communication module of the first power tool 1200, the second power tool 1300, and the battery pack 1400. The external device 1800, therefore, grants the user access to data related to the first power tool 1200, the second power tool 1300, the battery pack 1400, or another power tool device (e.g., a charger), and provides a user interface such that the user can interact with the controller of the first power tool 1200, the second power tool 1300, the battery pack 1400, or another power tool device.

In addition, the external device 1800 can also share the information obtained from the first power tool 1200, the second power tool 1300, the battery pack 1400, or another power tool device with a remote server 1900. The remote server 1900 may be used to store the data obtained from the external device 1800, provide additional functionality and services to the user, or a combination thereof. In one embodiment, storing the information on the remote server 1900 allows a user to access the information from a plurality of different locations. In another embodiment, the remote server 1900 may collect information from various users regarding their power tool devices and provide statistics or statistical measures to the user based on information obtained from the different power tools. For example, the remote server 1900 may provide statistics regarding the experienced efficiency of the power tools 1200, 1300, or battery pack 1400, typical usage of the power tools 1200, 1300, and other relevant characteristics and/or measures of the power tools 1200, 1300 or the battery pack 1400.

Figure 22:
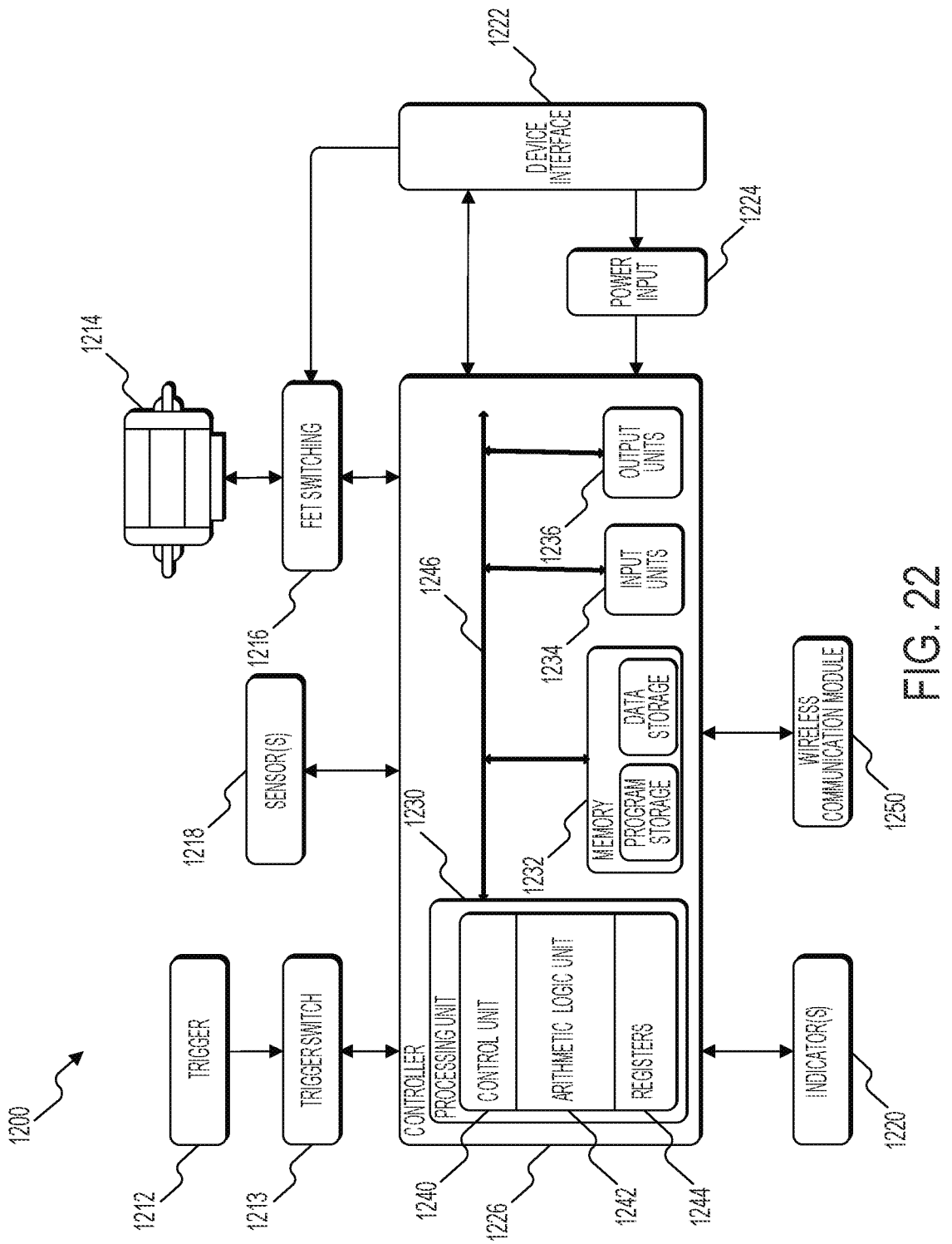
FIG. 22 illustrates a schematic diagram of a first power tool of the communication system shown in FIG. 21.

As shown in FIG. 22, the first power tool 1200 includes similar components to those of the power tool 200 shown in FIGS. 2-4, and like parts have been given like reference numbers, plus 1000. The controller 1226, however, is also in communication with a wireless communication module 1250. The wireless communication module 1250 includes a radio transceiver and an antenna to send and receive wireless messages to and from the external device 1800. In some embodiments, the wireless communication module 1250 includes its own controller to effect wireless communications between the first power tool 1200 and the external device 1800. For example, a controller associated with the wireless communication module 1250 may buffer incoming and/or outgoing data, communicate with the controller 1226, and determine the communication protocol and/or settings to use in wireless communications.

In the illustrated embodiment, the wireless communication module 1250 is a Bluetooth® module. The Bluetooth® module communicates with the external device 1800 employing the Bluetooth® protocol. Therefore, in the illustrated embodiment, the external device 1800 and the first power tool 1200 are in proximity of each other while they exchange data. In other embodiments, the wireless communication module 1250 communicates using other protocols (e.g., Wi-Fi, cellular protocols, etc.) over a different type of wireless networks. For example, the wireless communication module 1250 may be configured to communicate via Wi-Fi through a wide area network such as the Internet or a local area network, or to communicate through a piconet (e.g., using infrared or NFC communications). The communication via the communication module 1250 may be encrypted to protect the data exchanged between the first power tool 1200 and the external device/network 1800 from third parties.

As discussed above, the wireless communication module 1250 is configured to receive data from the power tool controller 1226 and relay the information to the external device 1800. In a similar manner, the wireless communication module 1250 is configured to receive information (e.g., configuration and programming information) from the external device 1800 and relay the information to the power tool controller 1226. The other components and operations of the power tool 1200 are similar to those described with reference to the power tool 200 of the communication system shown in FIG. 1.

Figure 23:
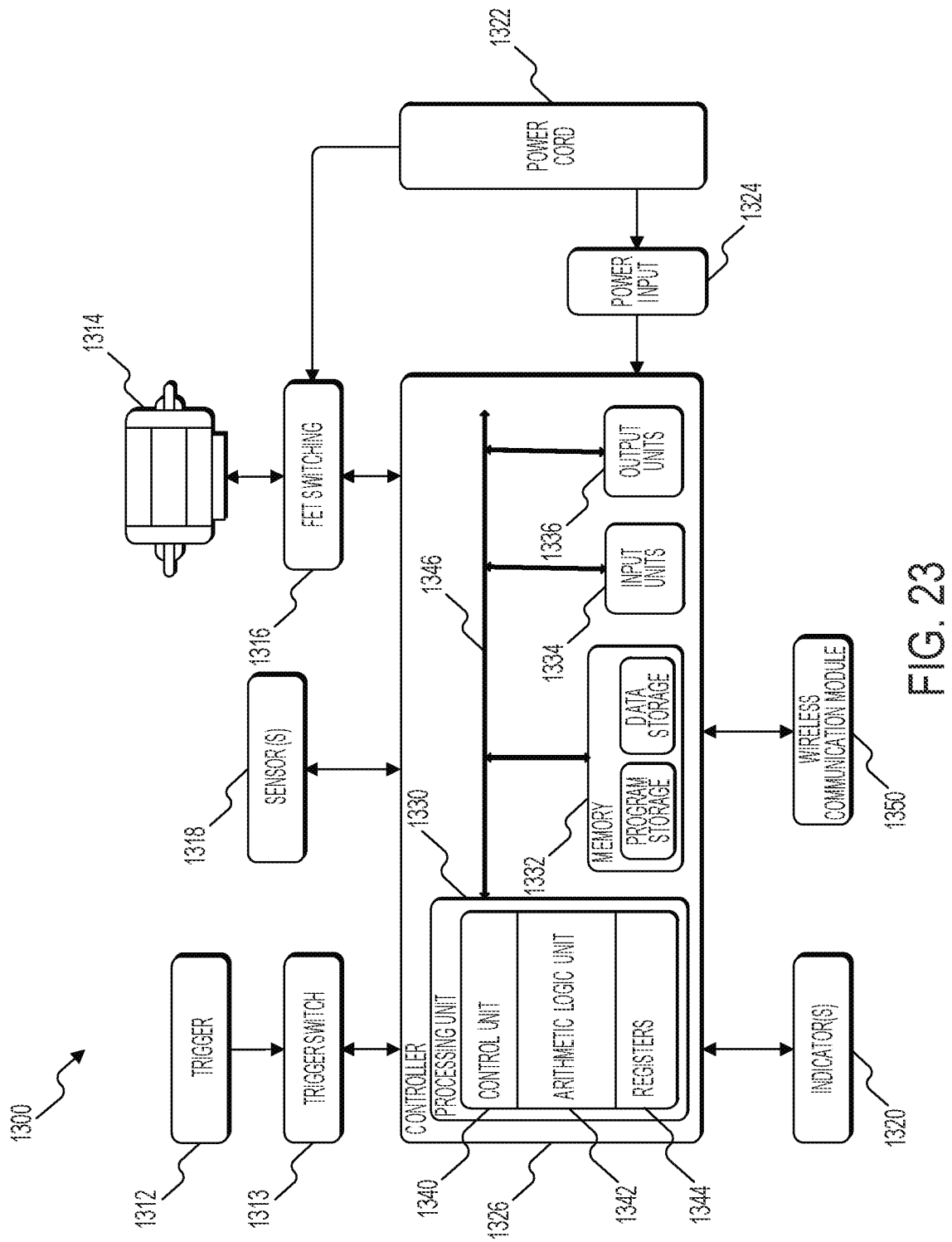
FIG. 23 illustrates a schematic diagram of a second power tool of the communication system shown in FIG. 21.

As shown in FIG. 23, the second power tool 1300 is similar to the first power tool 1200 and similar components are given like reference numerals plus 100. The second power tool 1300 also includes, among other things, a wireless communication module 1350 and a controller 1326. The second power tool 1300 is a corded power tool and receives electrical power from an external AC source through a power cord 1322 rather than through a battery pack (e.g., the battery pack 1400). The power cord 1322 connects to an external AC source (e.g. a wall outlet or a portable AC source). The power cord 1322 then connects to a power input unit 1324 that conditions the electrical power received through the power cord 1322 to an appropriate power level for the controller 1326. The power cord 1322 is also coupled to the switching network 1316 to provide power to the motor 1314. The controller 1326 controls the states of different switches within the switching network 1316 to thereby control operation of the motor 1314. The other components and operations of the second power tool 1300 are similar to those described with reference to the first power tool 1200.

Figure 24:
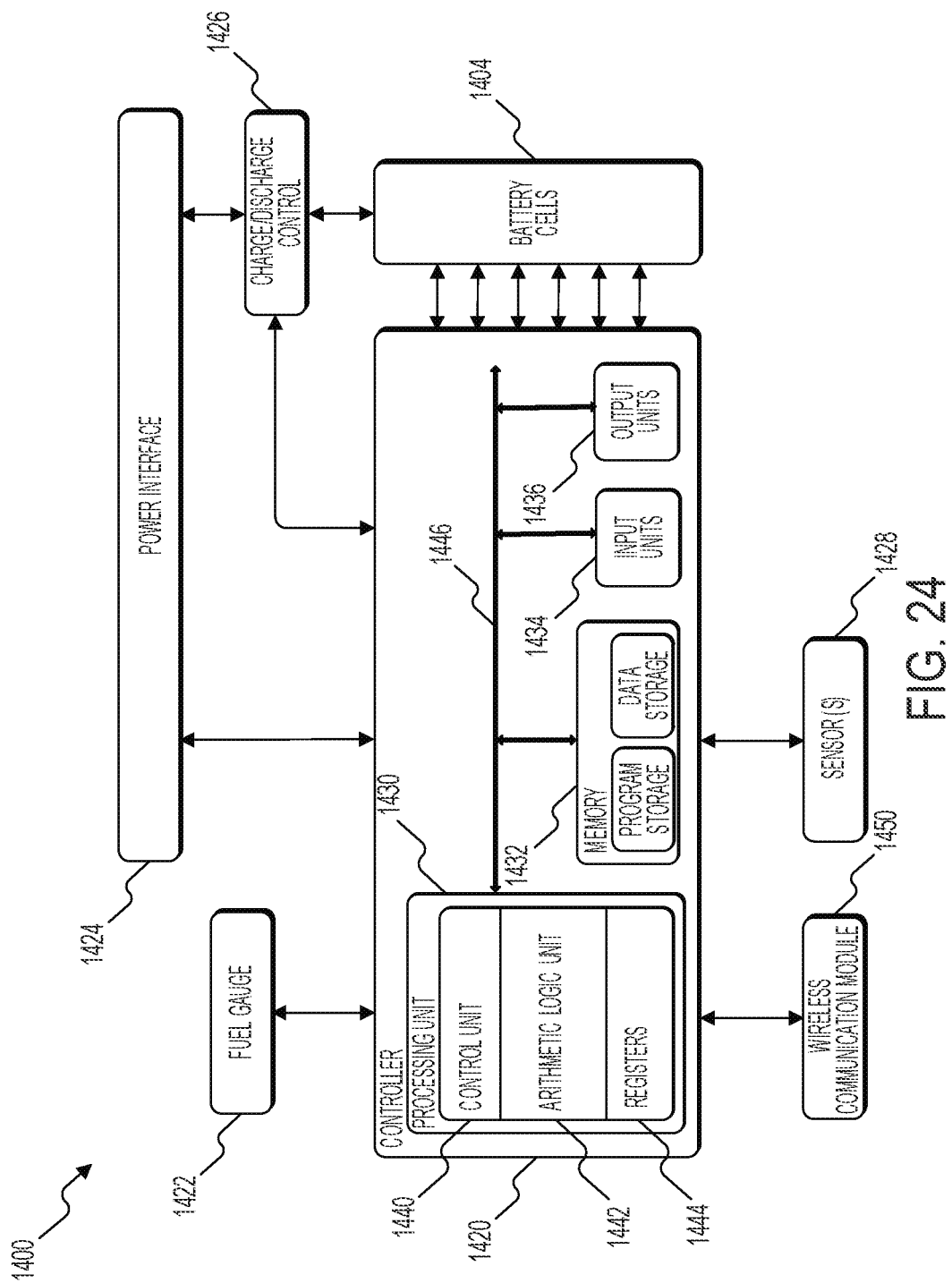
FIG. 24 illustrates a schematic diagram of a battery pack of the communication system shown in FIG. 21.

As shown in FIG. 24, the battery pack 1400 includes similar components to those of the battery pack 400 shown in FIGS. 5-7, and like parts have been given like reference numbers plus 1000. The controller 1420, however, is further in communication with a wireless communication module 1450. The wireless communication module 1450 includes a radio transceiver and an antenna to send and receive wireless messages to and from the external device 1800. In some embodiments, the wireless communication module 1450 includes its own controller to effect wireless communications between the battery pack 1400 and the external device 1800. For example, a controller associated with the wireless communication module 1450 may buffer incoming and/or outgoing data, communicate with the controller 1420, and determine the communication protocol and/or settings to use in wireless communications.

In the illustrated embodiment, the wireless communication module 1450 is a Bluetooth® module. The Bluetooth® module communicates with the external device 1800 employing the Bluetooth® protocol. Therefore, in the illustrated embodiment, the external device 1800 and the battery pack 1400 are in proximity of each other while they exchange data. In other embodiments, the wireless communication module 1450 communicates using other protocols (e.g., Wi-Fi, cellular protocols, etc.) over a different type of wireless networks. For example, the wireless communication module 1450 may be configured to communicate via Wi-Fi through a wide area network such as the Internet or a local area network, or to communicate through a piconet (e.g., using infrared or NFC communications). The communication via the communication module 1450 may be encrypted to protect the data exchanged between the first battery pack 1400 and the external device/network 1800 from third parties.

As discussed above, the wireless communication module 1450 is configured to receive data from the battery pack controller 1420 and relay the information to the external device 1800. In a similar manner, the wireless communication module 1450 is configured to receive information (e.g., configuration and programming information) from the external device 1800 and relay the information to the battery pack controller 1420. The other components and operations of the battery pack 1400 are similar to those described with reference to the battery pack 400 of the communication system shown in FIG. 1.

In the illustrated embodiment, the wireless modules 1250, 1350, 1450 included in the first power tool 1200, the second power tool 1300, and the battery pack 1400 are substantially similar (e.g., Bluetooth® communication modules). Using similar wireless communication modules 1250, 1350, 1450 allows the power tool devices to be compatible with each other and with generally the same external devices 1800. In other embodiments, however, the wireless communication module 1250, 1350, 1450 in each of the power tool devices may be different from each other. In such embodiments, the external device 1800 may include different communication modules to accommodate the wireless communication modules 1250, 1350, 1450 of the different power tool devices, or each of the power tool devices 1200, 1300, 1400 may be compatible with different sets of external devices 1800.

The first power tool 1200 and the battery pack 1400 shown in FIGS. 22 and 24, in some embodiments, can optionally communicate with the external device 1800 via the terminals and contacts in conjunction with the adapter 600 shown in FIGS. 8-16. Thus, in these embodiments, the first power tool 1200 and the battery pack 1400 can selectively communicate with the external device 1800 wirelessly and/or via a wired connection. As discussed with respect to the first communication system shown in FIG. 1 and the second communication system shown in FIG. 21, the external device 800/1800 can be used to configure different parameters of a power tool 200/1200/1300. In particular, the external device 800/1800 can be used to program a specific mode for the power tool 200/1200/1300. When a user selects that particular mode on the power tool 200/1200/1300, the power tool 200/1200/1300 functions according to the specific mode.

Figure 25:
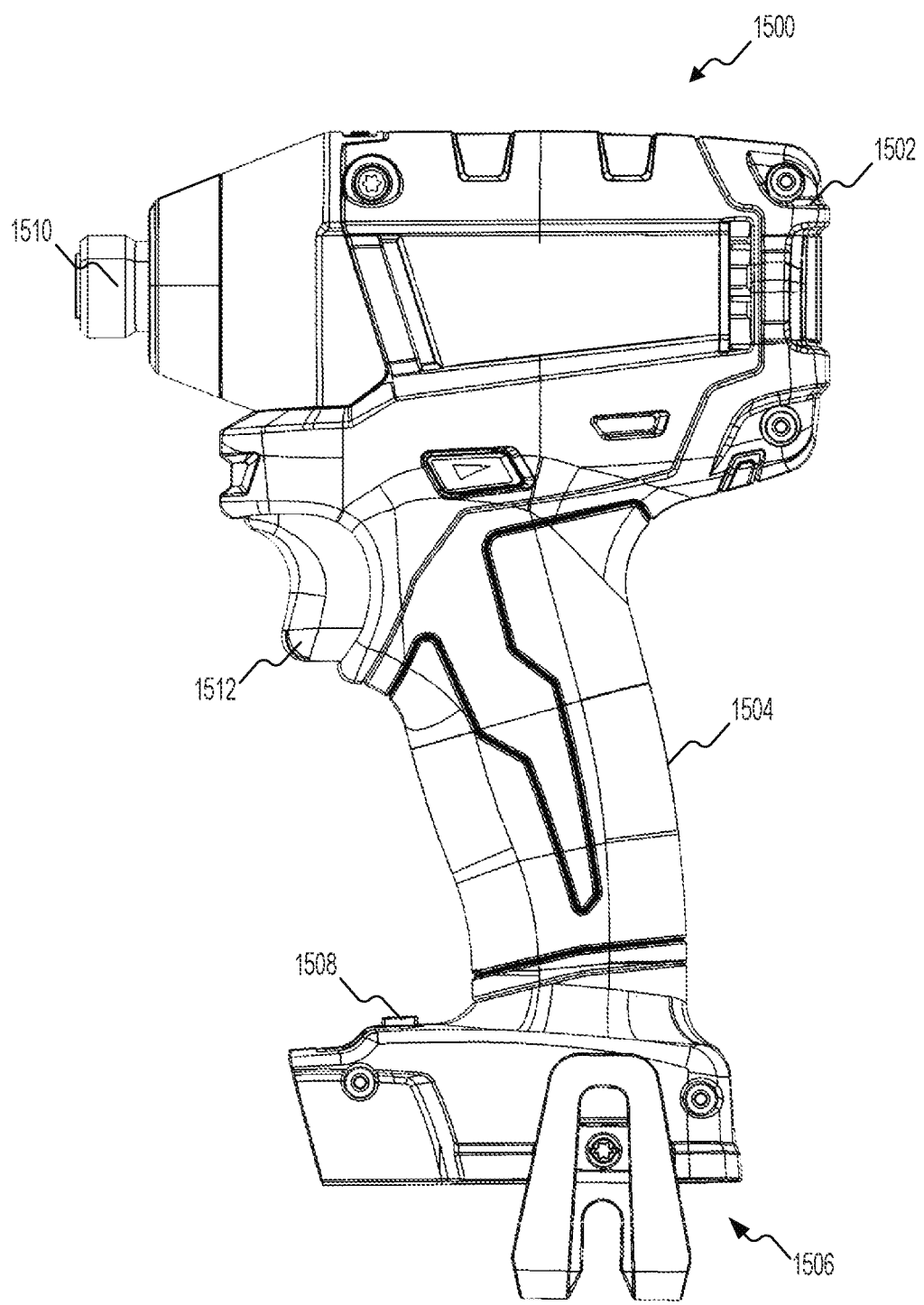
FIG. 25 illustrates a side view of an impact driver.

FIG. 25 illustrates an impact driver 1500 operable to communicate with an external device 800, 1800 via an adapter like the power tool 200 and/or wirelessly like power tool 1200. The external device 800, 1800 allows a user to select, change, and/or modify power tool modes of the impact driver 1500. Although the power tool 1500 illustrated and described is an impact driver, power tool modes can similarly be changed on a variety of power tool (e.g., a power drill, a hammer drill, a pipe cutter, etc.). As shown in FIG. 25, the impact driver 1500 includes an upper main body 1502, a handle 1504, a device receiving portion 1506, mode selection switches 1508, an output drive device or mechanism 1510, and a trigger 1512. The impact driver 1500 includes similar components to the power tool 200 shown in FIGS. 2-4, and to the power tool 1200 shown in FIG. 22. In other words, in some embodiments, the impact driver 1500 communicates with the adapter 600 to exchange information with the external device 800. In other embodiments, the impact driver 1500 includes a wireless communication module to communicate directly with the external device 1800.

Figure 26:
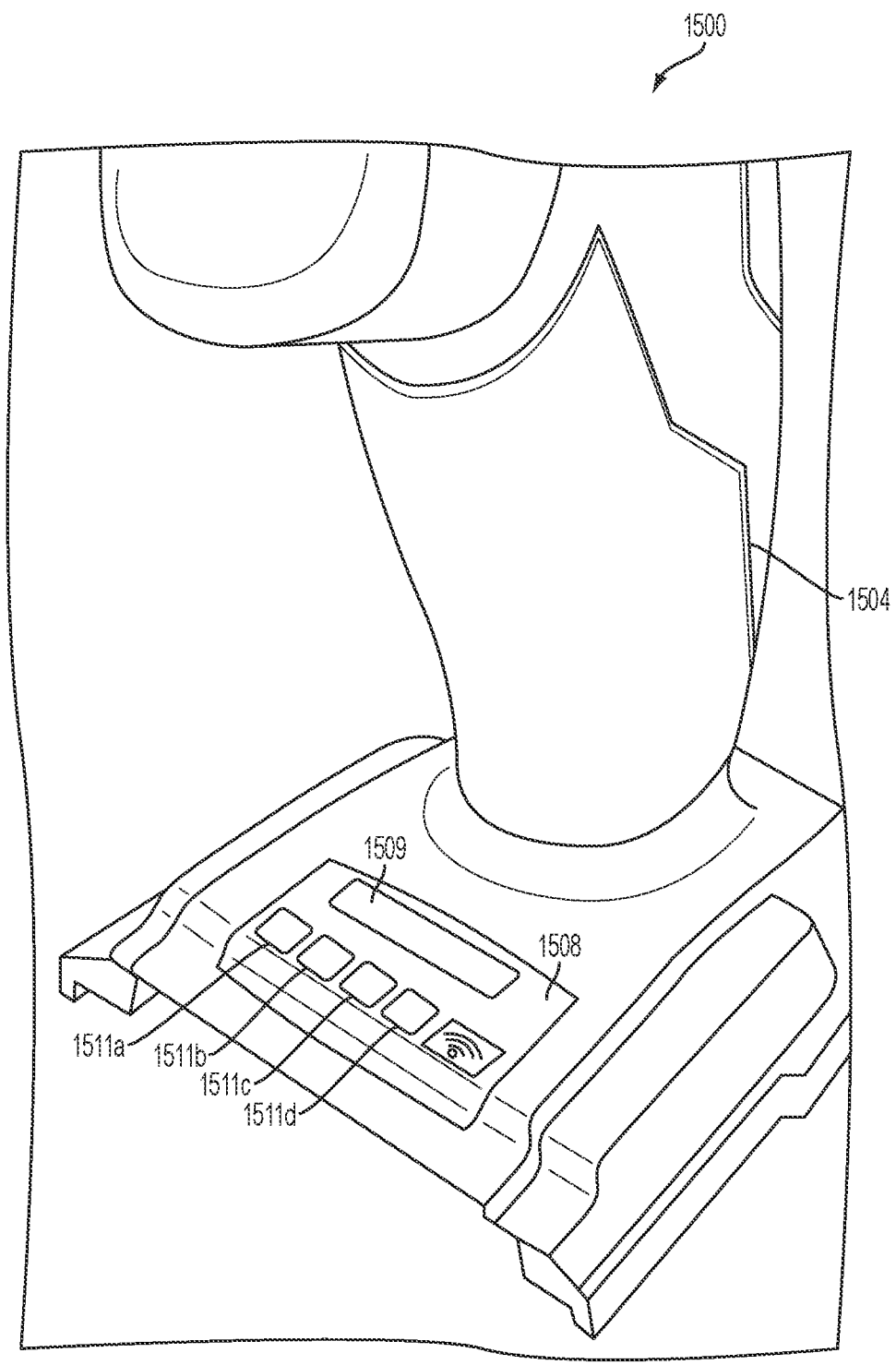
FIG. 26 illustrates a mode selection control of the impact driver shown in FIG. 25.

The mode selection switches 1508 allow a user to select a mode of operation for the impact driver 1500. As shown in FIG. 26, the mode selection switches 1508 include a push button 1509 and mode indicators 1511a-d. The mode indicators 1511a-d display to the user which mode of operation is currently selected. In the illustrated embodiment, the mode indicators 1511a-d include LEDs. In other embodiments, the mode indicators 1511a-d may include other type of lighting elements (OLEDs), a display, a rotary knob, an icon, or any other visual or tactile indicator that allows the user to identify the current operation mode for the impact driver 1500. A user presses the push button 1509 to cycle through the different available modes of operation for the impact driver 1500. In other words, one press of the push button 1509 selects a first mode for the impact driver 1500, a second press of the push button 1509 selects a second mode for the impact driver 1500, and so on. The number of mode indicators 1511a-d (i.e., four) is representative of the number of modes that the impact driver 1500 may have assigned to it at a given time and available through cycling via the push button 1509 (i.e., four). In other words, in the illustrated embodiment, the push button 1509 selects between four different modes for the power tool 1500. In other embodiments, the push button 1509 selects among more or less operation modes for the impact driver 1500. In other embodiments, the selection switches 1508 do not include the push button 1509, but instead include another mechanism to select an operation mode for the impact driver 1500. For example, the impact driver 1500 may include a switch movable between four positions, each position selecting a different operation mode for the impact driver 1500. Other types of selection switches 1508 may also be employed.

Through communication with the external device 800, 1800, the impact driver 1500 can determine which four modes are accessible to the user when operating the impact driver 1500. In other words, the user can select and assign a mode to each of the mode indicators 1511a-d from on a list of different operation modes for the impact driver 1500. The other modes that are compatible with the impact driver 1500 and available for assignment to the mode indicators 1511a-d, but that are not currently assigned, may be referred to as unassigned modes of the impact driver 1500. The user may select modes for assignment from a variety of pre-configured modes and user-defined modes. The pre-configured modes and the user-defined modes may be stored in a memory of the impact driver 1500 and the user may select which mode is assigned to which mode indicator 1511a-d through the external device 800, 1800. In other embodiments, the pre-configured modes and the user-defined modes are stored on the external device 800, 1800 or on the remote server 900, 1900 and the user selects which modes to assign to and store on the impact driver 1500 using the external device 800, 1800. In these embodiments, the four modes assigned to the mode indicators 1511a-d are stored on the impact driver 1500, while the other potential (unassigned) modes remain on a memory outside of the tool (e.g., on the external device 800,1800 or remote server 900,1900).

A pre-configured mode is, for instance, a mode that sets specific performance characteristics (or variables) of the tool for addressing certain applications. A pre-configured mode may have certain default settings for particular applications (e.g., working with certain screw types or lengths or with certain types of work pieces like metal or wood), and a user may further configure certain relevant performance characteristics within a pre-configured mode. A user-defined mode allows the user to adjust certain performance characteristics (or variables) controllable on the tool. The performance characteristics that are adjustable may depend on the selected user-defined mode. A user-defined mode may rely on the user to set performance characteristics to fit their particular application, rather than using pre-programmed settings selected based on particular applications.

The pre-configured modes for the impact driver 1500 include a low speed mode, a medium speed mode, a high speed mode, a self-tapping screw mode, a screwdriver mode, a stainless steel mode, an anti-slip mode, an anti-strip mode, and an anti-spin off mode. The low speed mode is generally used for precision work. In the first mode, a motor of the impact driver 1500 operates at low speeds (e.g., between 0-200 revolutions per minute (RPM)). The medium speed mode is generally used to prevent damage to the fastener and/or to the material on which the fastener is secured. In the medium speed mode, the motor of the impact driver 1500 operates at medium speeds (e.g., between 0-2,000 RPMs). The high speed mode is generally used to utilize the maximum speed and power available on the impact driver 1500. In the high speed mode, the motor of the impact driver 1500 operates at high speeds (e.g., between 0-2,900 RPMs). The low speed mode, medium speed mode, and high speed mode are, in some embodiments, by default assigned to the first mode indicator 1511a, second mode indicator 1511b, and third mode indicator 1511c, respectively. Other modes may be assigned as the default modes, and the fourth mode indicators 1511d may be assigned a default mode as well, such as the self-tapping screw mode. A user can continue to use these default modes, or the user may find that other modes are better suited for a task or project and may change the modes accordingly.

The self-tapping screw mode is generally used for driving self-tapping screws into galvanized steel, and it prevents a user from overdriving and stripping screws by operating the impact driver at too high a level of RPMs and impacts per minute (IPMs). In the self-tapping screw mode, the impact driver 1500 begins turning at a high speed (e.g., 1000 RPMs) and reduces the speed when an impact mechanism trips. During the self-tapping screw mode, a controller of the impact driver 1500 monitors an impact mechanism. When the controller determines that the impact mechanism has been activated, the controller reduces the power provided to the motor of the impact driver 1500 to thereby reduce the rotating speed of the impact driver 1500. A user may be able to further configure/customize the self-tapping screw mode by selecting, for example, the starting speed for the impact driver 1500, the finishing or lowered speed for the impact driver 1500, and/or the rate at which the impact driver 1500 decreases speed. The user may change such parameters using the external device 800/1800.

The screwdriver mode is generally used for driving small machine screws. Many users find it challenging to use an impact driver for more delicate applications because they may worry that the impact mechanism may damage the fastener and/or the material. In the screwdriver mode, the impact driver 1500 operates at low rotational speeds (e.g., 0-500 RPMs). During the screwdriver mode, the impact driver 1500 also activates an electronic clutch such that operation of the impact driver 1500 stops before the impact mechanism is activated. The electronic clutch anticipates when the impact mechanism may be activated and instead interrupts power to the motor of the impact driver 1500 to prevent the impact driver 1500 from damaging the fastener and/or the material. A user may determine the maximum speed (e.g., maximum RPMs) when the impact driver 1500 operates in the screwdriver mode.

The stainless steel mode is generally used for driving self-tapping screws into 12-16 gauge stainless steel. Due to the nature of stainless steel, users have encountered that some screw tips melt before cutting the surface of stainless steel. Many users have been sacrificing fasteners until the surface is cut and a fastener can be properly installed. In the stainless steel mode, the impact driver 1500 automatically pulses the trigger 1512. By pulsing the trigger 1512, the impact driver 1500 operates at slower speeds. Slower speeds actually perforate stainless steel faster and generate less heat between the screw tip and the surface of the stainless steel. Therefore, by using the stainless steel mode, the user may not need to sacrifice fasteners until the surface of the stainless steel is finally perforated. A user may further customize the stainless steel mode by setting maximum RPMs and IPMS, setting minimum RPMs and IPMs, and/or setting the pulsing frequency for the impact driver 1500.

The anti-slip mode is generally used for driving screws at high speeds into metal or wood. Some users, when trying to drive screws at high speeds, lose engagement between the impact driver 1500 and the fastener head and/or have the fastener slip off the desired drive position on the surface of the material. In the anti-slip mode, the impact driver 1500 begins driving at a lower speed (e.g., 250 RPMs) and automatically increases the driving speed when the impact mechanism is activated. Therefore, by starting at a lower speed, slipping of the impact driver 1500 and/or slipping of the fastener becomes less likely, and efficiency is achieved by automatically increasing the fastening speed once the impact mechanism is activated. The user may further customize the anti-slip mode by setting starting RPMs or IPMs, setting increased and/or finishing RPMs or IPMs, and/or setting the rate at which the fastening speed increases.

The anti-strip mode is generally used for driving concrete screws into a concrete block or concrete slab. The anti-strip mode may also be used for driving small sheet metal screws into sheet metal. Concrete screws can sometimes break in the middle of the screw or at the head of the screw, rendering the screw unusable because the impacts are too fast or too strong, and the screw is overdriven. In the anti-strip mode, the impact driver 1500 begins fastening the concrete screws at a high speed (e.g., 1500 RPMs) and decreases the fastening speed when the impact mechanism is activated. The user may customize the anti-strip mode by selecting the starting RPMs or IPMs, setting the finishing RPMs or IPMs, and/or setting the rate at which the fastening speed decreases.

The anti-spin off mode is generally used for removing fasteners such as, nuts and bolts. When removing nuts and bolts, the nuts and bolts can sometimes lose engagement with the impact driver 1500 and fall from a lift or elevated surface. In the anti-spin off mode, the impact driver 1500 begins rotating at a high speed (e.g., 1500 RPMs) and automatically decreases the fastening speed when the impact mechanism is deactivated. The user can further customize the anti-spin off mode by selecting starting RPMs/IPMs, selecting finishing RPMs or IPMs, and/or setting the rate at which the fastening speed decreases.

The selectable modes of the impact driver 1500 can also be assigned user-defined modes. The user-defined modes include modes for which the user defines the operation of the impact driver 1500. The user-defined modes for the impact driver 1500 include an impact counting mode, a memory mode, an impacting variable speed mode, and a non-impacting mode. The impact counting mode is generally used for repetitive pre-fabrication and/or production fastening. The impact counting mode can also be used for driving anchors on projects with seismic regulations. The impact counting mode ensures that the same torque is applied to every fastener. In the impact counting mode, the impact driver 1500 employs a counter and/or a timer to count how many impacts the impact driver 1500 delivers to a fastener. When the impact driver 1500 uses a timer, the timer determines the period of time during which the impact driver 1500 impacts the fastener. In the impact counting mode, specific maximum and minimum rotational speeds are assigned to the trigger 1512, such that the same torque is applied to every fastener. The impact driver 1500 can then be used to secure one fastener, and any subsequent fastener will be secured with the same number of impacts or for the same amount of time as the first fastener, thereby ensuring equal torque is applied to each fastener. A user may further specify the minimum and maximum RPMs set to the trigger 1512.

The memory mode is also used for repetitive pre-fabrication and/or production fastening. In the memory mode, the impact driver 1500 records a fastening operation and then repeats the fastening operation on subsequent fasteners. For example, for the first fastening operation, the impact driver 1500 may record the RPMs, the IPMS, and/or the trigger 1512 travel profile. Then, when fastening a second fastener, the impact driver 1500 follows the trigger travel profile, the RPMs, and the IPMs as recorded.

The impacting variable speed mode is generally used for driving fasteners for which users may prefer more control over the minimum and maximum speeds (e.g., RPMs) than those specified by the low speed, medium speed, and high speed modes for the impact driver 1500. Therefore, the impacting variable speed mode allows a user to specifically set the maximum and the minimum speeds for the impact driver 1500. In some embodiments, the user may set the maximum and the minimum speeds for the impact driver 1500 at the same speed, and thereby deactivate the variable speed mode of the impact driver 1500.

The non-impacting mode is generally used for driving small fasteners that require low torque. As discussed above, some fasteners or particular applications for fasteners are fragile. Therefore, the impacting mechanism may damage the fastener and/or the material. In the non-impacting mode, the user selects the maximum fastening speed such that the impacting mechanism is not activated. In some embodiments, the user can use the non-impacting mode for setting the minimum and maximum fastening speeds to the same speed and thereby deactivating the variable speed mode for the impact driver 1500.

The external device 800/1800 can be also used to program and/or change different parameters on the impact driver 1500. The external device 800/1800 may set, for example, minimum and maximum fastening speeds (e.g., max and min RPMs), speed oscillation, soft start time, trigger travel, downshift/upshift mid-application (which can be triggered by the impact mechanism being activated), maximum number of impacts, and/or activation and operation of a worklight for the impact driver 1500.

The external device 800/1800 can also be used to measure speed on the impact driver 1500 in real time, measure trigger travel on impact driver 1500 in real time, as well as measuring other operational parameters of the impact driver 1500 in real time. For instance, the power tool 1500 may wirelessly communicate tool data in real time to the external device 800, 1800.

Figure 27:
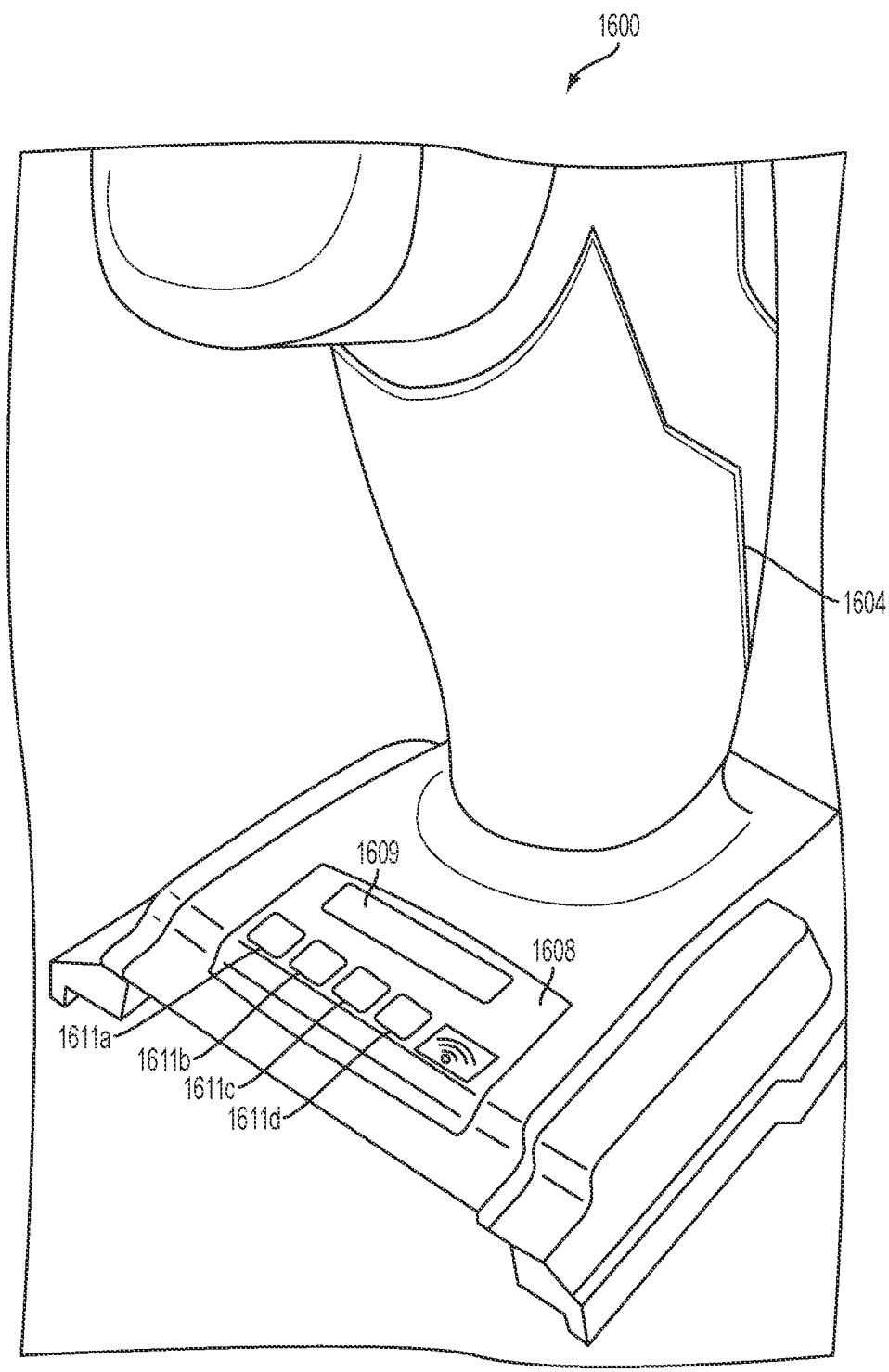
FIG. 27 illustrates a mode selection switch of an impact wrench.

FIG. 27 illustrates mode selection switches 1608 for an impact wrench 1600. The impact wrench 1600 includes similar components as the impact wrench described with respect to FIGS. 2-4, and like parts have been given like reference numbers plus 1400. The mode selection switches 1608 can also determine an operation mode for the impact wrench 1600. A user can use the mode selection switches 1608 to set the operation mode from four selectable modes. Similar to the mode selection switches 1508 of the impact driver 1500, the mode selection switches of the impact wrench 1600 include a push button 1609 and mode indicators 1611*a-d* as shown in FIG. 27, and operate in a similar manner.

Like the impact driver 1500, the impact wrench 1600 includes four assigned operation modes at a given time. Each mode indicator 1611*a-d* can be assigned by the user a a different operation mode. The user selects a mode for each mode indicator 1611*a-d* using the external device 800, 1800. The user may select from a variety of pre-configured modes and user-defined modes. The pre-configured modes and the user-defined modes may be stored in a memory of the impact wrench 1600, and the user may select which mode is assigned to which mode indicator 1611*a-d* through the external device 800, 1800. In other embodiments, the pre-configured modes and the user-defined modes are stored on the external device 800, 1800, or on the remote server 900, 1900, and the user selects which modes to assign and store on the impact wrench 1600 using the external device 800, 1800. In these embodiments, the four modes assigned to the mode indicators 1611*a-d* are stored on the impact wrench 1600, while the other potential (unassigned) modes remain on a memory outside of the tool (e.g., on the external device 800,1800 or remote server 900,1900).

The pre-configured modes for the impact wrench 1600 include a low speed mode, a medium speed mode, a high speed mode, a consistent torque mode, and an anti-spin off mode. The low speed mode is generally used for precision work. In the first mode, a motor of the impact wrench 1600 operates at low speeds (e.g., between 0-200 revolutions per minute (RPM)). The medium speed mode is generally used to prevent damage to the fastener and/or to the material on which the fastener is secured. In the medium speed mode, the motor of the impact wrench 1600 operates at medium speeds (e.g., between 0-2,000 RPMs). The high speed mode is generally used to utilize the maximum speed and power available on the impact wrench 1600. In the high speed mode, the motor of the impact wrench 1600 operates at high speeds (e.g., between 0-2,900 RPMs). A fourth mode is a programmable mode assigned to a fourth mode indicator 1611*d*. The programmable mode varies based on user interaction with the external device 800, 1800. In some embodiments, the low speed mode, medium speed mode, and high speed mode are by default assigned to the first mode indicator 1611*a*, second mode indicator 1611*b*, and third mode indicator 1611*c*, respectively. Other modes may be assigned as the default modes, and the fourth mode indicators 1611*d* may be assigned a default mode as well, such as the self-tapping screw mode. A user can continue to use these default modes, or the user may find that other modes are better suited for a task or project and may change the modes accordingly.

The consistent torque mode is generally used for driving the same type of fastener multiple times where a consistent bolt tension is desired. In the consistent torque mode, the impact wrench 1600 counts the number of impacts performed by the impact wrench and stores the RPMs used for each particular fastener. When a subsequent fastener is secured, the impact wrench 1600 counts the number of impacts and ceases operation when the same number of impacts are performed on the subsequent fastener. The impact wrench 1600 also ensures that the fastening speed is the same for a set of fasteners, thereby ensuring that the same torque is applied to each fastener. Therefore, a user can use an external device 800, 1800 to select from a first group of modes a programmable mode for a first power tool and from a second group of modes, a programmable mode for a second power tool.

The anti-spin off mode is generally used for removing nuts and bolts. When removing nuts and bolts, the nuts and bolts can sometimes lose engagement with the impact wrench 1600 and fall from a lift or elevated surface. In the anti-spin off mode, the impact wrench 1600 begins rotating at a high speed (e.g., 1500 RPMs) and automatically decreases the fastening speed when the impact mechanism is deactivated. The user can further customize the anti-spin off mode by selecting starting RPMs/IPMs, selecting finishing RPMs or IPMs, and/or setting the rate at which the fastening speed decreases.

The selectable modes can also be assigned a user-defined mode. The user defined modes for the impact wrench 1600 include an impact counting mode, a memory mode, an impacting variable speed mode, and a non-impacting mode. The user-defined modes are substantially similar to the user-defined modes for the impact driver 1500 and will therefore not be discussed in further detail.

The external device 800/1800 can be also used to program and/or change different parameters on the impact wrench 1600. The external device 800/1800 may set, for example, minimum and maximum fastening speeds (e.g., max and min RPMs), speed oscillation, soft start time, trigger travel, downshift/upshift mid-application (which can be triggered by the impact mechanism being activated), maximum number of impacts, and/or activation and operation of a worklight for the impact wrench 1600. The external device 800/1800 can also be used to measure speed on the impact wrench 1600 real time, measure trigger travel on impact wrench 1600 in real time, as well as measuring other operational parameters of the impact wrench 1600 in real time. In some embodiments, the impact wrench 1600 communicates with the external device 800 through the adapter 600 using similar techniques as those described above with respect to the power tool 200. In other embodiments, the impact wrench 1600 includes a wireless communication module, and communicates with the external device 1800 using similar techniques as those described above with respect to the power tool 1200.

Figure 28:
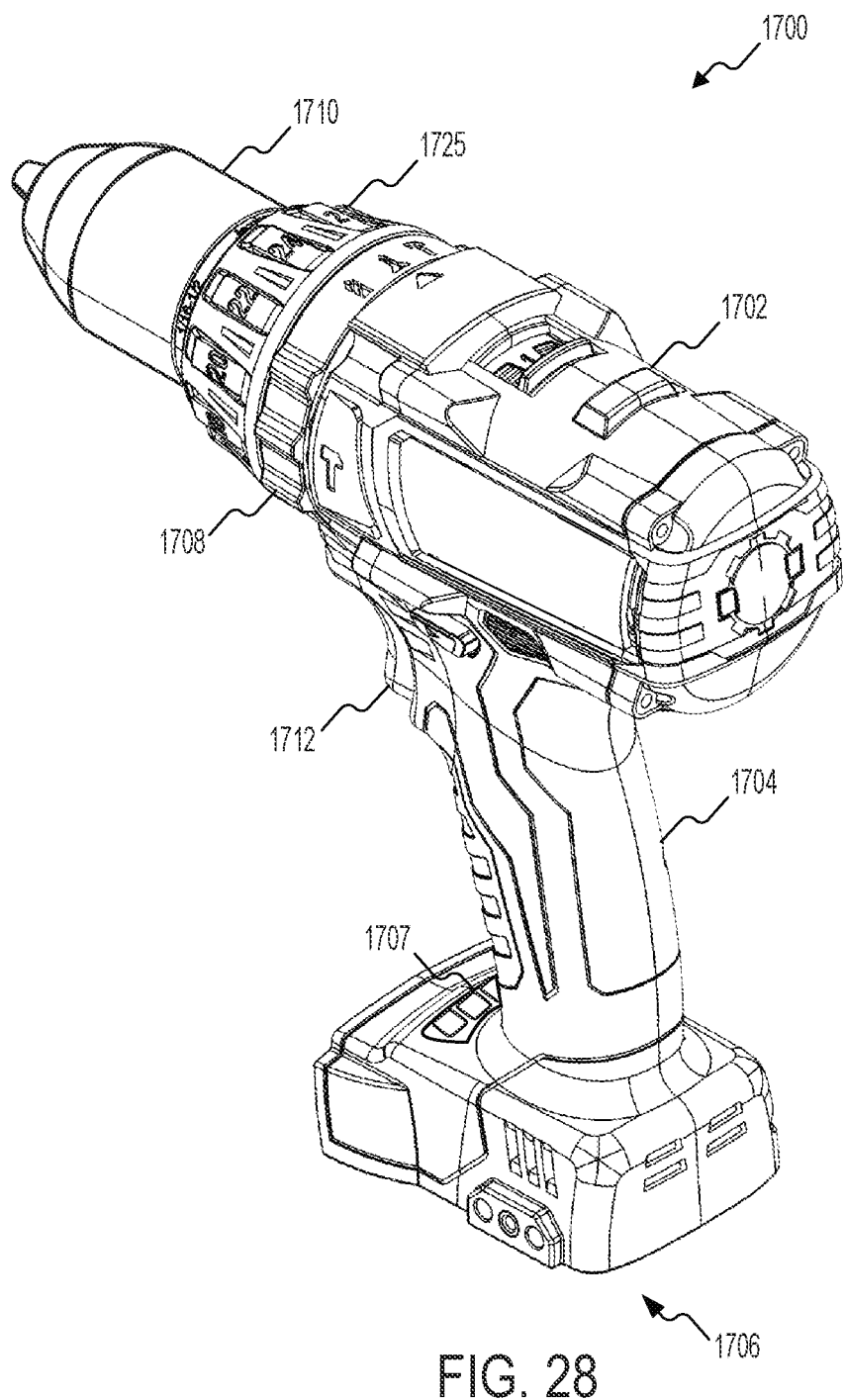
FIG. 28 illustrates a perspective view of a hammer drill.
Figure 29:
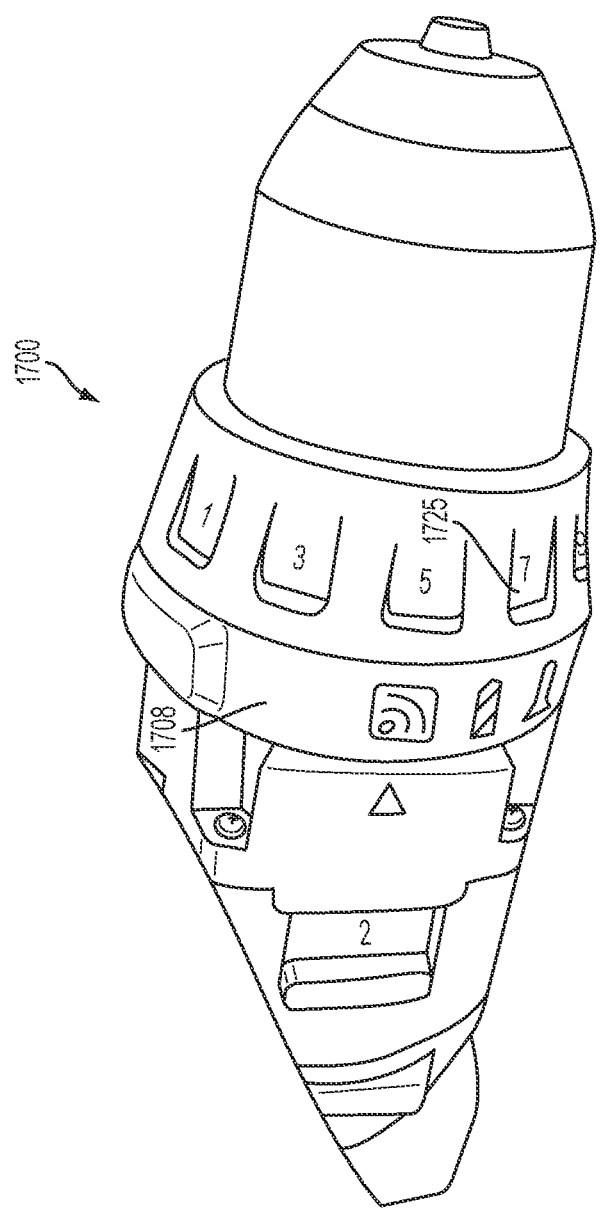
FIG. 29 illustrates a mode selection switch for the hammer drill shown in FIG. 28.

FIG. 28 illustrates a hammer drill 1700. The hammer drill 1700 includes an upper main body 1702, a handle 1704, a device receiving portion 1706, a mode selection ring 1708, a mode selection switch 1707, a torque adjustment dial or ring 1725, an output drive device or mechanism (e.g., a chuck) 1710, and a trigger 1712. The mode selection ring 1708 allows the user to select between a drilling mode, a driving mode, a hammer mode, and an adaptive mode (see FIG. 29). When the adaptive mode is selected, the mode selection switch 1707 then allows the user to select from different programmable modes such as pre-configured modes (e.g., low speed, medium speed, and high speed modes) and user-defined modes. The mode selection switch 1707 is similar to those of the impact wrench 1600 shown in FIG. 27 and those of the impact driver 1500 shown in FIG. 25-26. The hammer drill 1700 includes similar components to the power tools 200, 1200, 1300, 1500, 1600 described above, and similar to the impact wrench 1600 and the impact driver 1500. The external device 800, 1800 can also be used to program at least one of the modes selectable by the hammer drill 1700.

The external device 800, 1800 can also be used to program and/or define different features on the hammer drill 1700. For example, the external device 800, 1800 can allow a user to set a constant speed mode, a variable bounded speed mode, settings for soft start, electronic clutch, PWM pulse mode, and a TEK screw mode for the hammer drill 1700. The constant speed mode allows the hammer drill 1700 to ignore the position of the trigger. Instead, the hammer drill runs the hammer drill motor at a constant speed as defined by the user. The speed of the motor is then controlled by closed-loop control using sensors determining the position and speed of the motor.

The variable bounded speed mode allows the hammer drill 1700 to be operated in different speeds according to the trigger displacement. The user may set the minimum speed and/or the maximum speed. When the trigger is fully depressed, the motor operates at the maximum speed, and when the trigger is minimally depressed, the motor operates at the minimum speed. The hammer drill 1700 then operates at linearly increasing speeds between the minimally depressed position of the trigger and full depression of the trigger. The variable bounded speed mode for the hammer drill 1700 is similar to the impacting variable speed mode of the impact wrench 1600 and the impact driver 1500.

The PWM pulse mode allows the hammer drill 1700 to ignore the position of the trigger and, rather, oscillate between a minimum speed and a maximum speed. The user can select the minimum speed, the maximum speed, and the oscillation rate between the two. The hammer drill 1700 does not monitor the position of the trigger and, instead, simply begins oscillating between the two predetermined speeds. In a variation of the PWM pulse mode, the hammer drill 1700 changes the duty cycle to achieve the minimum speed and the maximum speed of the hammer drill 1700. The hammer drill 1700, in such embodiments, alternates between oscillating the motor duty cycle between a first duty cycle and a second duty cycle at a predetermined oscillation period.

The TEK screw mode, also referred to as the self-drilling screw mode, allows the hammer drill 1700 to operate in a current controlled mode. In particular, in the TEK screw mode, the hammer drill 1700 operates at a first maximum speed (e.g., 1000 RPMs). The hammer drill 1700 monitors the current of the hammer drill 1700. When the current drawn by the motor of the hammer drill 1700 exceeds a first predetermined current threshold, the hammer drill 1700 lowers the operating speed and continues to monitor the current of the hammer drill 1700. When the current of the hammer drill 1700 is below a second predetermined current threshold (e.g., 2A below the first predetermined current threshold) for a particular period of time (e.g., one second), the hammer drill 1700 resumes operating at the first maximum speed. The hammer drill 1700 operates via an open-loop control in this mode. Generally, an increase in motor current indicates an increase in resistance to driving the fastener and represents increased energy used to overcome the increased resistance.

The user can also select for the hammer drill 1700 to activate soft start and/or the electronic clutch. Soft start refers to a setting in which the hammer drill 1700 slowly increases the speed of the motor to full speed. When the trigger is first pulled, the hammer drill 1700 begins increasing the speed slowly at a predetermined rate. The electronic clutch allows the hammer drill 1700 to monitor the output torque through a current measurement. When the electronic clutch is enabled, the hammer drill 1700 operates normally until the current of the hammer drill 1700 exceeds a predetermined threshold. Once the current of the hammer drill 1700 exceeds the predetermined threshold, the hammer drill 1700 begins to pulse the hammer drill motor at low PWMs to simulate the function of a mechanical clutch. In some embodiments, the electronic clutch can program the torque range of a current ring electronic clutch setting on the hammer drill 1700.

In some embodiments, the hammer drill 1700 communicates with the external device 800 through the adapter 600 using similar techniques as those described above with respect to the power tool 200. In other embodiments, the hammer drill 1700 includes a wireless communication module, and communicates with the external device 1800 using similar techniques as those described above with respect to the power tool 1200.

Figure 30:
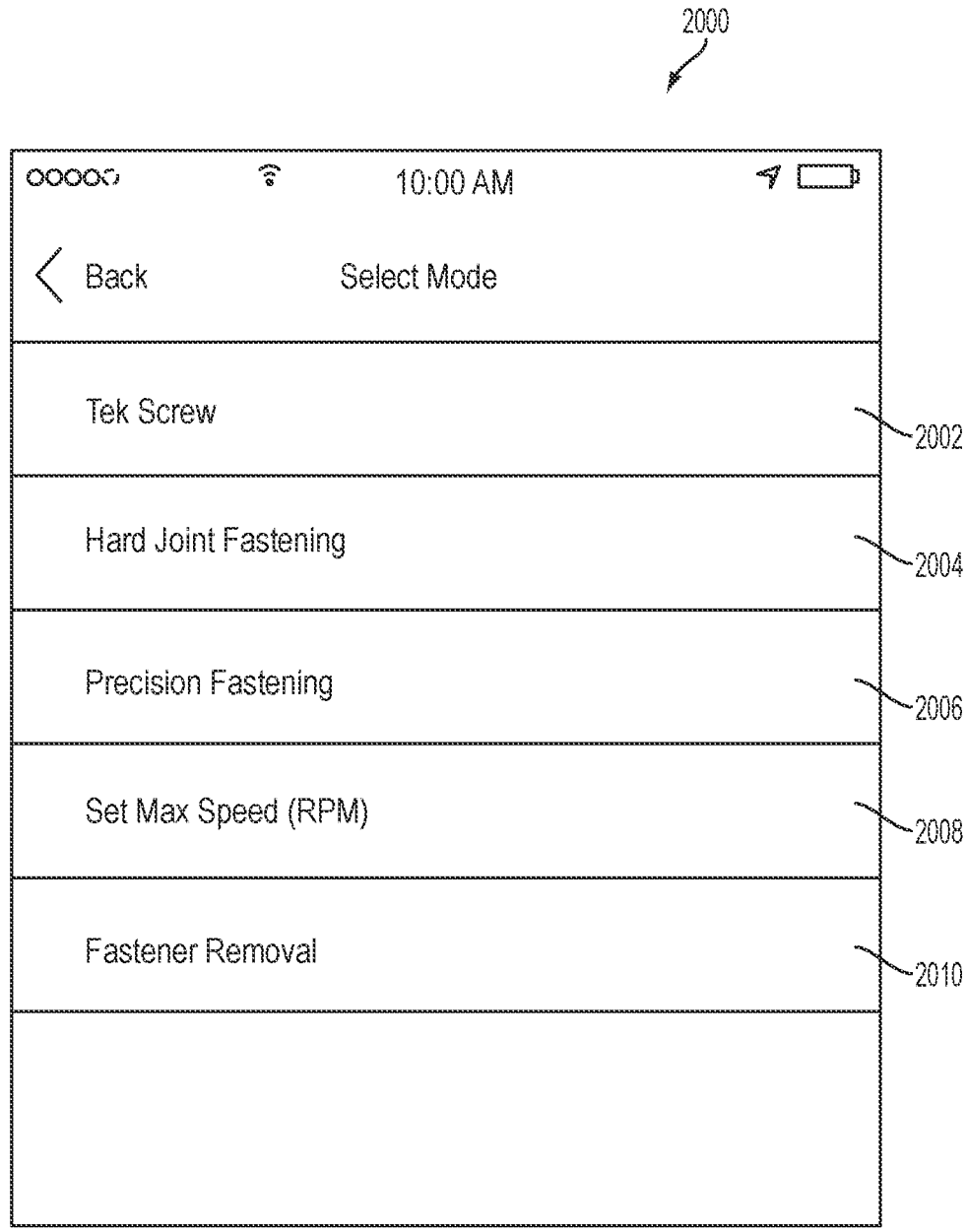

Communication with the external device 800, 1800 provides a graphical user interface through which the user can select and customize the different operation modes for the different power tools 1500, 1600, 1700. FIGS. 30-36 illustrate exemplary graphical user interfaces generated by the external device 800, 1800 to facilitate interaction with the power tools 1500, 1600, 1700. FIG. 30 illustrates a screenshot of a mode selection screen 2000. The mode selection screen 2000 displays different modes of operation that can be saved onto the power tool 1500, 1600, 1700 or otherwise assigned and selected (e.g., to the programmable mode indicated by indicator 1511d). In the illustrated embodiment, the modes of operation includes a TEK screw mode 2002, a hard joint fastening mode 2004, a precision fastening mode 2006, a max speed mode 2008, and a fastener removal mode 2010. The user can further customize each of the modes 2002, 2004, 2006, 2008, 2010 as shown in FIGS. 31-36.

Figure 31:
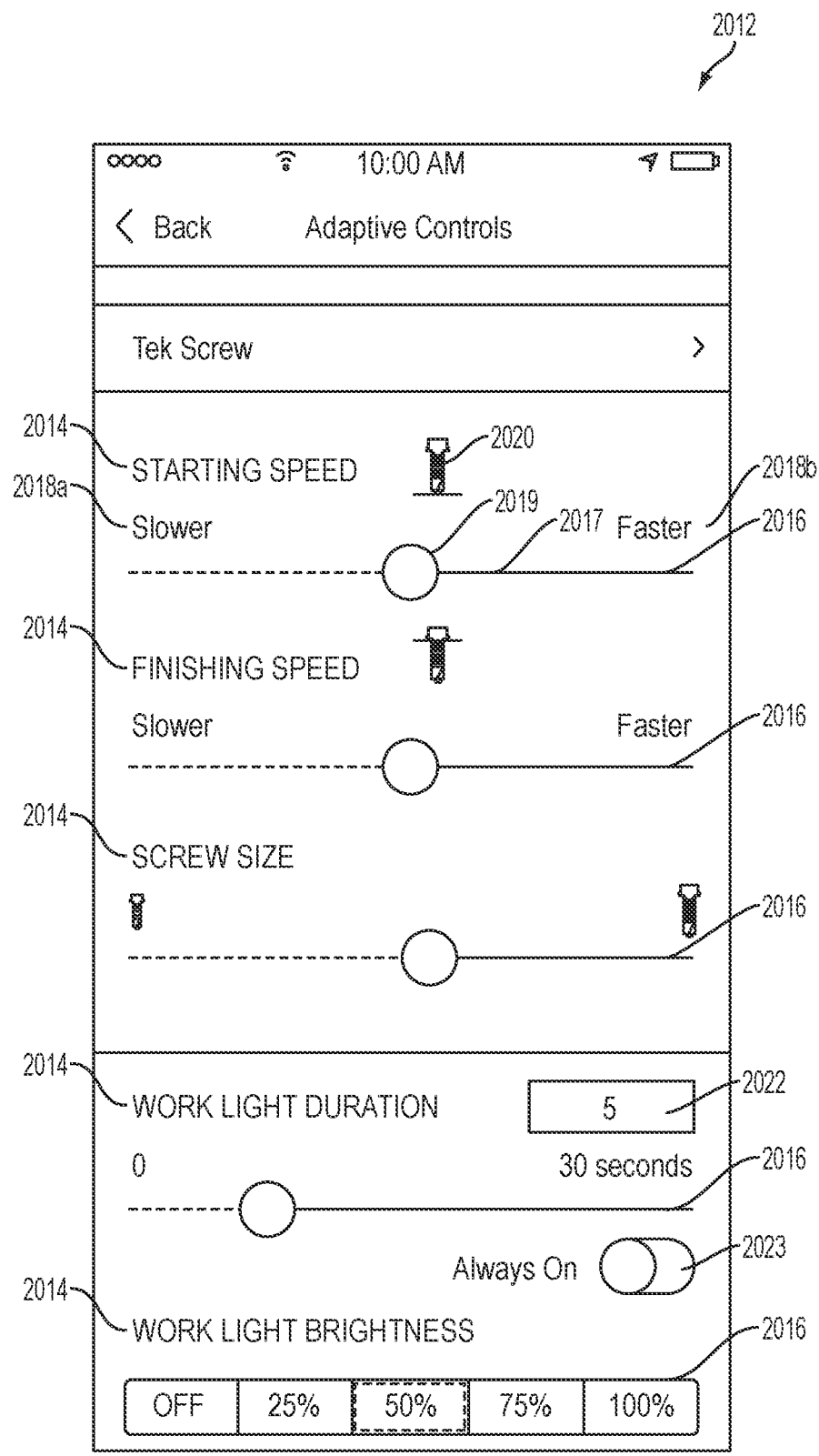

FIG. 31 illustrates the customization available for the TEK screw mode 2002. The TEK screw mode customization screen 2012 allows a user to set a breakaway power, a maximum speed, a work light duration, and a work light brightness. The TEK screw mode customization screen 2012 includes a parameter title section 2014 displaying the name of the parameter that is customizable by the user, and a selection mechanism 2016 that allows the user to set the specific parameter. In the illustrated embodiment, the selection mechanism 2016 includes a horizontal line 2017 with labels 2018*a*, 2018*b* at the two extremes (e.g., 0% and 100%). The selection mechanism 2016 also includes a movable object (e.g., a slider) 2019 that moves along the horizontal line to define where, in relation to the two extremes, the parameter is set. In other embodiments, the selection mechanism 2016 also includes a label associated with the movable object 2019 to indicate the current setting. In other embodiments, the selection mechanism 2016 may be designed differently. For instance, the work light brightness parameter includes five predetermined values (off, 25%, 50%, 75%, and 100%) that can be selected, e.g., by touching one of the values via a touchscreen. Additionally, certain parameters are set using an on/off toggle selector. For instance, the work light may be set to always on via the toggle selector 2023. When the toggle selector 2023 is set to off, the movable object 2019 controls the duration parameter. Other selection mechanisms 2016 may include a vertical bar instead of a horizontal bar, it may include an increasing and/or decreasing number of small icons depending on the value of the parameter, and the like.

As shown in FIG. 31, in some embodiments and for some parameters, an icon 2020 may also be displayed to further clarify the parameter to be selected. As also shown in FIG. 31, in some embodiments, a text box 2022 may also be displayed in addition to or in place of the selection mechanism 2016. For example, in the TEK screw mode customization screen 2012, the maximum speed and the work light duration parameters are also displayed the textbox 2022.

In some embodiments, as shown in FIG. 32, the TEK screw mode customization screen 2012 also or alternatively includes a fastener selection section 2024. The fastener selection section 2024 allows a user to input information regarding the specific fastener used. In some embodiments, the external device 800, 1800 may provide suggestions or default values for the parameters shown in FIG. 31 based on the fastener specified in the fastener selection section 2024.

Figure 33:
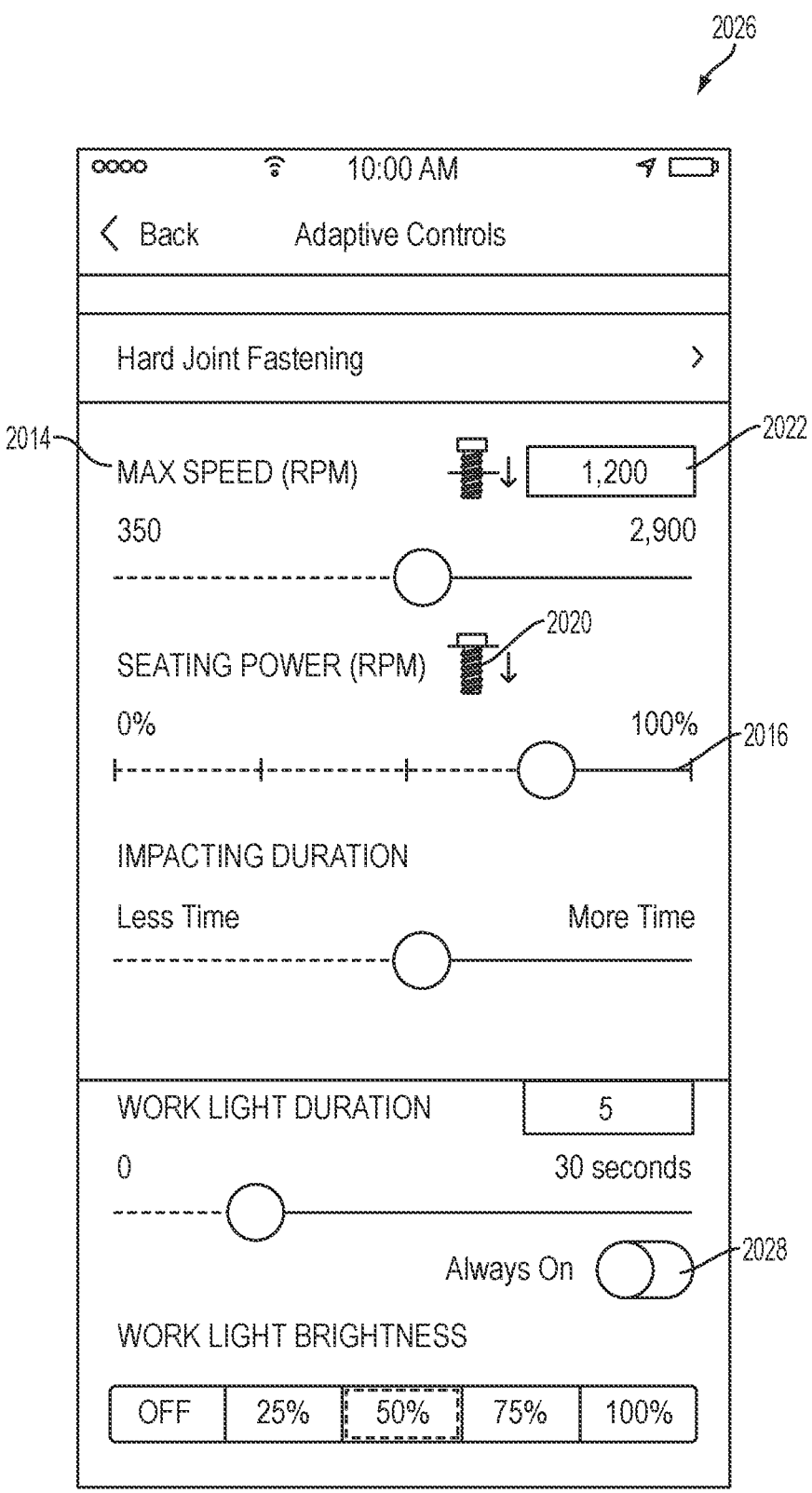

FIG. 33 shows a hard joint fastening customization screen 2026. A user may customize or adapt the maximum speed, the seating power, the impact duration, the work light duration and the work light brightness. As shown in FIG. 33, the maximum speed and the work light duration include the textbox 2022 and the selection mechanism 2016, while the other parameters include the selection mechanism 2016. As shown in FIG. 32, the hard joint fastening customization screen 2026 also includes an on/off selector 2028 for the work light, which operates similar to the toggle selector 2023.

Figure 34:
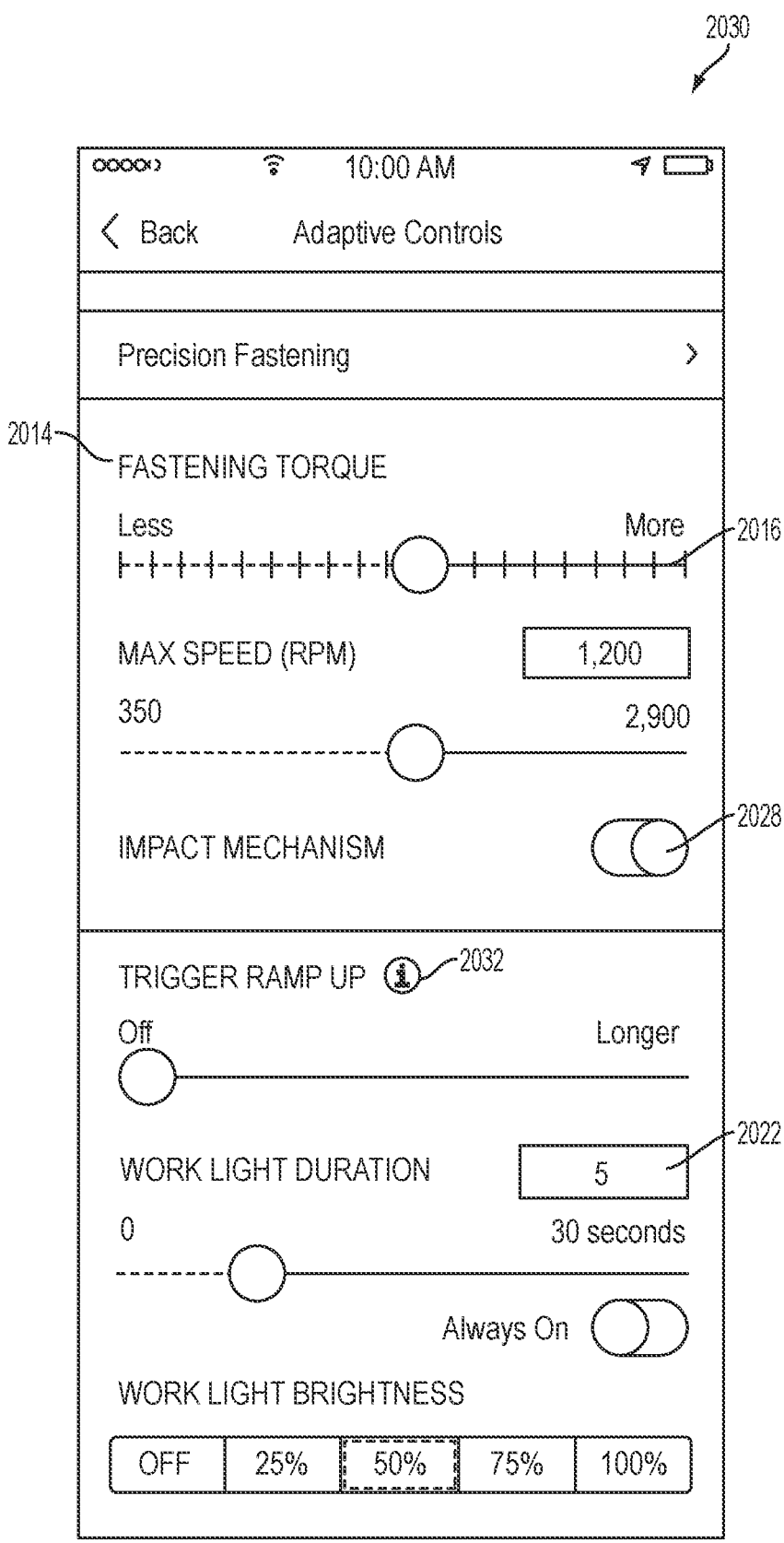

FIG. 34 illustrates a precision fastening customization screen 2030. A user may edit the fastening torque, the maximum speed, whether the impact mechanism is utilized, how short or long the trigger ramp up is, the work light duration, and the work light brightness. Similar to the customization screens 2012, 2026 for the TEK screw mode and the hard joint fastening mode, the customization screen for the precision fastening mode includes titles 2014, icons 2020, selection mechanisms 2016, on/off selectors 2028, text boxes 2022, and the like. Additionally, as shown in FIG. 34, some parameters also include an information link 2032. The information link 2032 provides the user with more information regarding that particular parameter. For example, the information link 2032 may provide the user with an explanation of what the parameter is, the effects from having different values for the parameter, typical values used for the specific parameter, and the like.

Figure 35:
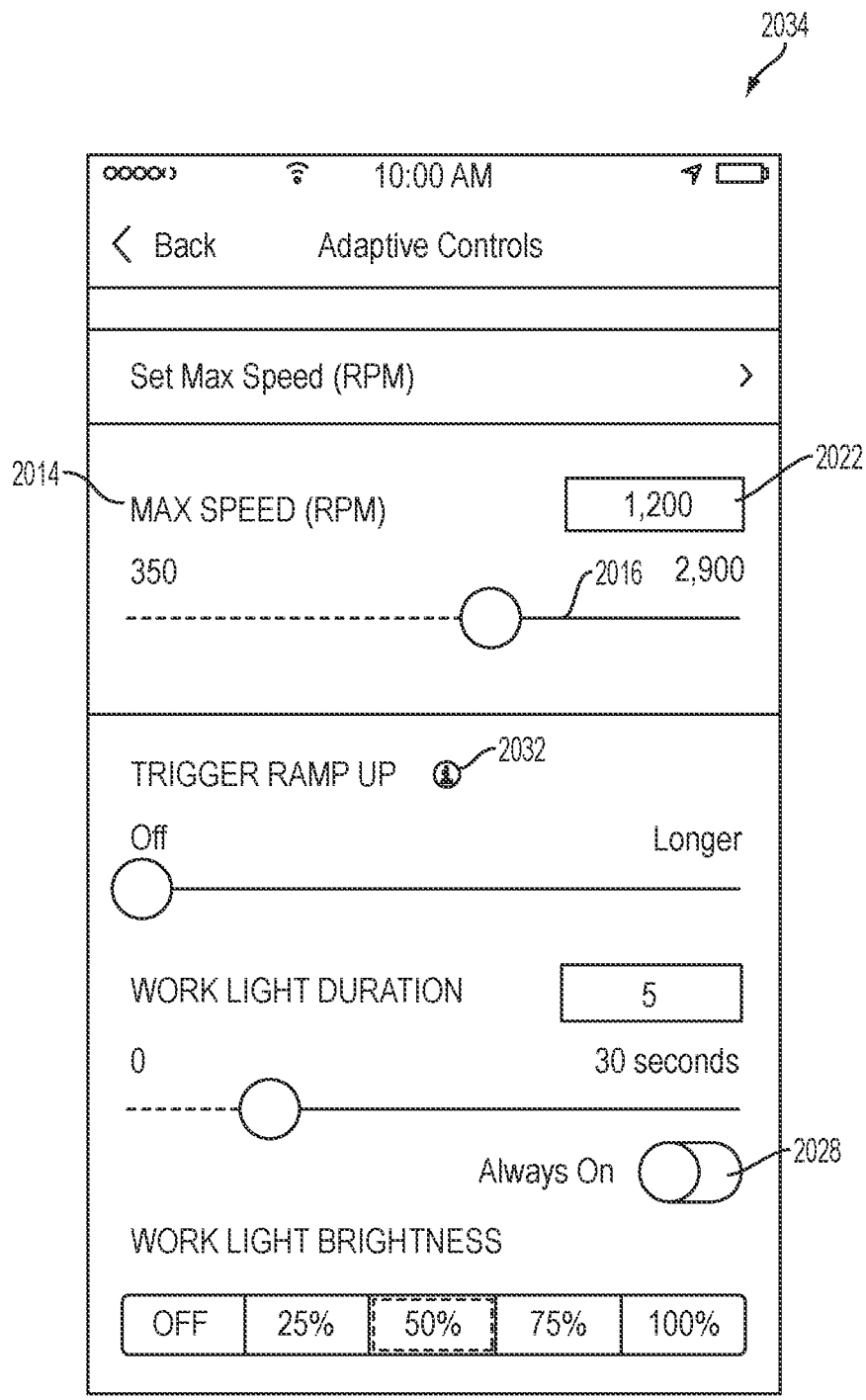
Figure 36:
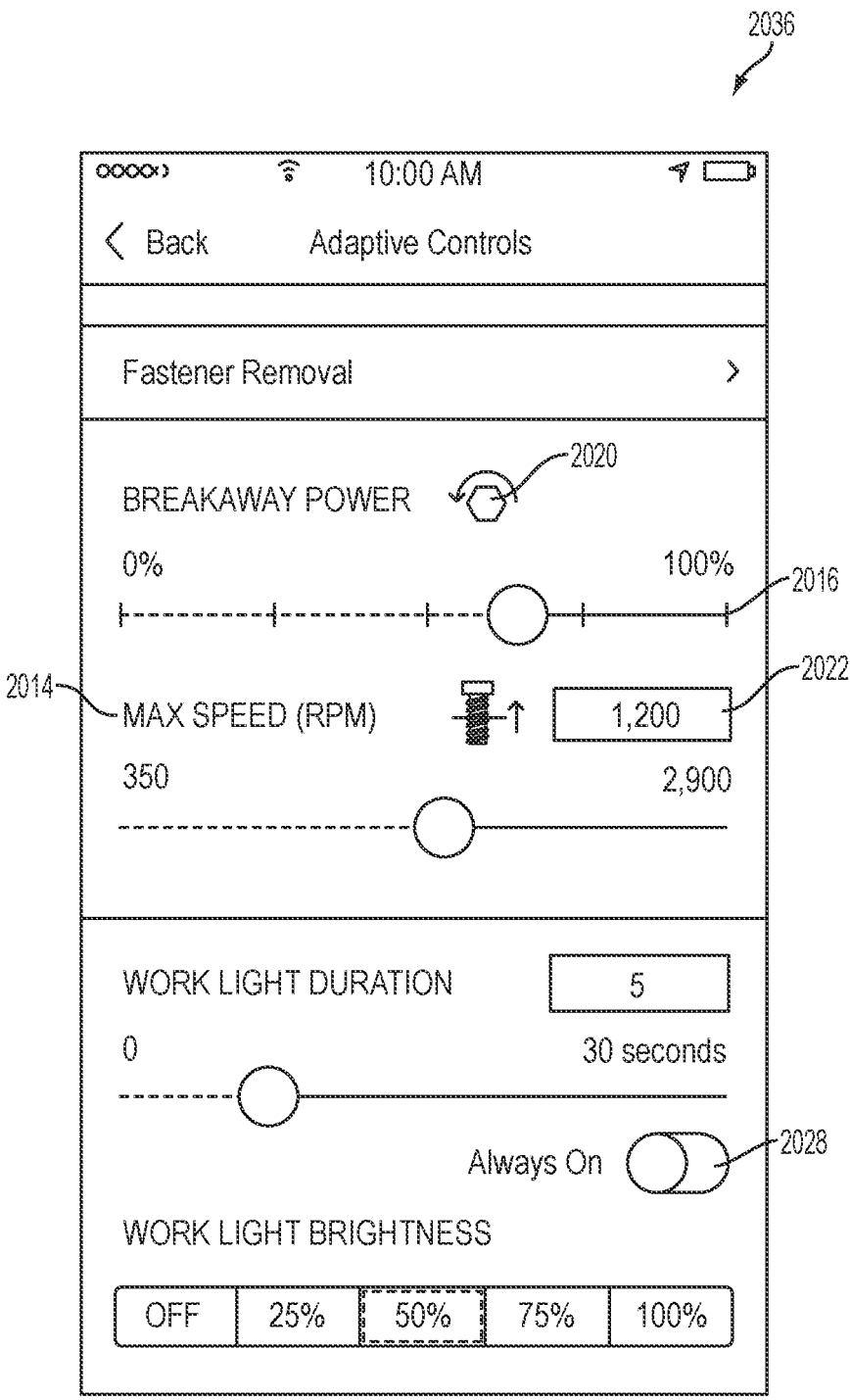

FIG. 35 illustrates a maximum speed mode customization screen 2034. The customization screen 2034 for the maximum speed mode allows the user to determine the maximum speed at which the power tool 1500, 1600, 1700 operates, a trigger ramp up length (i.e., how quickly or slowly the motor speed ramps up/down due to a trigger position change), work light duration, and work light brightness. FIG. 36 illustrates a fastener removal customization screen 2036. The fastener removal customization screen 2036 allows a user to edit the breakaway power used by the power tool 1500, 1600, 1700, the maximum speed, the work light duration, and the work light brightness.

Although FIGS. 31-36 illustrate customization screens for the TEK screw mode 2002, the hard joint fastening mode 2004, the precision fastening mode 2006, the max speed mode 2080, and the fastener removal mode 2010, the external device 800, 1800 may generate similar graphical user interfaces for customizing other modes such as, for example, the anti-spin off mode, the anti-slip mode, etc. Furthermore, the customization screens shown in FIGS. 31-36 show exemplary ways in which the modes 2002, 2004, 2006, 2008, 2010 can be customized. The modes can also be customized by setting different parameters for each mode, and generating a graphical user interface that allows the user to input the values for the different parameters.

In some embodiments, a system and method for customizing a power tool includes first establishing a communication link between an external device (e.g., external device 800/1800) and the power tool (e.g., hammer drill 1700). Although not necessary, in some instances, establishing a communication link includes setting the power tool to an adaptive mode (e.g., via mode selection ring 1708) and selecting a programmable mode (e.g., using mode selection switch 1707). Establishing a communication link wirelessly can include instructing (e.g., via a user interface) the external device to wirelessly link to the power tool, which may include the user specifying to the external device details of the tool. Alternatively, a communication link can be established by attaching the adapter 600 to the power tool and either physically connecting the external device to the adapter 600 (e.g., via USB cable) or wirelessly linking the external device to the adapter 600.

After a communication link is established, the external device may generate a graphical user interface (GUI) providing mode options (see FIG. 30). To generate the list of mode options, the external device may access, using a tool identifier as an index, a database storing a list of available modes for each of a plurality of tools. The database may reside on the external device or a remote server (e.g., server 900/1900). Alternatively, the external device may obtain the list of available modes from the tool itself. Regardless of the source, the list of available modes can vary depending on the tool. Accordingly, in some instances, the external device generates a first list of mode options when communicating with a first tool, and a second list of mode options (different from the first list) when communicating with a second tool.

After selecting a mode on the graphical user interface, the user may further navigate to customize (e.g., set parameters of) the selected mode, as shown and described with respect to FIGS. 31-35. The selected mode and/or parameter values are then sent to the power tool over the communication link. The power tool saves the received mode selection and/or parameter values. The user then operates the tool in the selected mode according to the received parameter values.

The exemplary screenshots of the graphical user interface generated by the external device 800, 1800 can also be used for customizing different modes for different power tools 1500, 1600, 1700. The exemplary screens 2012, 2023, 2030, 2034, 2036 can also be used to request information such as, for example, the maximum speed for a particular power tool 1500, 1600, 1700. It should be understood that the earlier modes discussed above with respect to the impact driver 1500, the impact wrench 1600, and the hammer drill 1700 can be customizable and selected using similar screens as those shown in FIGS. 31-36. Additionally, particular programmable modes, including pre-configured modes and user-defined modes, are described above with respect to specific power tools (e.g., the impact driver 1500, impact wrench 1600, and hammer drill 1700). However, in some instances, one or more of these modes are implemented on other power tools. As but one example, the TEK screw mode described with respect to the hammer drill 1700 may be implemented on a (non-hammer) power drill and on the impact driver 1500 (e.g., assigned to an indicator 1511a-d and selected by a user).

Thus, the invention provides, among other things, a communication system among power tool devices and an external device, in which the external device provides a user interface to obtain information from different power tool devices and provides information to the power tool devices. Various features and advantages of the invention are set forth in the following claims.

What is claimed is:

1. A power tool device communication system comprising:
    an external device including a first controller including a first electronic processor and a first memory, wherein the first controller is configured to:
        set, based on a first received input at a user interface of the external device, a work light duration parameter value,
        set, based on a second received input at the user interface of the external device, a work light brightness parameter value, and
        transmit, via wireless communication to a power tool device, configuration data including the work light duration parameter value and the work light brightness parameter value; and
    the power tool device including:
        a housing having a device receiving portion configured to receive and couple to a power tool battery pack,
        a work light,
        a wireless communication circuit configured to wirelessly communicate with the external device to receive the configuration data, and
        a second controller including a second electronic processor and a second memory, the second controller coupled to the wireless communication circuit to receive the configuration data and configured to:
            control a work light duration of the work light based on the work light duration parameter value, and
            control a work light brightness of the work light based on the work light brightness parameter value.

2. The system of claim 1, wherein the user interface includes a touchscreen, and wherein at least one selected from a group of the work light duration parameter value and the work light brightness parameter value is adjustable via a slider on the touchscreen.

3. The system of claim 1, wherein the second controller is configured to communicate power tool device data to the external device via the wireless communication circuit.

4. The system of claim 1, wherein the power tool device includes a power tool that includes a brushless direct current (DC) motor within the housing and having a rotor and a stator.

5. The system of claim 1, wherein the housing includes a handle.

6. The system of claim 1, wherein the power tool device is configured to perform a lighting task as a primary function of the power tool device.

7. A method of controlling a power tool device, the method comprising:
    setting, with a first controller of an external device and based on a first received input at a user interface of the external device, a work light duration parameter value, the first controller including a first electronic processor and a first memory;
    setting, with the first controller and based on a second received input at the user interface of the external device, a work light brightness parameter value;
    transmitting, from the external device via wireless communication to the power tool device, configuration data including the work light duration parameter value and the work light brightness parameter value;
    receiving, with a second controller of the power tool device via a wireless communication circuit of the power tool device, the configuration data from the external device, the second controller including a second electronic processor and a second memory, and the power tool device including:
        a housing having a device receiving portion configured to receive and couple to a power tool battery pack, and
        a work light;
    controlling, with the second controller of the power tool device, a work light duration of the work light based on the work light duration parameter value; and
    controlling with the second controller of the power tool device, a work light brightness of the work light based on the work light brightness parameter value.

8. The method of claim 7, wherein the user interface includes a touchscreen, and wherein at least one selected from a group of the work light duration parameter value and the work light brightness parameter value is adjustable via a slider on the touchscreen.

9. The method of claim 7, further comprising transmitting, from the second controller via the wireless communication circuit, power tool device data to the external device.

10. The method of claim 7, wherein the power tool device includes a brushless direct current (DC) motor within the housing and having a rotor and a stator.

11. The method of claim 7, wherein the housing includes a handle.

12. The method of claim 7, further comprising performing, with the power tool device, a lighting task as a primary function of the power tool device.

13. A power tool device comprising:
    a housing having a device receiving portion configured to receive and couple to a power tool battery pack;
    a work light;
    a wireless communication circuit configured to wirelessly communicate with an external device to receive configuration data including a work light duration parameter value and a work light brightness parameter value; and
    a controller including an electronic processor and a memory, the controller coupled to the wireless communication circuit to receive the configuration data and configured to:
        control a work light duration of the work light based on the work light duration parameter value, and control a work light brightness of the work light based on the work light brightness parameter value.

14. The power tool device of claim 13, wherein the work light duration parameter value and the work light brightness parameter value are adjustable via a user interface of the external device before being received by the wireless communication circuit.

15. The power tool device of claim 14, wherein the user interface includes a touchscreen, and wherein at least one selected from a group of the work light duration parameter value and the work light brightness parameter value is adjustable via a slider on the touchscreen.

16. The power tool device of claim 13, wherein the controller is configured to communicate power tool device data to the external device via the wireless communication circuit.

17. The power tool device of claim 13, wherein the power tool device includes a brushless direct current (DC) motor within the housing and having a rotor and a stator.

18. The power tool device of claim 13, wherein the housing includes a handle.

19. The power tool device of claim 13, wherein the power tool device is configured to perform a lighting task as a primary function of the power tool device.

20. The power tool device of claim 13, wherein the power tool device includes a power tool selected from a group of an impact wrench, a power drill, a reciprocating saw, a pipe cutter, and a sander.

* * * * *